United States Patent
Johnston et al.

(10) Patent No.: US 12,100,971 B2
(45) Date of Patent: Sep. 24, 2024

(54) SYSTEMS AND METHODS FOR DETERMINING A KEEP-OUT ZONE OF A WIRELESS POWER TRANSMITTER

(71) Applicant: Energous Corporation, San Jose, CA (US)

(72) Inventors: Cesar A. Johnston, Sunnyvale, CA (US); Erik Heinke, San Jose, CA (US); Daniel P. Lawless, Sunnyvale, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 18/489,803

(22) Filed: Oct. 18, 2023

(65) Prior Publication Data

US 2024/0128799 A1   Apr. 18, 2024

Related U.S. Application Data

(63) Continuation of application No. 17/852,190, filed on Jun. 28, 2022, now Pat. No. 11,817,719, which is a
(Continued)

(51) Int. Cl.
   *H02J 50/20* (2016.01)
   *H02J 50/00* (2016.01)
   *H02J 50/90* (2016.01)

(52) U.S. Cl.
   CPC ............ *H02J 50/20* (2016.02); *H02J 50/005* (2020.01); *H02J 50/90* (2016.02)

(58) Field of Classification Search
   CPC .......... H02J 50/20; H02J 50/005; H02J 50/90; H02J 50/60; H02J 50/402
(Continued)

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 201278367 Y | 7/2009 |
| CN | 102227884 A | 10/2011 |

(Continued)

OTHER PUBLICATIONS

Energous Corp., IPRP, PCT/US2014/040697, Dec. 8, 2015, 9 pgs.
(Continued)

*Primary Examiner* — Emmanuel Bayard
(74) *Attorney, Agent, or Firm* — Morgan, Lewis & Bockius LLP

(57) ABSTRACT

A method includes selecting a power level from among available power levels at which to amplify a radio frequency (RF) signal using a power amplifier. The method includes providing the amplified RF signal to antennas. The antennas are caused to, upon receiving the amplified RF signal, radiate RF energy within a transmission field. The method includes determining predicted specific absorption rate (SAR) values of the transmission field and determining, based on the predicted SAR values, a keep out zone within the transmission field. The keep out zone is an area at which the predicted SAR values are greater than or equal to a predetermined SAR threshold of the transmission field. The method includes receiving, from sensors, an indication that an object is within the keep out zone. The method includes in response to receiving the indication, causing the antennas to cease radiating the RF energy.

20 Claims, 37 Drawing Sheets
(9 of 37 Drawing Sheet(s) Filed in Color)

Related U.S. Application Data continuation of application No. 17/234,696, filed on Apr. 19, 2021, now Pat. No. 11,411,437, which is a continuation of application No. 16/932,631, filed on Jul. 17, 2020, now Pat. No. 10,985,617.

(60) Provisional application No. 63/012,914, filed on Apr. 20, 2020, provisional application No. 62/955,864, filed on Dec. 31, 2019.

(58) Field of Classification Search
USPC .................................................. 375/295–297
See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,508,267 B1 | 3/2009 | Yu et al. |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Itoh et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |

(56) References Cited

U.S. PATENT DOCUMENTS

| | | |
|---|---|---|
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,485 B2 | 12/2017 | Contopanagos |
| 9,853,692 B1 | 12/2017 | Bell et al. |
| 9,859,756 B2 | 1/2018 | Leabman et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,948,135 B2 | 4/2018 | Leabman et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |

(56) References Cited

U.S. PATENT DOCUMENTS

| | | |
|---|---|---|
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Leabman |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,340,583 B2 | 7/2019 | Barker et al. |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,985,617 B1 * | 4/2021 | Johnston ............... H02J 50/005 |
| 10,992,185 B2 | 4/2021 | Leabman |
| 10,992,187 B2 | 4/2021 | Leabman |
| 11,011,942 B2 | 5/2021 | Liu |
| 11,018,779 B2 | 5/2021 | Sarajedini |
| 11,056,929 B2 | 7/2021 | Bell et al. |
| 11,114,885 B2 | 9/2021 | Hosseini et al. |
| 11,159,057 B2 | 10/2021 | Kabiri et al. |
| 11,233,425 B2 | 1/2022 | Leabman |
| 11,245,191 B2 | 2/2022 | Kornaros et al. |
| 11,342,798 B2 | 5/2022 | Johnston et al. |
| 11,381,127 B2 | 7/2022 | Bihari et al. |
| 11,411,437 B2 | 8/2022 | Johnston et al. |
| 11,437,735 B2 | 9/2022 | Papio-Toda et al. |
| 11,515,732 B2 | 11/2022 | Contopanagos et al. |
| 11,539,243 B2 | 12/2022 | Katajamaki et al. |
| 11,817,719 B2 | 11/2023 | Johnston et al. |
| 2002/0065052 A1 | 5/2002 | Pande et al. |
| 2002/0103447 A1 | 8/2002 | Terry |
| 2002/0171594 A1 | 11/2002 | Fang |
| 2003/0022693 A1 | 1/2003 | Gerogiokas et al. |
| 2003/0038750 A1 | 2/2003 | Chen |
| 2003/0058187 A1 | 3/2003 | Billiet et al. |
| 2004/0020100 A1 | 2/2004 | O'Brien et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes et al. |
| 2007/0060185 A1 | 3/2007 | Simon et al. |
| 2007/0090997 A1 | 4/2007 | Brown et al. |
| 2007/0093269 A1 | 4/2007 | Leabman et al. |

(56) References Cited

U.S. PATENT DOCUMENTS

| | | |
|---|---|---|
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |

(56) References Cited

U.S. PATENT DOCUMENTS

| | | |
|---|---|---|
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Wildmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Alexander |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tamai et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |

(56) References Cited

U.S. PATENT DOCUMENTS

| | | |
|---|---|---|
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Miroshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak, III et al. |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128032 A1* | 5/2014 | Muthukumar .... H04W 52/0254 455/412.2 |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |

(56) References Cited

U.S. PATENT DOCUMENTS

| | | |
|---|---|---|
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wynne et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Jurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wik et al. |
| 2015/0028688 A1 | 1/2015 | Masaoka |
| 2015/0028694 A1 | 1/2015 | Leabman et al. |
| 2015/0028697 A1 | 1/2015 | Makino et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fujinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Arai et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |

(56) References Cited

U.S. PATENT DOCUMENTS

| | | |
|---|---|---|
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099611 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0124573 A1* | 5/2016 | Rouaissia ............ H03K 17/955 345/174 |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0191086 A1 | 6/2016 | Ripley et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0323127 A1 | 11/2016 | Pande et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0085437 A1 | 3/2017 | Condeixa et al. |
| 2017/0092115 A1 | 3/2017 | Sloo et al. |
| 2017/0098962 A1 | 4/2017 | Desrosiers |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0248725 A1* | 8/2017 | Yang ................... H04B 1/3838 |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0227018 A1 | 8/2018 | Moshfeghi |
| 2018/0262050 A1 | 9/2018 | Yankowitz |
| 2018/0262060 A1 | 9/2018 | Johnston |
| 2018/0301934 A1 | 10/2018 | Prabhala et al. |
| 2018/0309314 A1 | 10/2018 | White, II et al. |
| 2018/0323657 A1* | 11/2018 | Hannigan ............... H02J 50/23 |
| 2018/0343040 A1 | 11/2018 | Luzinski et al. |
| 2018/0375368 A1 | 12/2018 | Leabman et al. |
| 2019/0052979 A1 | 2/2019 | Chen et al. |
| 2019/0064914 A1 | 2/2019 | Krishnakumar et al. |
| 2019/0074862 A1 | 3/2019 | Wang et al. |
| 2019/0252801 A1 | 8/2019 | Mahanfar et al. |
| 2019/0296586 A1 | 9/2019 | Moshfeghi |
| 2019/0326782 A1 | 10/2019 | Graham et al. |
| 2019/0356349 A1* | 11/2019 | Lan ....................... H04W 52/24 |
| 2019/0386522 A1 | 12/2019 | Park et al. |
| 2019/0393928 A1 | 12/2019 | Leabman |
| 2020/0091608 A1 | 3/2020 | Alpman et al. |
| 2020/0112204 A1 | 4/2020 | Hosseini et al. |
| 2020/0235614 A1 | 7/2020 | Swan et al. |
| 2020/0244111 A1 | 7/2020 | Johnston et al. |
| 2020/0274397 A1 | 8/2020 | Hwang et al. |
| 2021/0313841 A1 | 10/2021 | Johnston et al. |
| 2022/0368166 A1* | 11/2022 | Golan .................. H04B 10/807 |

FOREIGN PATENT DOCUMENTS

| | | |
|---|---|---|
| CN | 102292896 A | 12/2011 |
| CN | 102860037 A | 1/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 105765821 A | 7/2016 |
| CN | 106329116 A | 1/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |

(56) References Cited

FOREIGN PATENT DOCUMENTS

| | | |
|---|---|---|
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2012016171 A | 1/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014075927 A | 4/2014 |
| JP | 2014112063 A | 6/2014 |
| JP | 2014176131 A | 9/2014 |
| JP | 2015027345 A | 2/2015 |
| JP | 2015128349 A | 7/2015 |
| JP | 2015128370 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20140148270 A | 12/2014 |
| KR | 20150077678 A | 7/2015 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |
| WO | WO 2017112942 A1 | 6/2017 |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., IPRP, PCT/US2020/067566, Jul. 5, 2022, 8 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.

(56) References Cited

OTHER PUBLICATIONS

Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., Isrwo, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/067566, Apr. 27, 2021, 12 pgs.
Notice of Intent to Issue Reexam Certificate: 90/013,793 Feb. 2, 2017, 8 pgs.
Order Granting Reexamination Request, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023—Institution Decision, Nov. 29, 2016, 29 pgs.

(56) References Cited

OTHER PUBLICATIONS

*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Extended European Search Report, EP20909157.8, Sep. 15, 2023, 9 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop, 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas and Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

* cited by examiner

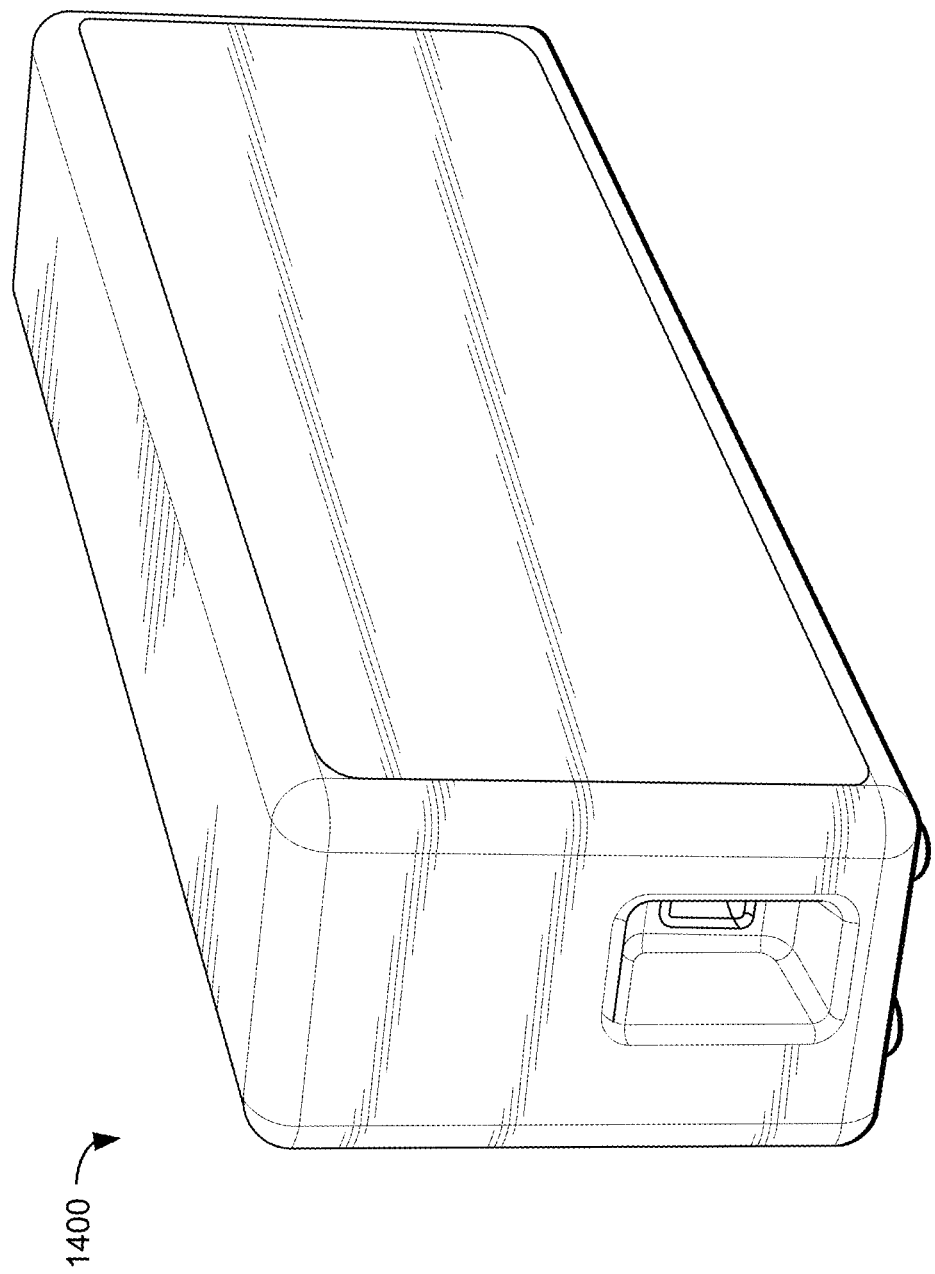

2000 ⬇

2002
Receive an indication that a wireless-power receiver is located within one meter of the wireless-power transmission system and is authorized to receive wirelessly-delivered power from the wireless-power transmission system

2004
In response to receiving the indication, select a power level from among a plurality of available power levels at which to amplify a radio frequency (RF) signal using a power amplifier, the power level selected based on one or more lookup tables (LUT)s

2006
The selected power level is a maximum power level from among the plurality of available power levels

2008
The power level is selected from among the plurality of available power levels of the power amplifier when the wireless-power receiver is at most 40 cm from the wireless-power transmission system

2010
The power level is selected from among the plurality of available power levels of the power amplifier when the wireless-power receiver is within 20 cm to 40 cm from the wireless-power transmission system

2012
The power level is between 2 watts and 15 watts

2014
In accordance with a determination that transmitting the RF signal to the wireless-power receiver would satisfy one or more safety thresholds:
2014-a
instruct the power amplifier to amplify the RF signal using the power level to create an amplified RF signal
2014-b
provide the amplified RF signal to one or more antennas, wherein the one or more antennas are caused to, upon receiving the amplified RF signal, radiate RF energy that is focused within an operating area that includes the wireless-power receiver while forgoing any active beamforming control

2014 (cont.)

2016
The one or more safety thresholds include a maximum specific absorption rate (SAR) value of not greater than 2 W/kg, and the determination that transmitting the RF signal would satisfy the one or more safety thresholds is made when it is determined that transmitting the RF signal would create a maximum SAR value of not greater than 2 W/kg at the wireless-power receiver

2018
The one or more safety thresholds include a maximum specific absorption rate (SAR) value of not greater than .8 W/kg, and the determination that transmitting the RF signal would satisfy the one or more safety thresholds is made when it is determined that transmitting the RF signal would create a maximum SAR value of not greater than .8 W/kg at the wireless-power receiver

2020
The one or more safety thresholds include a predetermined roll-off of 3 dB at a predetermined distance increment relative to a peak amount of RF energy produced by radiated RF energy, and the determination that transmitting the RF signal would satisfy the one or more safety thresholds is made when it is determined that transmitting the RF signal would create a peak amount of RF energy at the wireless-power receiver that has the predetermined roll-off of 3 dB for each predetermined distance increment relative to the peak amount of RF energy

2022
The predetermined distance increment is about 8 cm

2024
The wireless-power transmission system includes only a single power amplifier and the one or more antennas include only a single antenna

2026-a
Determine an operational impedance at the power amplifier based on an impedance measurement from among multiple measurement points of the power amplifier

2026-b
The one or more safety thresholds include impedance thresholds indicating that the operational impedance is at a safe level, and the determination that transmitting the RF signal will satisfy the one or more safety thresholds is made when it is predicted that using the power level to amplify the RF signal would keep the operational impedance at the power amplifier within the impedance thresholds

2028-a
Receive an impedance measurement from among the multiple measurement points of the power amplifier

2028-b
Utilize the impedance measurement to retrieve information for stored measurement values for two or more parametric parameters, the stored measurement values for the two or more parametric parameters indicating that the operational impedance is a safe operational impedance for the power amplifier

2028-c
Select the power level upon determining that the operational impedance is a safe operational impedance for the power amplifier

2030-a
Receive an impedance measurement from among multiple measurement points of the power amplifier

2030-b
Utilize the impedance measurement to retrieve information for stored measurement values for two or more parametric parameters, the stored measurement values for the two or more parametric parameters indicating that the operational impedance is a safe operational impedance for the power amplifier

2030-c
Determine a dissipation level corresponding to the retrieved information

2030-d
Decrease the power level upon determining that the dissipation level is above a dissipation threshold

2032
The power level is dynamically determined based on stored data retrieved from one or more data structures while the RF energy is focused within an operating area that includes the wireless-power receiver, and the system does not use any active beamforming control

2034-a
Receive, from one or more sensors, a shut-off indication that indicates that an object is within a predefined shut-off distance of the wireless-power transmission system

2034-b
in response to receiving the shut-off indication, cause the one or more antennas to cease radiating the RF energy

2036
The predefined shut-off distance is approximately 20 cm from the wireless-power transmission system

2038-a
Receiving the indication that the wireless-power receiver is located within one meter of the wireless-power transmission system and is authorized to receive wireless charging from the wireless-power transmission system, and selecting the power level at which to generate the RF signal are performed at a first integrated circuit

2038-b
Controlling and managing one or more operations of the power amplifier including instructing the power amplifier to amplify the RF signal are performed at a second integrated circuit

2040
determining an operational impedance at the power amplifier is performed at the second integrated circuit

2042-a
Receive charging information from the wireless-power receiver

2042-b
Select the power level from among the plurality of available power levels based, at least in part, on the charging information from the wireless-power receiver.

2102
Receive impedance measurements at a plurality of measurement points of the power amplifier and data from one or more sensors, wherein the plurality of measurement points allow measurements of at least an impedance measurement at each respective measurement point

2104
The impedance measurements at the plurality of measurement points include one or more of Voltage at an output of the power amplifier, voltages at points inside a matching network, voltage at a drain of a transistors of the power amplifier, a DC current and voltage consumed by each stage of the power amplifier, and thermistors at different stages of the power amplifier

2106
The plurality of measurement points are measured at multiple output power levels of the power amplifier

2108
The power amplifier includes a thermistor that measures temperature

2110
The thermistor is on a same chip as other components of the power amplifier

2112
Detect presence of a foreign object within 6 inches of the wireless-power transmission system based on the received impedance measurements and the data from one or more sensors, and adjusting radiated radio frequency (RF) energy that is focused within an operating area that includes a wireless-power receiver while the presence of the foreign object is detected

2114
Detect absence of the foreign object within the 6 inches of the wireless-power transmission system based on the received impedance measurements and the data from one or more sensors (or lack thereof), and causing the radiation of the RF energy focused within an operating area that includes the wireless-power receiver upon determining that the foreign object is absent (A)

2202
Dynamically adjusting power distribution for a transmission filed of the antenna provided to a wireless-power receiver, wherein dynamically adjusting the power distribution for the transmission filed includes

2204
At a power amplifier controller integrated circuit (IC), adjusting power provided to the antenna from a power amplifier

2206
The power provided to the antenna from the power amplifier is adjusted based on the power amplifier controller IC detecting a change in impedance

2208
The change in impedance is movement of the wireless-power receiver

2210
Adjust the power distribution for the transmission field based on the adjusted power provided to the antenna from the power amplifier such that

2212
The adjusted power provided is evenly distributed across the power distribution for the transmission field of the antenna

2214
A power loss at an edge of the power distribution for the transmission field of the antenna is reduced from 30% to 10%

2216
The dynamically optimizing the transmitted power signals is performed independent of tuning the antenna

Figure 22

SYSTEMS AND METHODS FOR DETERMINING A KEEP-OUT ZONE OF A WIRELESS POWER TRANSMITTER

RELATED APPLICATION

This application is a continuation of U.S. patent application Ser. No. 17/852,190, filed on Jun. 28, 2022, entitled "Systems And Methods For Controlling And Managing Operation Of One Or More Power Amplifiers To Optimize The Performance Of One Or More Antennas," which is a continuation of U.S. patent application Ser. No. 17/234,696, filed on Apr. 19, 2021, entitled "System For Wirelessly Transmitting Energy Without Using Beam-Forming Control," which is a continuation of U.S. patent application Ser. No. 16/932,631, filed on Jul. 17, 2020, entitled "System For Wirelessly Transmitting Energy At A Near-Field Distance Without Using Beam-Forming Control," which claims priority from U.S. Provisional Patent Application No. 62/955,864, filed Dec. 31, 2019, entitled "System For Wirelessly Transmitting Energy At A Near-Field Distance Without Using Beam-Forming Control," and U.S. Provisional Patent Application No. 63/012,914, filed Apr. 20, 2020, entitled "System For Wirelessly Transmitting Energy At A Near-Field Distance Without Using Beam-Forming Control, And Systems and Methods For Classifying And Detecting Foreign Objects Using A Power Amplifier Controller Integrated Circuit In Wireless Power Transmission Systems," and these related applications are hereby incorporated by reference in their respective entireties.

TECHNICAL FIELD

The present disclosure relates generally to systems for wireless-power transmission, and more particularly to classifying and detecting wireless-power receivers in a wireless charging system using a power amplifier controller integrated circuit (in conjunction with one or more additional sensors), and also to wirelessly transmitting energy at a near-field distance without using beam-forming control.

BACKGROUND

Wireless charging systems for consumer devices typically require complicated, and often, expensive components to transmit and receive wirelessly delivered power. Conventionally, it is difficult for a wireless power transmitter to accurately distinguish a valid wireless power receiver that needs to be charged, versus a foreign object that does not need to be charged. Users have encountered numerous frustrating issues with some conventional charging devices, including having damage caused to objects that include magnetic strips and/or RFID chips (e.g., credits cards, security badges, passports, key fobs, and the like). Moreover, many of these conventional charging devices typically require placing the device to be charged at a specific position around the wireless power transmitter, and the device may not be moved to different positions, without interrupting or terminating the charging of the device. This results in a frustrating experience for many users as they may be unable to locate the device at the exact right position within the charging field of the wireless power transmitter in which to start charging their device, and may further end up with damages to important objects that they use on a daily basis. Furthermore, conventional wireless charging systems do not utilize a dedicated power amplifier controller integrated circuit, let alone one capable of assisting with the classification and detection of foreign objects.

In addition, existing solutions for the wireless transmission of energy have been focused on beam-forming solutions that require formation of multiple beams of energy, in which beams are formed to create focused energy in an operational area. To create this focused energy, many existing solutions use beam-forming, e.g., controlling phase and other waveform characteristics to produce constructive and/or destructive interference patterns to focus power beams onto a device at a certain location. Beam-forming typically requires multiple antennas, beam-forming algorithm control circuitry and/or algorithms, and multiple power amplifiers, all of which add complexity to the system, and add to overall system costs.

As such, it would be desirable to provide systems and methods for wirelessly transmitting and receiving power that address the above-mentioned drawbacks.

SUMMARY

The wireless-power transmission system described herein makes it possible to control a radiation profile using only a single power amplifier continuously during the charging operation to maintain a power level within the transmission field that is controlled to remain within a safe threshold for human beings (and other potentially sensitive objects), thereby addressing some of the problems identified above. The presence of a foreign object can also be detected (e.g., when near and/or on a charging surface, and/or at greater distances with data from one or more sensors) and the power amplifier controller can be used to help produce a selected radiation profile that ensures the system is operating safely (both to protect human users and other sensitive objects, and also to protect system components, such as the power amplifier, as is discussed in more detail below concerning the one or more safety thresholds). Various radiation profiles can be predetermined based on simulation, characterization, and/or manufacturing tests of the wireless-power transmitter device and/or one or more antennas of the transmitter device. In some embodiments, the various radiation profiles are predetermined based on one or more of: transmit power (power received from one or more power amplifiers), static or dynamic antenna tuning (e.g., moving and/or realigning the antenna positions, changing which feed is turned on for a particular antenna, changing physical characteristics of one or more antennas, changing a phase used to feed various antennas (not to focus power at a specific receiver location, but instead to cause the radiation profile to shift generally to the left or to the right), etc.).

In some embodiments, adjustments performed by the wireless-power transmission system are based on predetermined properties and/or characteristics of a wireless-power transmitter device and/or one or more antennas of the transmitter device obtained during simulation, characterization, and/or manufacturing tests. The predetermined properties and/or characteristics of the wireless-power transmitter device and/or one or more antennas of the transmitter device are obtained for different operating conditions (e.g., operating power level, number of wireless-power receivers in a transmission area, location of the receivers, etc.) and/or configurations of the wireless-power transmitter device (e.g., number of antennas, power amplifiers, etc.). These predetermined properties and/or characteristics can be determined with reference to one or more Smith charts and then stored in a data structure (e.g., a lookup table) for reference in selecting appropriate operational values (as discussed in more detail below with respect to selecting an appropriate operational impedance).

In some embodiments, the wireless-power transmission techniques (e.g., selecting an appropriate operational impedance) described herein are initiated by a wireless-power receivers and/or foreign object (organic or inorganic) coming into contact with the wireless-power transmission system (e.g., a charging surface of the transmitter device). Alternatively or additionally, in some embodiments, the wireless-power transmission system includes one or more sensors that provide additional information for detecting and/or classifying wireless-power receivers and/or foreign objects within an operating (or working) area (not in direct contact with a charging surface).

In some embodiments, the wireless-power transmission system controls formation of local RF energy by controlling e-field roll-off, e.g., fast decrease of the electric field strength with increased distance from the RF transmitter, as described herein. The localized RF energy controlled by the wireless-power transmission system and fast roll-off of the e-field as distance increases from a transmitter meet US and international SAR requirements. In some embodiments, e-field roll-off determinations and and/or the SAR values for different operating conditions (e.g., operating power level, number wireless-power receivers, location of the receivers, etc.) are determined during simulation, characterization, and manufacture tests of the wireless-power transmitter device and/or one or more antennas of the transmitter device. Thus, the system is able to produce radiation profiles (selected from among the various radiation profiles discussed above) that are known to comply with e-field roll-off and SAR requirements (e.g., because the system only operates using values that are known to produce radiation profiles that were determined to comply with required e-field roll-off and SAR requirements).

The compact, and cost-efficient, design of the wireless-power transmission system disclosed herein includes a power amplifier (e.g., in some embodiments only a single power amplifier that feeds a single antenna) that dynamically changes an electromagnetic field radiation level and profile based on information from one or more sensors (e.g. capacitive sensors time-of-flight sensors (e.g., ultrasonic time-of-flight sensors etc.), impedance measurements, and/or from information received from wireless-power receivers via an out-of-band BLE link (or other communication protocol). In some embodiments, the wireless-power transmission system disclosed herein eliminates the need to use a complicated beam-forming system (e.g., even if beam-forming control is available, the system does not need to use it to produce controlled delivery of wirelessly-transmitted energy) that requires additional bulky electronic components, and multiple expensive power amplifiers to control/feed multiple antennas.

In some embodiments, the wireless-power transmission system disclosed herein includes multiple pairs of antennas and power amplifiers (only one power amplifier and one antenna in each pair). Each pair of antenna and power amplifier is responsible for a certain charging area, such that the pair of antenna and power amplifier controls charging to any receiver that is detected to be within the certain charging area, and this controlled charging is performed without using any beam-forming control. In some embodiments, the wireless-power transmission system includes only one power amplifier that feeds multiple antennas, in addition to, or as an alternative for, the system including multiple pairs of power amplifiers and antennas (e.g., by feeding different antennas using a single power amplifier, cost of the overall system is reduced, but the system is still able to assign antennas to various charging areas). In some other embodiments, the wireless-power transmission system disclosed herein includes multiple groups of antennas and power amplifiers (only one power amplifier and multiple antennas in each group). Each group of multiple antennas and power amplifier is responsible for a certain charging area, such that the group of multiple antennas and power amplifier controls charging to any receiver that is detected to be within the certain charging area, and this controlled charging is performed without using any beam-forming control. The antenna or antennas can support a fixed or programmable RF energy pattern (or profile) controlled via an RF algorithm at the transmitter that limits the power amplifier energy level, controls the RF energy pattern, and results in a charging area which is within the limits of regulatory requirements to meet E-field and SAR levels (for instance, in compliance with Part 15 or Part 18 of Federal Communications Commission (FCC) requirements). This is explained in more detail below, e.g., with reference to FIGS. 3, 5, and 14A-17.

Different embodiments of wireless-power transmitter device can include i) a single power amplifier and a single antenna, ii) a single power amplifier and two or more antennas, the power amplifier coupled to each antenna via one or more feeds, iii) a single power amplifier with two or more antennas, the power amplifier selectively coupled to an antenna via one or more switches, iv) a single power amplifier with two or more antennas, the power amplifier coupled to the antennas via one or more splitters, v) two or more power amplifiers and a single antenna, vi) two or more power amplifiers and two or more antenna, a single power amplifier coupled to a single antenna, vii) two or more power amplifiers and two or more antenna, the power amplifiers dynamically configured to couple with the antennas. Different combinations of the embodiments described above can be used. Each of the above-described embodiments include a power amplifier controller integrated circuit, as described herein, and/or other components to perform the methods described below.

In some embodiments, the wireless-power transmission system described herein includes a power amplifier controller integrated circuit for managing and controlling operation of the power amplifier. The power amplifier controller integrated circuit controls the power amplifier to provide an RF signal that, when provided to the one or more antennas, causes transmission of RF energy that does not harm humans, foreign objects, and/or the power amplifier. The power amplifier controller integrated circuit can be used to select an appropriate power level that optimizes the performance of the power amplifier. The power amplifier controller integrated circuit can also be used to detect changes in impedance, classify a receiver, locate a receiver, and a number of other functions described below with reference to FIGS. 4-13 (e.g., use stored lookup tables to determine safe operating values for the PA based on the detected changes in impedance).

The wireless-power transmission system disclosed herein includes the functionality of a Near Field Plus (NF+) system capable of delivering wireless-power over the air from a transmitter device to multiple receivers within a charging area (but not in direct contact with the transmitter device). The NF+ system is optimized/characterized for cost, performance, and regulatory compliance. An NF+ range, for purposes of the present disclosure, refers to the region around the transmitter device that is within approximately one and a half wavelengths or less (of a power wave to be transmitted by the transmitter device at a certain frequency). In some embodiments, the wireless-power transmission system described herein can be used in one or more of: near-field, NF+, mid-field, and far-field transmission applications. Near-field refers to the region around the transmission antenna that is within approximately one wavelength or less (of a power wave to be transmitted by the transmitter device at a certain frequency). Far-field refers to the region around the transmission antenna that is approximately two wavelengths or more (of a power wave to be transmitted by the transmitter device at a certain frequency). Mid-field refers to the region between near field and far field. For example, when the frequency of a transmission wave is 2.4 GHz, the NF+ range is equal or within around 0.188 m, the near-field range is equal or within around 0.125 m, the mid-field range is from around 0.125 m to around 0.25 m, and the far-field range is equal or greater than around 0.25 m. In another example, when the frequency of the transmission wave is 5 GHz, the NF+ range is equal or within around 0.09 m, the near-field range is equal or within around 0.06 m, the mid-field range is from around 0.06 m to around 0.12 m, and the far-field range is equal or greater than around 0.12 m.

In one example, references to near-field transmission refer to radiation of electromagnetic waves by an antenna (e.g., the loop antenna described herein) for distances up to approximately a wavelength of an operating frequency of the antenna (e.g., a wavelength of an operating frequency of 5.8 GHz is approximately 5.17 centimeters, so the near-field transmission distance of the antenna in this example would be approximately 5.17 centimeters). In some embodiments, the operating frequency ranges from 400 MHz to 60 GHz. For the purposes of the following description, a near-field power transmitter (or near-field radio-frequency power transmitter) is a wireless-power-transmitting device that includes one or more wireless-power transmitters, each of which is configured to radiate electromagnetic waves to receiver devices that are located within a near-field distance of the power transmitter (e.g., within 0-5.17 centimeters of the power transmitter, if the one or more wireless-power transmitters of the power transmitter are using an operating frequency of 5.8 GHz).

(A1) In accordance with some embodiments, a wireless-power transmission system includes one or more integrated circuits. The one or more integrated circuits are configured to receive an indication that a wireless-power receiver is located within one meter of the wireless-power transmission system and is authorized to receive wirelessly-delivered power from the wireless-power transmission system. The one or more integrated circuits are configured to, in response to receiving the indication, select a power level from among a plurality of available power levels at which to amplify a radio frequency (RF) signal using the power amplifier. The power level can be selected from among available power levels stored in one or more lookup tables (LUT)s, where the available power levels have been predetermined to ensure that the system will produce a radiation profile that complies with safety requirements. The one or more integrated circuits are further configured to, in accordance with a determination that transmitting the RF signal to the wireless-power receiver would satisfy one or more safety thresholds (e.g., the safety thresholds can include user-safety thresholds and power-amplifier-protection thresholds, thus ensuring safety for humans and protection of system components), instruct the power amplifier to amplify the RF signal using the power level to create an amplified RF signal, and provide the amplified RF signal to the one or more antennas, wherein the one or more antennas are caused to, upon receiving the amplified RF signal, radiate RF energy that is focused within an operating area that includes the wireless-power receiver while forgoing any active beamforming control.

(A2) In some embodiments of A1, the selected power level is a maximum power level from among the plurality of available power levels.

(A3) In some embodiments of any one of A1 and A2, the wireless-power-transmission system includes only a single power amplifier and the one or more antennas include only a single antenna. An example of this is demonstrated and described with reference to FIG. 3.

(A4) In some embodiments of any one of A1-A3, the one or more safety thresholds include a maximum specific absorption rate (SAR) value of not greater than 2 W/kg, and the determination that transmitting the RF signal would satisfy the one or more safety thresholds is made when it is determined that transmitting the RF signal would create a maximum SAR value of not greater than 2 W/kg at the wireless-power receiver.

(A5) In some embodiments of A4, the one or more safety thresholds include a maximum specific absorption rate (SAR) value of not greater than 0.8 W/kg, and the determination that transmitting the RF signal would satisfy the one or more safety thresholds is made when it is determined that transmitting the RF signal would create a maximum SAR value of not greater than 0.8 W/kg at the wireless-power receiver.

(A6) In some embodiments of any one of A1-A5, the one or more safety thresholds include a predetermined roll-off of 3 dB at a predetermined distance increment relative to a peak amount of RF energy produced by radiated RF energy, and the determination that transmitting the RF signal would satisfy the one or more safety thresholds is made when it is determined that transmitting the RF signal would create a peak amount of RF energy at the wireless-power receiver that has the predetermined roll-off of 3 dB for each predetermined distance increment relative to the peak amount of RF energy. An example of this is demonstrated and described with reference to FIGS. 16-17.

(A7) In some embodiments of A6, the predetermined distance increment is about 8 cm.

(A8) In some embodiments of any one of A1-A7, the one or more integrated circuits are further configured to determine an operational impedance at the power amplifier based on an impedance measurement from among multiple measurement points of the power amplifier, and the one or more safety thresholds include impedance thresholds indicating that the operational impedance is at a safe level, and the determination that transmitting the RF signal will satisfy the one or more safety thresholds is made when it is predicted that using the power level to amplify the RF signal would keep the operational impedance at the power amplifier within the impedance thresholds. An example of this is demonstrated and described with reference to FIGS. 4-5 and 7-13.

(A9) In some embodiments of A8, the one or more integrated circuits are further configured to receive an impedance measurement from among the multiple measurement points of the power amplifier. The one or more integrated circuits are configured to utilize the impedance measurement to perform a lookup in the one or more LUTs. Based on the lookup, stored measurement values for the two or more parametric parameters are returned and used to determine an operational impedance (safe operational impedance) for the power amplifier. The one or more integrated circuits are further configured to cause the power amplifier to operate using the power level and the operational impedance. Example visual representations of the above features are described below with reference to FIGS. 7-9.

(A10) In some embodiments of A9, the one or more integrated circuits are further configured to determine a dissipation level associated with the operational impedance (while operating the PA at the power level), and decrease the power level upon determining that the dissipation level associated with the operational impedance is above a dissipation threshold. An example of this is demonstrated and described with reference to FIGS. 10-13.

(A11) In some embodiments of any one of A9 and A10, the power level is dynamically determined based on stored data retrieved from one or more data structures while the RF energy is focused within an operating area that includes the wireless-power receiver, and the system does not use any active beamforming control.

(A12) In some embodiments of any one of A1-A11, the one or more integrated circuits are configured to receive, from one or more sensors, a shut-off indication that indicates that an object is within a predefined shut-off distance of the wireless-power transmission system, and in response to receiving the shut-off indication, cause the one or more antennas to cease radiating the RF energy. An example of this is demonstrated and described with reference to FIGS. 14A-14E.

(A13) In some embodiments of A12, the predefined shut-off distance is approximately 20 cm from the wireless-power transmission system.

(A14) In some embodiments of any one of A1-A13, the power level is selected from among the plurality of available power levels of the power amplifier when the wireless-power receiver is at most 40 cm from the wireless-power transmission system.

(A15) In some embodiments of any one of A1-A14, the power level is selected from among the plurality of available power levels of the power amplifier when the wireless-power receiver is within 20 cm to 40 cm from the wireless-power transmission system.

(A16) In some embodiments of any one of A1-A15, the power level is between 2 watts and 15 watts.

(A17) In some embodiments of any one of A1-A16, the one or more integrated circuits include a first integrated circuit and a second integrated circuit, wherein the first integrated circuit is configured to receive the indication that the wireless-power receiver is located within one meter of the wireless-power transmission system and is authorized to receive wireless charging from the wireless-power transmission system, and select the power level at which to generate the RF signal, and the second integrated circuit is configured to control and manage one or more operations of the power amplifier including instructing the power amplifier to amplify the RF signal. An example of this is demonstrated and described with reference to FIGS. 1B-3.

(A18) In some embodiments of any one of A1-A17, the wireless-power-transmission system further includes a communication radio coupled to the one or more integrated circuits, wherein the communication radio is configured to receive charging information from the wireless-power receiver, and the one or more integrated circuits are configured to select the power level from among the plurality of available power levels based at least in part on the charging information.

(A19) In another aspect, a method includes receiving an indication that a wireless-power receiver is located within one meter of a wireless-power transmission system and is authorized to receive wirelessly-delivered power from the wireless-power transmission system. The method includes, in response to receiving the indication, selecting a power level from among a plurality of available power levels at which to amplify a radio frequency (RF) signal using the power amplifier. The method further includes, in accordance with a determination that transmitting the RF signal to the wireless-power receiver would satisfy one or more safety thresholds, instructing the power amplifier to amplify the RF signal using the power level to create an amplified RF signal, and providing the amplified RF signal to the one or more antennas, wherein the one or more antennas are caused to, upon receiving the amplified RF signal, radiate RF energy that is focused within an operating area that includes the wireless-power receiver while forgoing any active beamforming control.

(A20) In some embodiments, the method of A19 further includes features in accordance with any of A2-A18.

(A21) In accordance with some embodiments, a non-transitory, computer-readable storage medium is provided, the storage medium storing instructions that, when executed by a processor in a computer, cause the computer to perform a method, the method including receiving an indication that a wireless-power receiver is located within one meter of a wireless-power transmission system and is authorized to receive wirelessly-delivered power from the wireless-power transmission system. The method includes, in response to receiving the indication, selecting a power level from among a plurality of available power levels at which to amplify a radio frequency (RF) signal using the power amplifier. The method further includes, in accordance with a determination that transmitting the RF signal to the wireless-power receiver would satisfy one or more safety thresholds, instructing the power amplifier to amplify the RF signal using the power level to create an amplified RF signal, and providing the amplified RF signal to the one or more antennas, wherein the one or more antennas are caused to, upon receiving the amplified RF signal, radiate RF energy that is focused within an operating area that includes the wireless-power receiver, while forgoing any active beamforming control.

(A22) In some embodiments, the storage-medium of A21 further includes instructions to perform or cause performance of features in accordance with any of A2-A18.

(B1) In accordance with some embodiments, a wireless-power transmission system, includes a power amplifier including a plurality of measurement points that allow measurements of at least an impedance measurement at each respective measurement point, and one or more integrated circuits. The one or more integrated circuits are configured to receive impedance measurements at the plurality of measurement points. In some embodiments, the one or more integrated circuits are configured to receive data from one or more sensors as well. The one or more integrated circuits are configured to detect a presence of a foreign object within 6 inches of the wireless-power transmission system based on the received impedance measurements and, optionally, the data from the one or more sensors, and adjust radiated radio frequency (RF) energy that is focused within an operating area that includes the wireless-power receiver while the presence of the foreign object is detected. The one or more integrated circuits are further configured to detect absence of the foreign object within the 6 inches of the wireless-power transmission system based on the received impedance measurements and, optionally, the data from the one or more sensors (or lack thereof), and cause the radiation of the RF energy focused within an operating area that includes a the wireless-power receiver upon determining that the foreign object is absent. An example of this is demonstrated and described with reference to FIGS. 4-6.

(B2) In some embodiments of B1, the one or more integrated circuits are further configured to use the plurality of measurement points and/or the data from the one or more sensors with one or more lookup tables (LUTs) to determine an operational impedance at the power amplifier. An example of this is demonstrated and described with reference to FIGS. 7-13.

(B3) In some embodiments of any one of B1 and B2, the impedance measurements at the plurality of measurement points include one or more of voltage at an output of the power amplifier, voltages at points inside a matching network, voltage at a drain of a transistors of the power amplifier, a DC current and voltage consumed by each stage of the power amplifier, and thermistors at different stages of the power amplifier.

(B4) In some embodiments of B3, the plurality of measurement points are measured at multiple output power levels of the power amplifier.

(B5) In some embodiments of any one of B1-B4, the power amplifier includes a thermistor that measures temperature.

(B6) In some embodiments of B5, the thermistor is on a same chip as other components of the power amplifier.

(B7) In some embodiments of any one of B1-B6, the one or more integrated circuits are further configured to store one or more measurements values from the plurality of measurement points and/or data from the one or more sensors for subsequent analysis.

(B8) In some embodiments of any one of B1-B7, the one or more integrated circuits are further configured to synchronize turn-on of power amplifier bias circuits, and turn-on of a power amplifier power supply network.

(B9) In some embodiments of B8, the power amplifier includes a single digital input pin and configured to synchronize turn-on of power amplifier bias circuits, and turn-on of a power amplifier power supply network via the single digital input pin.

(B10) In some embodiments of any one of B1-B9, the one or more integrated circuits are further configured to synchronize shut-down of various components of the power amplifier.

(B11) In some embodiments of B10, the power amplifier includes a single digital input pin and the one or more integrated circuits are configured to synchronize shut-down of various components of the power amplifier via the single digital input pin.

(B12) In some embodiments of any one of B1-B11, the one or more integrated circuits are further configured to adjust output power and bias conditions of the power amplifier to maintain optimum efficiency and output power.

(B13) In some embodiments of B2, the one or more integrated circuits are further configured to determine a power level at which to generate the radio frequency (RF) signal that satisfies on one or more power amplifier operation criteria that protect the power amplifier from damage, and a determination that the power level would satisfy the one or more power amplifier operation criteria is based, at least in part, on the operational impedance at the power amplifier.

(B14) In some embodiments of B13, the one or more integrated circuits are further configured to instruct the power amplifier to shut down if the one or more power amplifier operation criteria is not satisfied.

(B15) In some embodiments of any one of B1-B14, the power amplifier is a GaN (Gallium Nitride) power amplifier.

(B16) In some embodiments of any one of B1-B15, the power amplifier is a Class E amplifier.

(B17) In accordance with some embodiments, a method includes receiving impedance measurements at a plurality of measurement points from a power amplifier. The method includes detecting a presence of a foreign object within 6 inches of the wireless-power transmission system based on the provided impedance measurements, and adjusting radiated radio frequency (RF) energy that is focused within an operating area that includes the wireless-power receiver while the presence of the foreign object is detected. The method further includes detecting absence of the foreign object within the 6 inches of the wireless-power transmission system, and causing the radiation of the RF energy focused within an operating area that includes the wireless-power receiver upon determining that the foreign object is absent.

(B18) In some embodiments of B17, the method is further configured in accordance with the features of any of B2-B16.

(B19) In accordance with some embodiments, a non-transitory, computer-readable storage medium is provided, the storage medium storing instructions that, when executed by a processor in a computer, cause the computer to perform a method, the method including receiving impedance measurements at a plurality of measurement points from a power amplifier. The method includes detecting a presence of a foreign object within 6 inches of the wireless-power transmission system based on the provided impedance measurements, and adjusting radiated radio frequency (RF) energy that is focused within an operating area that includes the wireless-power receiver while the presence of the foreign object is detected. The method further includes detecting absence of the foreign object within the 6 inches of the wireless-power transmission system, and causing the radiation of the RF energy focused within an operating area that includes the wireless-power receiver upon determining that the foreign object is absent.

(B20) In some embodiments of B19, the storage-medium is further configured in accordance with the features of any of B2-B16.

(C1) In accordance with some embodiments, a method of operating an antenna is provide, and the method includes dynamically adjusting power distribution for a transmission field of the antenna provided to a wireless-power receiver. Dynamically adjusting the power distribution for the transmission field includes, at a power amplifier controller integrated circuit (IC), adjusting power provided to the antenna from a power amplifier, and adjusting the power distribution for the transmission field based on the adjusted power provided to the antenna from the power amplifier. The power distribution for the transmission field is adjusted such that the adjusted power provided is evenly distributed across the power distribution for the transmission field of the antenna, and a power loss at an edge of the power distribution for the transmission field of the antenna is reduced from 30% to 10%.

(C2) In some embodiments of C1, the power provided to the antenna from the power amplifier is adjusted based on the power amplifier controller IC detecting a change in impedance.

(C3) In some embodiments of C2, the change in impedance is movement of the wireless-power receiver.

(C4) In some embodiments of any one of C1-C3, dynamically optimizing the transmitted power signals is performed independent of tuning the antenna.

(C5) In some embodiments, a non-transitory, computer-readable storage medium is provided that includes instructions to perform or cause performance of the features of any of C1-C4.

(C6) In some embodiments, a method is provided to perform or cause performance of the features of any of C1-C4.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 14A is an isometric illustration of a device (e.g., an electronic device, such as a smart speaker) with an included wireless-power transmitter in accordance with some embodiments.

FIGS. 20A-20D are flow diagrams showing a method of wirelessly-transmitting energy to a receiver device without using active beam-forming control in accordance with some embodiments.

FIGS. 21A-21C are flow diagrams showing a method of controlling and/or managing operation of one or more power amplifiers in accordance with some embodiments.

FIG. 22 is flow diagram showing a method of controlling and/or managing operation of one or more power amplifiers to optimize the performance of one or more antennas in accordance with some embodiments.

DETAILED DESCRIPTION

Figure 1A:
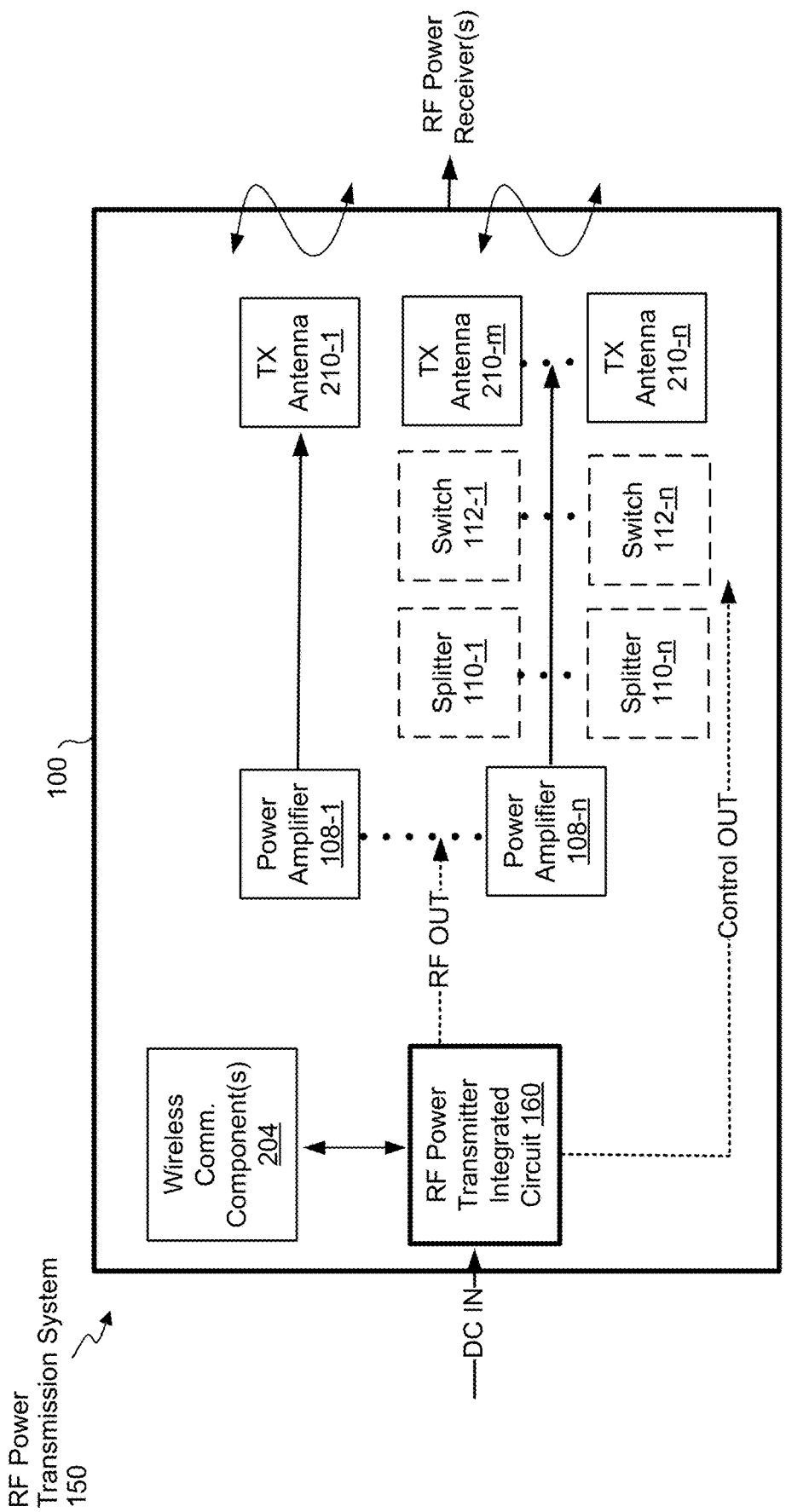
FIG. 1A is a block diagram of an RF wireless-power transmission system in accordance with some embodiments.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

In some existing wireless-power charging systems using beam-forming, a pocket of energy can be formed at locations where power waves transmitted by a transmitter constructively interfere. The pockets of energy may manifest as a three-dimensional field where energy may be harvested by receivers located within or proximate to the pocket of energy. In operation, the pocket of energy produced by the transmitters during pocket-forming processes may be harvested by a receiver, converted to an electrical charge, and then provided to an electronic device (e.g., laptop computer, smartphone, rechargeable battery) associated with the receiver to operate the device or to charge the device's battery.

"Pocket-forming" may refer to generating one or more RF waves that converge in a transmission field, forming controlled pockets of energy and null spaces. A "pocket of energy" may refer to an area or region of space where energy or power may accumulate based on a convergence of waves causing constructive interference at that area or region. The "null-space" may refer to areas or regions of space where pockets of energy do not form, which may be caused by destructive interference of waves at that area or region.

The conventional use of beam-forming may require multiple antennas and multiple power amplifiers, and complex algorithms to effectively charge an electronic device coupled with a wireless-power receiver. That approach can require complicated and expensive equipment and processes. In contrast, the wireless-power transmission systems and methods disclosed herein may use a single power amplifier to control a power transmission level and profile of an antenna's radiated energy, while still keeping radiated power levels in the transmission range of the antenna within a safe level that also complies with various regulatory requirements. In this way, the inventive systems and methods described herein are able to use a minimal number of system components (e.g., a single power amplifier, and no beam-forming components, or is able to disable use of beam-forming components) to achieve safe transmission of wirelessly-delivered energy in both consumer and commercial environments.

A transmitter device can be an electronic device that comprises, or is otherwise associated with, various components and circuits responsible for, e.g., generating and transmitting power waves, forming transmission energy within a radiation profile at locations in a transmission field, monitoring the conditions of the transmission field, and adjusting the radiation profile where needed. The radiation profile described herein refers to a distribution of energy field within the transmission range of a transmitter device or an individual antenna (also referred to as a "transmitter"). As was discussed above, various radiation profiles can be available to the transmitter device, where the various radiation profiles are predetermined based on simulation, characterization, and/or manufacture tests of the transmitter device to ensure that each radiation profile complies with e-field roll-off and SAR requirements.

The transmitter device may generate and transmit, or otherwise adjust, transmitted RF power so that the SAR value for the RF energy at a particular location in an operating area of the transmitter device does not exceed a predetermined SAR threshold value (this determination regarding the SAR value can be conducted based on ad-hoc measurements, or can be based on expected SAR values that are based on simulation, characterization, and/or manufacture tests of the transmitter device). Safety techniques that can be utilized by the transmitter are described in more detail below. In some embodiments in which the transmitter device uses expected SAR values, the transmitter device does not need to perform ad-hoc measurements of SAR, thus, the wireless-power transmitter device can determine whether the predetermined SAR threshold is satisfied without the need of additional processing (e.g., forgoing SAR calculations during operation by referencing stored SAR values for when the transmitter device is using certain operating characteristics such as PA output power, transmission frequency, etc.).

In some embodiments, the wireless-power transmitter device is configured to produce its radiation profile within an operating area (also referred to as a working area). In some embodiments, the operating area is directly in front of the transmitter and/or an area around the transmitter device in which power can be received by a wireless-power receiver above some minimum threshold (e.g., minimum power to charge the wireless-power receiver, as described herein). In some embodiments, the operating area is typically expressed in radius/angle format (as discussed in more detail below). In some embodiments, the operating area is a function of: i) the transmit power, ii) the transmit antenna radiation profile (as described above), the receiver antenna reception pattern (e.g., receiver of the wireless-power receiver), the wireless-power receiver power conversion efficiency. In some embodiments, the operating area is further a function of tabletop material and/or RF channel properties. The operating area is described in detail below in reference to, e.g., FIGS. 14D and 14E.

In some embodiments, the wireless-power transmitter device includes an keep out area (also referred to as a keep out zone). In some embodiments, the keep out zone is an area around the transmitter device in which one or more safety thresholds will not be satisfied (as described below). In some embodiments, the keep out zone is an area around the transmitter device in which, at a minimum, SAR values (e.g., calculated and/or predetermined by simulation, characterization, and/or manufacture tests) are above a predetermined SAR threshold. In some embodiments, the keep out zone is typically expressed in radius/angle format. In some embodiments, the keep out zone is a function of the transmit power, and/or the transmit antenna radiation profile (as described above). In some embodiments, the keep out zone is further a function of tabletop material and/or RF channel properties. The keep out zone is described in detain below in reference to FIGS. 14D and 14E.

In some embodiments, the wireless-power transmitter device is a Near Field charging pad. In some embodiments, the Near Field charging pad, is configured to initiate once a receiver and/or foreign object is in physical contact with wireless-power transmitter device. In some embodiments, measurements of the antenna (e.g., when the antenna is unloaded/open, or with ideal coupling alignment) are obtained from factory manufacture tests, simulations, and/or characterization. In some embodiments, the Near Field charging pad is calibrated at a factory with the wireless-power transmission system and/or methods disclosed herein. In some embodiments, the wireless-power transmission system and/or methods are further calibrated to operate with one or more antennas installed in the Near Field charging pad. In other words, in some embodiments, the radiation profile, SAR values, data (e.g., impedance values) from one or more measurement points, operational scenarios for the Near Field charging pad, and/or other Near Field charging pad configurations are determined at a factory and stored in memory for use during operation. For example, nominal impedance within tolerances for the Near Field charging pad can be measured during factory calibration and stored. In some embodiments, during operation, a receiver in different positions and state of charge creates a measurable impedance displacement from the stored values. In some embodiments, the Near Field charging pad can perform bias correction and/or tuning to protect and optimize the system performance.

In some embodiments, the wireless-power transmitter device is an NF+ system. The NF+ system is configured to operate when a receiver is placed on and/or near the NF+ system, and/or when the receiver is within an operational area. In some embodiments, the NF+ system includes one or more sensors that provide additional data that can be used to perform the operations described herein (e.g., receiver detection and/or classification). In some embodiments, measurements of the antenna (e.g., gain and coupling) are obtained from factory manufacture tests, simulations, and/or characterization. In some embodiments, the NF+ system is calibrated at a factory with the wireless-power transmission system and/or methods disclosed herein. In some embodiments, the wireless-power transmission system and/or methods are further calibrated to operate with one or more antennas installed in the NF+ system (e.g., similar to the calibrations discussed above for the NF charging pad). For example, nominal impedance within tolerances for the NF+ system can be measured during factory calibration and stored. In some embodiments, the NF+ system can perform initial bias correction and/or tuning to optimize the transmitter device (e.g., NF+ system) in an environment (e.g., location in which the transmitter device operates). In some embodiments, during operation, a receiver in the operating area may cause detectable displacements (e.g., detectable with the assistance of the one or more sensors).

In some embodiments, a receiver near to and/or touching the transmitter device (e.g., no more than 3 inches between the receiver and a housing of the transmitter device system) will result in a measurable displacement that is measured without needing additional data from one or more sensors to recognize the receiver's presence. In some embodiments, when the receiver is not moving and is near to and/or touching the transmitter device, the transmitter device (e.g., the NF+ system) uses bias correction and/or tuning to protect and optimize system performance (as discussed in more detail below concerning selection of an operational impedance). In some embodiments, if the receiver moves quickly near the transmitter device, the transmitter device (e.g., the NF+ system) is caused to trigger receiver acquisition as disclosed herein.

A receiver (also referred to as a wireless-power receiver) can be an electronic device that comprises at least one antenna, at least one rectifying circuit, and at least one power converter, which may utilize energy transmitted in the transmission field from a transmitter for powering or charging the electronic device.

FIG. 1A is a block diagram of an RF wireless-power transmission system 150 in accordance with some embodiments. In some embodiments, the RF wireless-power transmission system 150 includes a far-field transmitter device (not shown). In some embodiments, the RF wireless-power transmission system 150 includes an RF power transmitter device 100 (also referred to herein as a near-field (NF) power transmitter device 100 or wireless-power transmitter device 100). In some embodiments, the RF power transmitter device 100 includes an RF power transmitter integrated circuit 160 (described in more detail below). In some embodiments, the RF power transmitter device 100 includes one or more communications components 204 (e.g., wireless communication components, such as WI-FI or BLUETOOTH radios), discussed in more detail below with reference to FIG. 2A. In some embodiments, the RF power transmitter device 100 also connects to one or more power amplifier units 108-1, . . . 108-$n$ to control operation of the one or more power amplifier units when they drive external power-transfer elements (e.g., power-transfer elements, such as transmission antennas 210-1 to 210-$n$). In some embodiments, a single power amplifier, e.g. 108-1 is controlling one antenna 210-1. In some embodiments, RF power is controlled and modulated at the RF power transmitter device 100 via switch circuitry as to enable the RF wireless-power transmission system to send RF power to one or more wireless receiving devices via the TX antenna array 210. In some embodiments, a single power amplifier, e.g. 108-$n$ is controlling multiple antennas 210-$m$ to 210-$n$ through multiple splitters (110-1 to 110-$n$) and multiple switches (112-1 to 112-$n$).

In some embodiments, the communication component(s) 204 enable communication between the RF power transmitter device 100 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some embodiments, the communication component(s) 204 receives charging information from the wireless-power receiver (or from an electronic device configured to be charged by the wireless-power receiver, e.g., a hearing aid that is coupled with the wireless-power receiver). In some embodiments the charging information is received in a packet of information that is received in conjunction with an indication that the wireless-power receiver is located within one meter of the RF power transmitter device 100. In some embodiments, the charging information includes the location of the wireless-power receiver within the transmission field of the RF power transmitter device 100. In some embodiments, the charging information indicates that a receiver is authorized to receive wirelessly-delivered power from the RF power transmitter device 100. In other words, the wireless-power receiver can use a wireless communication protocol (such as BLE) to transmit the charging information as well as authentication information to the one or more integrated circuits of the RF power transmitter device 100. In some embodiments, the charging information also includes general information such as charge requests from the receiver, the current battery level, charging rate (e.g., effectively transmitted power or RF energy successfully converted to usable energy), device specific information (e.g., temperature, sensor data, receiver requirements or specifications, etc.), etc.

In some instances, the communication component(s) 204 are not able to communicate with wireless-power receivers for various reasons, e.g., because there is no power available for the communication component(s) to use for the transmission of data signals or because the wireless-power receiver itself does not actually include any communication component of its own. As such, in some optional embodiments, near-field power transmitters described herein are still able to uniquely identify different types of devices and, when a wireless-power receiver is detected, figure out if that wireless-power receiver is authorized to receive wireless-power.

Figure 1B:
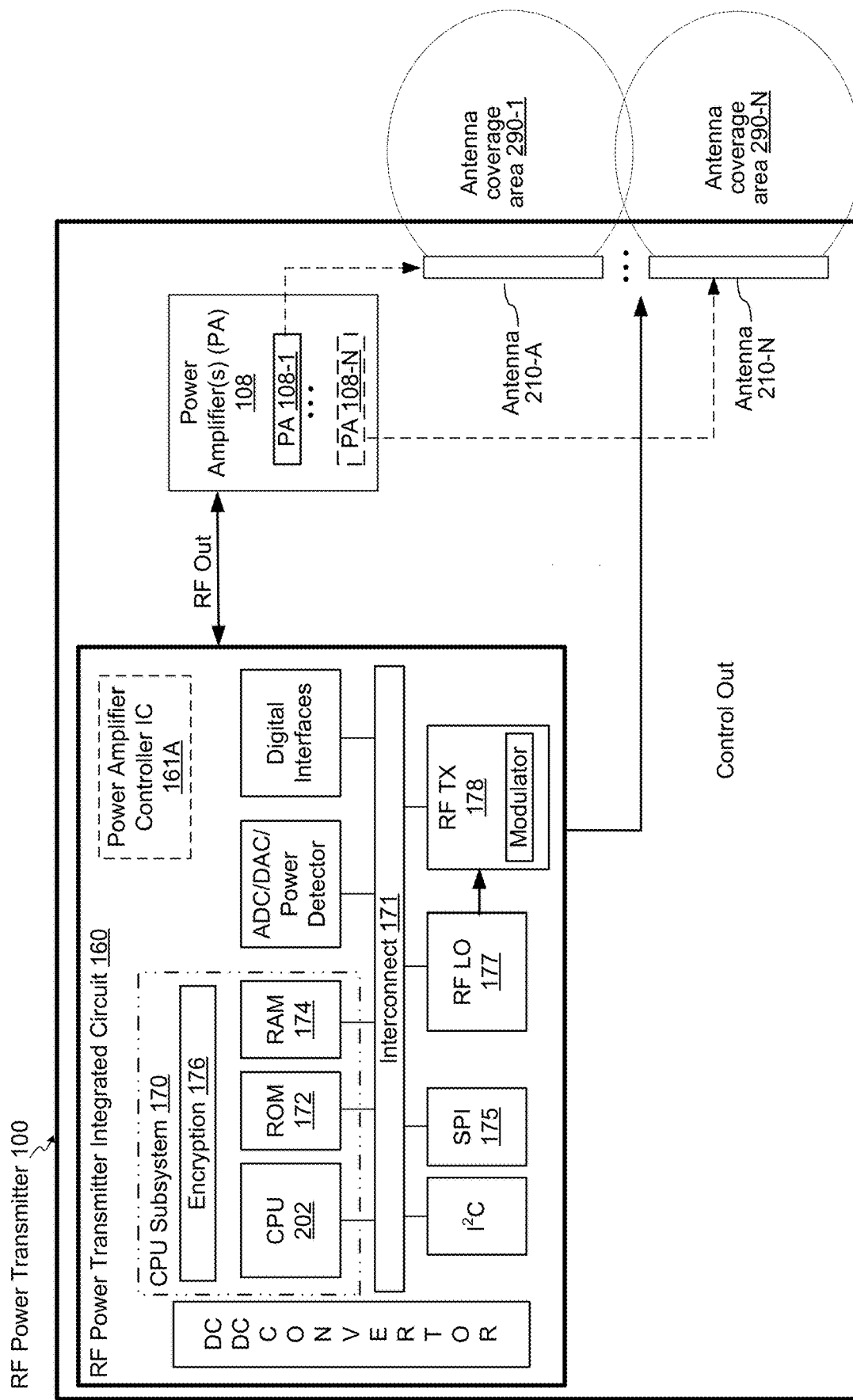
FIG. 1B is a block diagram showing components of an example RF power transmission system that includes an RF power transmitter integrated circuit and antenna coverage areas in accordance with some embodiments.

FIG. 1B is a block diagram of the RF power transmitter integrated circuit 160 (the "RFIC") in accordance with some embodiments. In some embodiments, the RFIC 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g., an I2C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless-power receivers that attempt to receive wirelessly delivered power from the RF power transmitter device 100.

In some embodiments, the RFIC 160 also includes (or is in communication with) a power amplifier controller IC 161A (PAIC) that is responsible for controlling and managing operations of a power amplifier, including, but not limited to, reading measurements of impedance at various measurement points within the power amplifier, instructing the power amplifier to amplify the RF signal, synchronizing the turn on and/or shutdown of the power amplifier, optimizing performance of the power amplifier, protecting the power amplifier, and other functions discussed herein. In some embodiments, the impedance measurement are used to allow the RF power transmitter device 100 (via the RFIC 160 and/or PAIC 161A) to detect of one or more foreign objects, optimize operation of the one or more power amplifiers, assess one or more safety thresholds, detect changes in the impedance at the one or more power amplifiers, detect movement of the receiver within the wireless transmission field, protect the power amplifier from damage (e.g., by shutting down the PA, changing a selected power level of the PA, and/or changing other configurations of the RF power transmitter device 100), classify a receiver (e.g., authorized receivers, unauthorized receivers, and/or receiver with an object), compensate for the power amplifier (e.g., by making hardware, software, and/or firmware adjustments), tune the RF power transmitter device 100 system, and/or other functions. Additional detail on the one or more functions of the PAIC 161A are discussed below in FIGS. 4-6.

In some embodiments, the PAIC 161A may be on the same integrated circuit as the RF IC 160. Alternatively or additionally, the PAIC 161A may be on its own integrated circuit that is separate from (but still in communication with) the RF IC 160. In some embodiments, the PAIC 161A is on the same chip with one or more of the Power Amplifiers (PAs) 108. In some other embodiments, the PAIC 161A is on its own chip that is a separate chip from the PAs 108. In some embodiments, the PAIC 161A may be on its own integrated circuit that is separate from (but still in communication with) the RF IC 160 enables older systems to be retrofitted. In some embodiments, the PAIC 161A as a standalone chip communicatively coupled to the RF IC 160 can reduce the processing load and potential damage from over-heating. Alternatively or additionally, in some embodiments, it is more efficient to design and use two different ICs (e.g., the RF IC 160 and the PAIC 161A).

In some embodiments, executable instructions running on the CPU (such as those shown in the memory 206 in FIG. 2A, and described below) are used to manage operation of the RF power transmitter device 100 and to control external devices through a control interface, e.g., SPI control interface 175, and the other analog and digital interfaces included in the RFIC 160. In some embodiments, the CPU subsystem also manages operation of the RF subsection of the RFIC 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna coverage areas and power-transfer coverage areas, and those terms are used synonymously in this disclosure. In some embodiments, the coverage area includes an area into which energy is radiated by a particular antenna, which is typically a NF+ distance away from an exterior surface of the transmitter's housing that is adjacent to the antenna. In some embodiments, the antenna/power-transfer coverage areas may include antenna elements that transmit propagating radio frequency waves but, in other embodiments, the antenna/power transfer coverage areas may instead include capacitive charging couplers that convey electrical signals but do not send propagating radio frequency waves.

In some conventional systems, a viable RF power level can be provided to an optional beam-forming integrated circuit (IC) (not shown), which then provides phase-shifted signals to one or more power amplifiers. In such conventional systems, the optional beam-forming IC is used to ensure that power transmission signals sent using two or more antennas 210 (e.g., each antenna 210 may be associated with a different antenna zone 290 or may each belong to a single antenna zone 290) to particular wireless-power receivers are transmitted with appropriate characteristics (e.g., phases) to ensure that power transmitted to the particular wireless-power receiver is maximized (e.g., the power transmission signals arrive in phase at the particular wireless-power receiver). As described herein, the embodiments herein do not require the use of a beam-forming integrated circuit. In certain embodiments, such a beam-forming integrated circuit (and/or associated algorithm) can be included in the systems described herein, but that circuit is disabled and is not used in conjunction with wirelessly-transmitted energy to receiver devices.

In some embodiments, the RFIC 160 and/or PAIC 161A provides the viable RF power level (e.g., via the RF TX 178) directly to the one or more PAs 108 and does not use any beam-forming capabilities (e.g., bypasses/disables a beam-forming IC and/or any associated algorithms if phase-shifting is not required, such as when only a single antenna 210 is used to transmit power transmission signals to a wireless-power receiver). In some embodiments, the PAIC 161A regulates the functionality of the PAs 108 including adjusting the viable RF power level to the PAs 108. In some embodiments, the PAIC 161A has similar structure as that of the power amplifier controller described in FIG. 5 below. The functions of the of the PAIC 161A are discussed below in FIGS. 4-6.

In some embodiments, the RFIC 160 and/or PAIC 161A provides the viable RF power level (e.g., via the RF TX 178) directly to the one or more PAs 108 and does not use a beam-forming IC. In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase. In some embodiments, the PAIC 161A regulates the functionality of the PAs 108 including adjusting the viable RF power level to the PAs 108. In some embodiments, the PAIC 161A has similar structure as that of the power amplifier controller described in FIG. 4 below. The functions of the of the PAIC 161A are discussed below in FIGS. 4-6.

In some embodiments, the one or more PAs 108 then provide RF signals to the antenna coverage areas 290 (also referred to herein as "power-transfer coverage areas") for transmission to wireless-power receivers that are authorized to receive wirelessly delivered power from the RF power transmitter device 100. In some embodiments, each antenna coverage area 290 is coupled with a respective PA 108 (e.g., antenna coverage area 290-1 is coupled with PA 108-1 and antenna coverage area 290-N is coupled with PA 108-N). In some embodiments, multiple antenna coverage areas 290 are coupled with a respective PA 108 (e.g., antenna coverage areas 290-M to 290-N are coupled with PA 108-N). In some embodiments, multiple antenna coverage areas are each coupled with a same set of PAs 108 (e.g., a low number (for example, no more than three) PAs 108 are coupled with each antenna coverage area 290). Various arrangements and couplings of PAs 108 to antenna coverage areas 290 allow the RF power transmitter device 100 to sequentially or selectively activate different antenna coverage areas in order to determine the most efficient antenna coverage area 290 to use for transmitting wireless-power to a wireless-power receiver.

In some embodiments, the one or more PAs 108 are also controlled by the CPU subsystem 170 to allow the CPU 202 to measure output power provided by the PAs 108 to the antenna coverage areas of the RF power transmitter device 100. In some embodiments, the one or more PAs 108 are controlled by the CPU subsystem 170 via the PAIC 161A. In some embodiments, the PAs 108 may include various measurement points that allow for at least measuring impedance values that are used to enable the foreign object detection techniques, receiver and/or foreign object movement detection techniques, power amplifier optimization techniques, power amplifier protection techniques, receiver classification techniques, power amplifier impedance detection techniques, and other techniques described below with reference to FIGS. 4-6.

FIG. 1B also shows that, in some embodiments, the antenna coverage areas 290 of the RF power transmitter device 100 may include one or more antennas 210A-N. In some embodiments, each antenna coverage area of the plurality of antenna coverage areas includes one or more antennas 210 (e.g., antenna coverage area 290-1 includes one antenna 210-A and antenna coverage areas 290-N includes multiple antennas 210; although not shown any antenna coverage area 290 can have multiple antennas). In some embodiments, a number of antennas included in each of the antenna coverage areas is dynamically defined based on various parameters, such as a location of a wireless-power receiver on the RF power transmitter device 100. In some embodiments, the antenna coverage areas may include one or more of the loop antenna, meandering line antennas, and/or other antenna types described in more detail below. In some embodiments, each antenna coverage area 290 may include antennas of different types (e.g., a meandering line antenna, a loop antenna, and/or other type of antenna), while in other embodiments each antenna coverage area 290 may include a single antenna of a same type (e.g., all antenna coverage areas 290 include one loop antenna, meandering antenna, and/or other type of antenna), while in still other embodiments, the antennas coverage areas may include some antenna coverage areas that include a single antenna of a same type and some antenna coverage areas that include antennas of different types. In some embodiments the antenna/power-transfer coverage areas may also or alternatively include capacitive charging couplers that convey electrical signals but do not send propagating radio frequency waves. Antenna coverage areas are also described in further detail below.

In some embodiments, only a single antenna is included in each antenna coverage area 290, and, certain embodiments, only a single antenna coverage area 290 with a single antenna is utilized. An example of this is demonstrated and described with reference to FIG. 3.

In some embodiments, the RF power transmitter device 100 may also include a temperature monitoring circuit that is in communication with the CPU subsystem 170 to ensure that the RF power transmitter device 100 remains within an acceptable temperature range. For example, if a determination is made that the RF power transmitter device 100 has reached a threshold temperature, then operation of the RF power transmitter device 100 may be temporarily suspended until the RF power transmitter device 100 falls below the threshold temperature.

Furthermore, and as explained in more detail below in reference to FIG. 2A, the RF power transmitter circuit 160 may also include a secure element module 234 (e.g., included in the encryption block 176 shown in FIG. 1B) that is used in conjunction with a secure element module 282 (FIG. 2B) or a receiver 104 to ensure that only authorized receivers are able to receive wirelessly delivered power from the RF power transmitter device 100 (FIG. 1B).

Figure 1C:
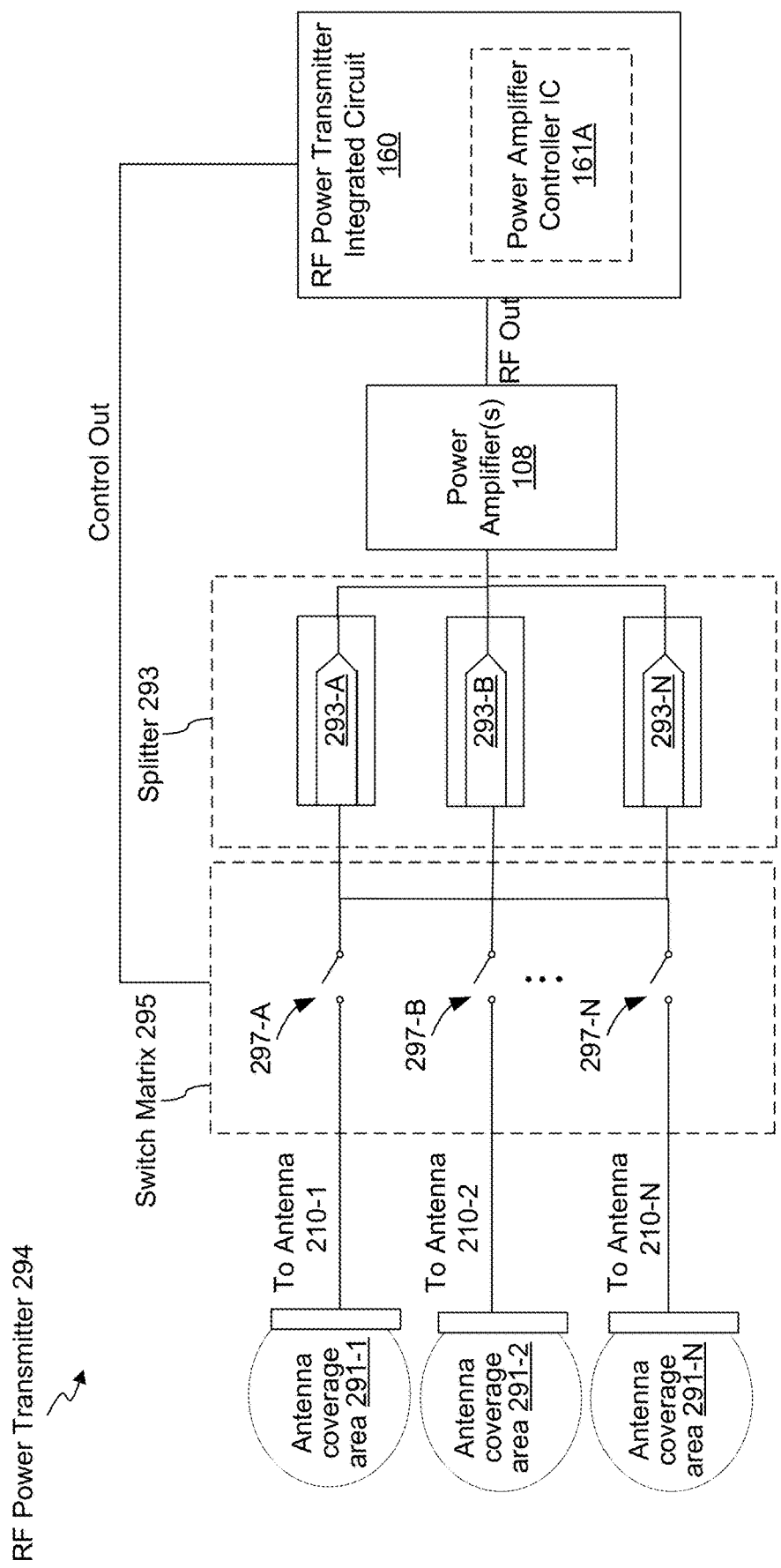
FIG. 1C is a block diagram showing components of an example RF power transmitter that includes an RF power transmitter integrated circuit coupled to an optional switch or/and some optional splitters in accordance with some embodiments.

FIG. 1C is a block diagram of a power transmitter system 294 in accordance with some embodiments. The power transmitter system 294 is an example of the power transmitter device 100 (FIG. 1A), however, one or more components included in the power transmitter device 100 are not included in the power transmitter system 294 for ease of discussion and illustration.

The power transmitter system 294 includes an RFIC 160, at least one PA 108, a PAIC 161A (which may be on the same or a separate IC from the RF power transmitter IC 160), and a transmitter antenna array 210 having multiple antenna coverage areas such as 291-1, 291-2, . . . 291-N. Each of these components is described in detail above with reference to FIGS. 1A and 1B. In some embodiments, the power transmitter system 294 includes an optional splitter 293 array (i.e., transmitter-side splitter), positioned between the PA 108 and the antenna array 210, having a plurality of splitters 293-A, 293-B, . . . 293-N. The splitter array 293 is configured to connect the PA 108 with one or more antenna coverage areas 291 of the antenna array 210 in response to control signals provided by the RFIC 160. Additionally, the power transmitter system 294 includes an optional switch matrix 295 (i.e., transmitter-side switch), positioned between the PA 108 and the antenna array 210, having a plurality of switches 297-A, 297-B, . . . 297-N. The switch matrix 295 is configured to switchably connect the PA 108 with one or more antenna coverage areas 291 of the antenna array 210 in response to control signals provided by the RFIC 160. In some embodiments, the switch matrix 295 allows for connections and terminations of different antenna (elements) within the antenna array 210.

To accomplish the above, each switch 297 is coupled with (e.g., provides a signal pathway to) a different antenna coverage area 291 of the antenna array 210. For example, switch 297-A may be coupled with a first antenna 210-1 (FIG. 1B) of the antenna array 210, switch 297-B may be coupled with a second antenna 210-2 of the antenna array 210, and so on. Each of the plurality of switches 297-A, 297-B, . . . 297-N, once closed, creates a unique pathway between a PA 108 and a respective antenna coverage area of the antenna array 210. Each unique pathway through the switch matrix 295 is used to selectively provide RF signals to specific antenna coverage areas of the antenna array 210. It is noted that two or more of the plurality of switches 297-A, 297-B, . . . 297-N may be closed at the same time, thereby creating multiple unique pathways to the antenna array 210 that may be used simultaneously.

In some embodiments, the RFIC 160 (or with the PAIC 161A, or both) is (are) coupled to the switch matrix 295 and is configured to control operation of the plurality of switches 297-A, 297-B, . . . 297-N (illustrated as a "control out" signal in FIGS. 1A and 1C). For example, the RFIC 160 may close a first switch 297-A while keeping the other switches open. In another example, the RFIC 160 may close a first switch 297-A and a second switch 297-B, and keep the other switches open (various other combinations and configuration are possible). Moreover, the RFIC 160 is coupled to the PA 108 and is configured to generate a suitable RF signal (e.g., the "RF Out" signal) and provide the RF signal to the PA 108. The PA 108, in turn, is configured to provide the RF signal to one or more antenna coverage areas of the antenna array 210 via the switch matrix 295, and/or the splitters 293 depending on which switches 297 in the switch matrix 295 are closed by the RFIC 160. In some embodiments, when a portion of the circuit segment associated with an antenna within the antenna array 210 is not used, the corresponding switch 297 will be turned off.

To further illustrate, the power transmitter system can be configured to transmit test power transmission signals, and/or regular power transmission signals, using different antenna coverage areas, e.g., depending on a location of a receiver on the power transmitter. In some embodiments, the power transmitter and client devices use standard bluetooth low energy ("BLE") communications paths to enable power transmitter to monitor and track the location of the client devices. Accordingly, when a particular antenna coverage area is selected for transmitting test signals or regular power signals, a control signal is sent to the switch matrix 295 from the RFIC 160 to cause at least one switch 297 to close. In doing so, an RF signal from at least one PA 108 can be provided to the particular antenna coverage area using a unique pathway created by the now-closed at least one switch 297. In some embodiments, each antenna coverage area 291 includes a single antennas, and only a single antenna coverage area 291 with a single antenna is utilized in certain embodiments.

In some embodiments, the switch matrix 295 may be part of (e.g., internal to) the antenna array 210. Alternatively, in some embodiments, the switch matrix 295 is separate from the antenna array 210 (e.g., the switch matrix 295 may be a distinct component, or may be part of another component, such as the PA 108). It is noted that any switch design capable of accomplishing the above may be used, and the design of the switch matrix 295 illustrated in FIG. 1C is merely one example.

Figure 2A:
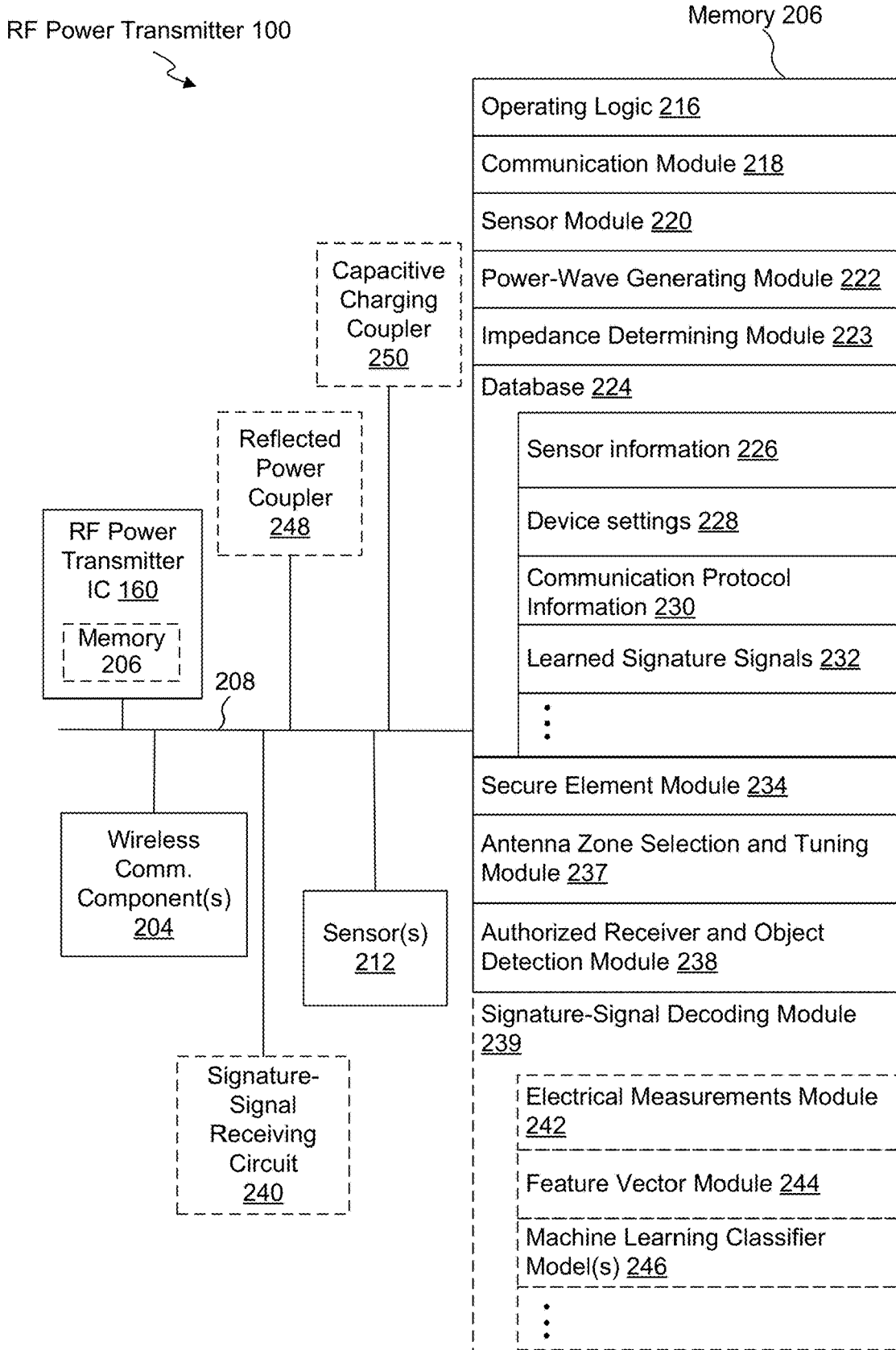
FIG. 2A is a block diagram illustrating an example RF power transmitter in accordance with some embodiments.

FIG. 2A is a block diagram illustrating certain components of an RF power transmitter device 100 (also sometimes called a transmitter, power transmitter, or wireless-power transmitter) in accordance with some embodiments. In some embodiments, the RF power transmitter device 100 includes an RFIC 160 (and the components included therein, such as a PAIC 161A and others described above in reference to FIGS. 1A-1C), memory 206 (which may be included as part of the RFIC 160, such as nonvolatile memory 206 that is part of the CPU subsystem 170), and one or more communication buses 208 for interconnecting these components (sometimes called a chipset). In some embodiments, the RF power transmitter device 100 includes one or more sensors 212 (discussed below). In some embodiments, the RF power transmitter device 100 includes one or more output devices such as one or more indicator lights, a sound card, a speaker, a small display for displaying textual information and error codes, etc. In some embodiments, the RF power transmitter device 100 includes a location detection device, such as a GPS (global positioning satellite) or other geo-location receiver, for determining the location of the RF power transmitter device 100.

In some embodiments, the one or more sensors 212 include one or more capacitive sensors, time-of-flight sensors (e.g., ultrasonic time-of-flight sensors), thermal radiation sensors, ambient temperature sensors, humidity sensors, IR sensors, occupancy sensors (e.g., RFID sensors), ambient light sensors, motion detectors, accelerometers, and/or gyroscopes.

In some embodiments, the RF power transmitter device 100 further includes an optional signature-signal receiving circuit 240, an optional reflected power coupler 248, and an optional capacitive charging coupler 250.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- Operating logic 216 including procedures for handling various basic system services and for performing hardware dependent tasks;
- Communication module 218 for coupling to and/or communicating with remote devices (e.g., remote sensors, transmitters, receivers, servers, mapping memories, etc.) in conjunction with wireless communication component(s) 204;
- Sensor module 220 for obtaining and processing sensor data (e.g., in conjunction with sensor(s) 212) to, for example, determine the presence, velocity, and/or positioning of object in the vicinity of the RF power transmitter device 100;
- Power-wave generating module 222 for generating and transmitting power transmission signals (e.g., in conjunction with antenna coverage areas 290 and the antennas 210 respectively included therein), including but not limited to, forming pocket(s) of energy at given locations, and controlling and/or managing the power amplifier (e.g., by performing one or functions of the PAIC 161A). Optionally, the power-wave generating module 222 may also be used to modify values of transmission characteristics (e.g., power level (i.e., amplitude), phase, frequency, etc.) used to transmit power transmission signals by individual antenna coverage areas;
- Impedance determining module 223 for determining an impedance of the power amplifier based on parametric parameters obtained from one or more measurement points within the RF power transmitter device 100 (e.g. determining an impedance using one or more Smith charts). Impedance determining module 223 may also be used to determine the presence of a foreign object, classify a receiver, detect changes in impedances, detect movement of a foreign object and/or receiver, determine optimal and/or operational impedances, as well as a number of other functions describe below;
- Database 224, including but not limited to:
  - Sensor information 226 for storing and managing data received, detected, and/or transmitted by one or more sensors (e.g., sensors 212 and/or one or more remote sensors);
  - Device settings 228 for storing operational settings for the RF power transmitter device 100 and/or one or more remote devices including, but not limited to, lookup tables (LUT)s for SAR, e-field roll-off, producing a certain radiation profile from among various radiation profiles, antenna tuning parameters, and/or values associated with parametric parameters of the RF power transmitter device 100 for different configurations (e.g., obtained during simulation, characterization, and/or manufacture tests of the RF power transmitter device 100 and/or updated during operation (e.g., learned improvements to the system)). Alternatively, raw values can be stored for future analysis;
  - Communication protocol information 230 for storing and managing protocol information for one or more protocols (e.g., custom or standard wireless protocols, such as ZigBee, Z-Wave, etc., and/or custom or standard wired protocols, such as Ethernet); and
  - Optional learned signature signals 232 for a variety of different wireless-power receivers and other objects (which are not wireless-power receivers).
- A secure element module 234 for determining whether a wireless-power receiver is authorized to receive wirelessly delivered power from the RF power transmitter device 100;
- An antenna coverage area selecting and tuning module 237 for coordinating a process of transmitting test power transmission signals with various antenna coverage areas (e.g., various antenna coverage areas can combine to produce the operating area of the transmitter device discussed herein; or, for systems utilizing a single antenna, that antenna's coverage area can be the system's operating area) to determine which antenna coverage area or coverage areas should be used to wirelessly deliver power to various wireless-power receivers (as is explained in more detail in reference to FIGS. 9A-9B of PCT Patent Application No. PCT/US2019/015820, which is incorporated by reference in its entirety for all purposes; also explained in more detail in PCT/US2017/065886, which is incorporated by reference in its entirety for all purposes);
- An authorized receiver and object detection module 238 used for detecting various signature signals from wireless-power receivers and from other objects, and then determining appropriate actions based on the detecting of the various signature signals (as is explained in more detail in reference to FIGS. 9A-9B of PCT Patent Application No. PCT/US2019/015820, which is incorporated by reference in its entirety for all purposes; also explained in more detail in PCT/US2017/065886, which is incorporated by reference in its entirety for all purposes); and
- An optional signature-signal decoding module 239 used to decode the detected signature signals and determine message or data content. In some embodiments, the module 239 includes an electrical measurement module 242 to collect electrical measurements from one or more receivers (e.g., in response to power beacon signals), a feature vector module 244 to compute feature vectors based on the electrical measurements collected by the electrical measurement module 239, and/or machine learning classifier model(s) 246 that are trained to detect and/or classify foreign objects.

Each of the above-identified elements (e.g., modules stored in memory 206 of the RF power transmitter device 100) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above.

Figure 2B:
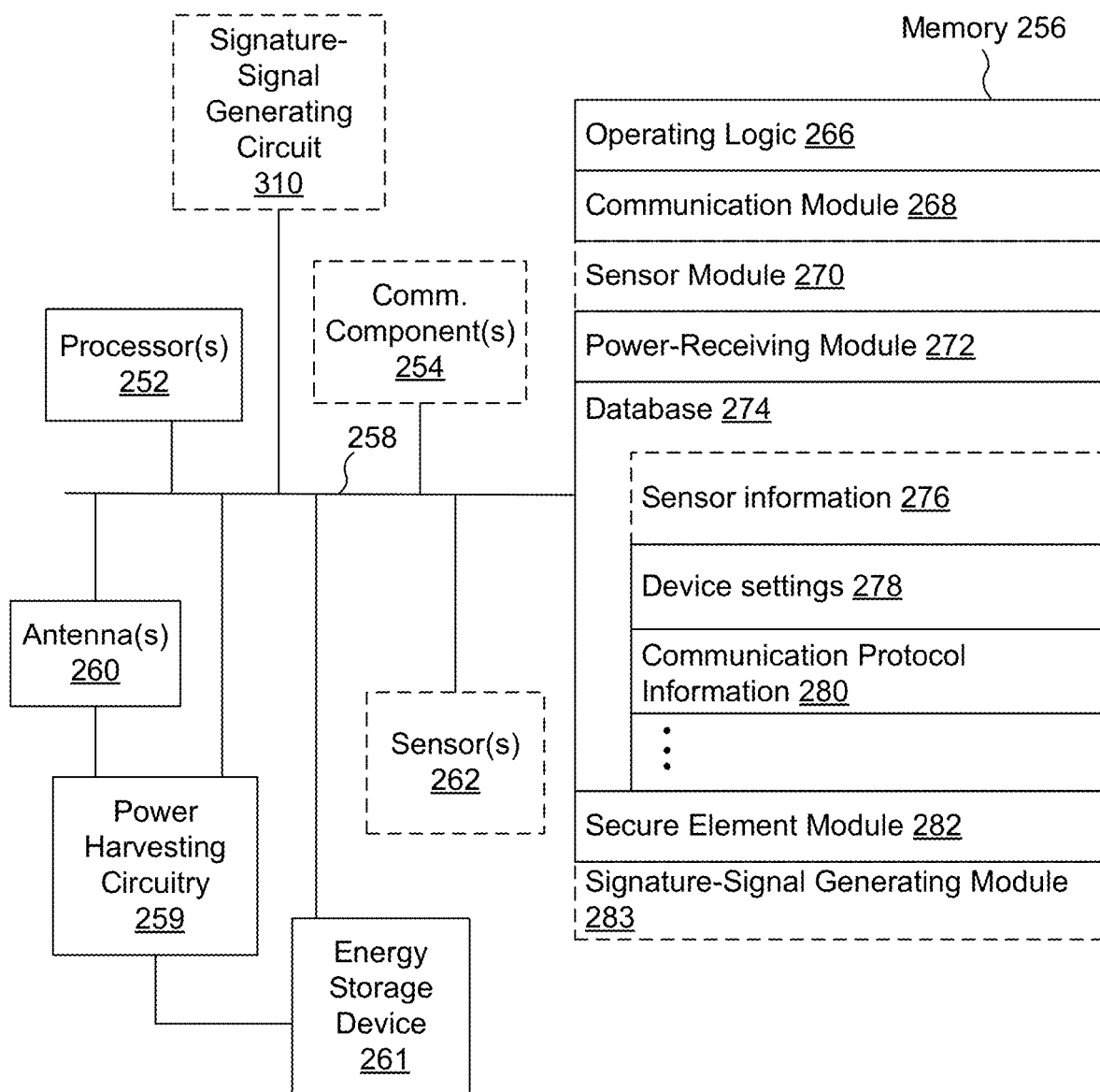
FIG. 2B is a block diagram illustrating an example receiver device in accordance with some embodiments.

FIG. 2B is a block diagram illustrating a representative receiver device 104 (also sometimes interchangeably referred to herein as a receiver, power receiver, or wireless-power receiver) in accordance with some embodiments. In some embodiments, the receiver device 104 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 104 includes one or more optional sensors 262, such as the one or sensors 212 described above with reference to FIG. 2A. In some embodiments, the receiver device 104 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the optional signature-signal generating circuit 310 includes one or more components as discussed with reference to FIGS. 3A-3D of commonly-owned U.S. patent application Ser. No. 16/045,637, which is incorporated by reference in its entirety for all purposes.

In some embodiments, the antenna(s) 260 include one or more of the meandering line antennas that are described in further detail in PCT Patent Application No. PCT/US2017/065886, which is incorporated by reference in its entirety for all purposes (e.g., with particular reference to FIGS. 6A-7D, and elsewhere). In some embodiments, the antenna(s) 260 may also or alternatively include capacitive charging couplers (such as those described with reference to FIGS. 5A-5B of commonly-owned U.S. patent application Ser. No. 16/045,637, which was incorporated by reference above) that correspond in structure to those that may be present in a near-field power transmitter.

In some embodiments, the receiver device 104 includes one or more output devices such as one or more indicator lights, a sound card, a speaker, a small display for displaying textual information and error codes, etc. In some embodiments, the receiver device 104 includes a location detection device, such as a GPS (global positioning satellite) or other geo-location receiver, for determining the location of the receiver device 104.

In various embodiments, the one or more sensors 262 include one or more thermal radiation sensors, ambient temperature sensors, humidity sensors, IR sensors, occupancy sensors (e.g., RFID sensors), ambient light sensors, motion detectors, accelerometers, and/or gyroscopes. It is noted that the foreign object detection techniques can operate without relying on the one or more sensor(s) 262.

The communication component(s) 254 enable communication between the receiver 104 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. It is noted that the foreign object detection techniques can operate without relying on the communication component(s) 254.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

Operating logic 266 including procedures for handling various basic system services and for performing hardware dependent tasks;

Communication module 268 for coupling to and/or communicating with remote devices (e.g., remote sensors, transmitters, receivers, servers, mapping memories, etc.) in conjunction with communication component(s) 254;

Optional sensor module 270 for obtaining and processing sensor data (e.g., in conjunction with sensor(s) 262) to, for example, determine the presence, velocity, and/or positioning of the receiver 103, a RF power transmitter device 100, or an object in the vicinity of the receiver 103;

Wireless power-receiving module 272 for receiving (e.g., in conjunction with antenna(s) 260 and/or power harvesting circuitry 259) energy from, capacitively-conveyed electrical signals, power waves, and/or energy pockets; optionally converting (e.g., in conjunction with power harvesting circuitry 259) the energy (e.g., to direct current); transferring the energy to a coupled electronic device; and optionally storing the energy (e.g., in conjunction with energy storage device 261);

Database 274, including but not limited to:
  Sensor information 276 for storing and managing data received, detected, and/or transmitted by one or more sensors (e.g., sensors 262 and/or one or more remote sensors);
  Device settings 278 for storing operational settings for the receiver 103, a coupled electronic device, and/or one or more remote devices; and
  Communication protocol information 280 for storing and managing protocol information for one or more protocols (e.g., custom or standard wireless protocols, such as ZigBee, Z-Wave, etc., and/or custom or standard wired protocols, such as Ethernet);

A secure element module 282 for providing identification information to the RF power transmitter device 100 (e.g., the RF power transmitter device 100 uses the identification information to determine if the wireless-power receiver 104 is authorized to receive wirelessly delivered power); and An optional signature-signal generating module 283 used to control (in conjunction with the signature-signal generating circuit 310) various components to cause impedance changes at the antenna(s) 260 and/or power harvesting circuitry 259 to then cause changes in reflected power as received by a signature-signal receiving circuit 240.

Each of the above-identified elements (e.g., modules stored in memory 256 of the receiver 104) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device that is coupled with the receiver 104).

In some embodiments, the near-field power transmitters disclosed herein may use adaptive loading techniques to optimize power transfer. Such techniques are described in detail in commonly-owned and incorporated-by-reference PCT Application No. PCT/US2017/065886 and, in particular, in reference to FIGS. 3A-8 and 12-15 of PCT Application No.

Figure 3:
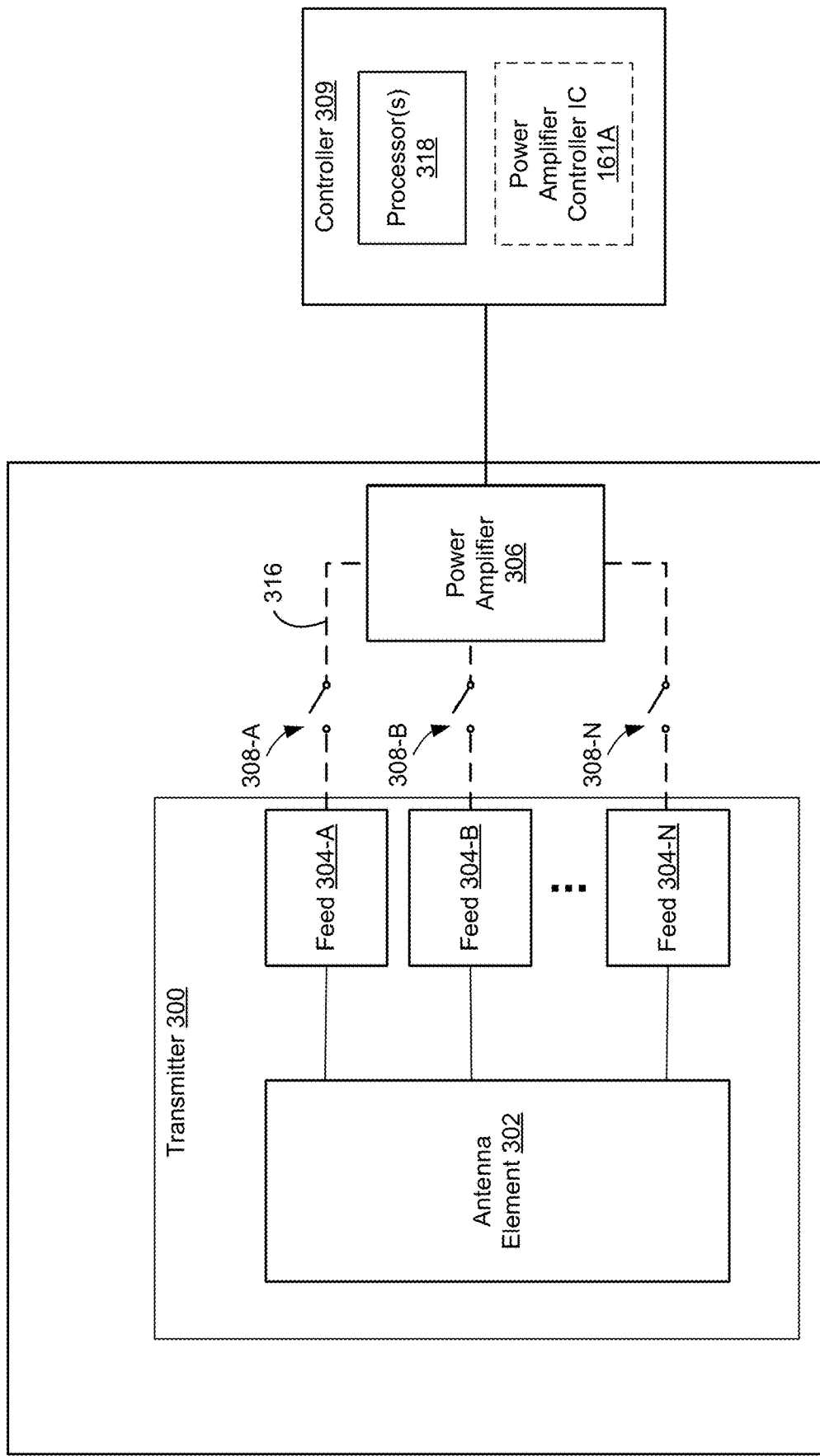
FIG. 3 is a schematic of an example antenna of a wireless-power transmitter in accordance with some embodiments.

As one of skill will appreciate upon reading this disclosure, many different antennas can be utilized in the systems described herein. One example is an antenna with a number of different feeds that can each be selectively activated, as is schematically depicted in FIG. 3, which is a schematic of an example transmitter 300 in accordance with some embodiments. In some embodiments, the antenna 302 is responsible for servicing (e.g., transmitting power to receiver devices located within) a representative transmitter coverage area 290-1 of one of the transmitter coverage areas 290-1-290-N (FIG. 1B).

As a non-limiting example, a transmitter 300 (which includes an antenna element 302, one or more feeds 304-A, 304-B, . . . 304-N, and a power amplifier 306 (e.g., a single power amplifier). The components of the transmitter 300 are coupled via busing 316 or the components are directly coupled to one another. Additionally, the representative transmitter 300 includes switches 308-A, 308-B, . . . 308-N positioned between the power amplifier 306 and each respective feed 304.

In some embodiments, the power amplifier 306 and any switches 308 can be configured as part of the transmitter 300 (not illustrated) while, in other embodiments, the power amplifier 306 and any switches 308 can be configured as external to the transmitter 300 and coupled to feeds of an antenna element 302 (as illustrated in FIG. 3). In some embodiments, power amplifier 306 may be shared across multiple transmitter coverage areas 290-1.

The antenna element 302 can be coupled with the one or more feeds 304-A, 304-B, . . . 304-N. In some embodiments (as shown in FIG. 3), the antenna element 302 is directly coupled with each of the feeds 304-A, 304-B, . . . 304-N. The antenna element 302 is used to radiate one or more RF signals that provide wirelessly delivered power to a receiver 104. In some embodiments, the radiated one or more RF signals are received by the receiver 104 when the receiver is located anywhere between a top surface of the transmitter coverage area 290-1 and up to a wavelength of an operating frequency of the transmitter 300 away from the transmitter coverage area 290-1 (e.g., the receiver 104 is within a near-field transmission distance of the transmitter 300). In some embodiments, the antenna element 302 is a conductive wire forming a loop antenna (e.g., a substantially contiguous loop antenna). The antenna element 302 may be made from a suitable material that is capable of conducting the RF signals. In some embodiments, the antenna element 302 is any antenna type described below.

Each feed 304 can be coupled with the antenna element 302 at a different position on the antenna element 302. For example, the feed 304-A is coupled with the antenna element 302 at a first position, the feed 304-B is coupled with the antenna 302 at a second position, and so on. Each of the one or more feeds 304-A, 304-B, . . . 304-N provides the one or more RF signals to be radiated by the antenna element 302 at a particular position along the antenna element 302 (as explained in more detail below). Each feed 304 may be made from any suitable conductive material (e.g., aluminum, copper, etc.).

The power amplifier 306 can be used to selectively provide power to one or more of the feeds 304-A, 304-B, . . . 304-N by closing one or more of the switches 308-A, 308-B, . . . 308-N. The power amplifier 306 may be instructed (e.g., by the controller 309) to close a respective switch of the one or more of the switches 308-A, 308-B, . . . 308-N depending on a location of the receiver 104 relative to the one or more feeds 304-A-304-D. In some embodiments, the controller 309 includes an optional power amplifier controller IC 330 similar to the PAIC 161A depicted in FIGS. 1B-1C. In some embodiments, the controller 309 is included in the RFIC 160. In some embodiments, the controller 309 includes one or more processors 318. Although not shown, the one or more of the switches 308-A, 308-B, . . . 308-N may be part of (e.g., internal to) the power amplifier 306. Operation of the power amplifier 306 is discussed in further detail below with reference to the method 1800.

In some embodiments, the power amplifier 306 is coupled with a power supply (not shown), and the power amplifier 306 draws energy from the power supply to provide RF signals to one or more of the feeds 304-A, 304-B, . . . 304-N. Moreover, in some embodiments (not shown), the power amplifier 306 is coupled with an RF power transmitter integrated circuit (e.g., the RF integrated circuit may be part of the transmitter coverage area 290-1 or more generally part of the transmitter device 100. For example, the RF integrated circuit is the RFIC 160 as shown in FIGS. 1B-1C, and 2A). The RF integrated circuit is configured to generate a suitable RF signal and provide that RF signal to the power amplifier 306, and the power amplifier 306 in turn provides the RF signal to one or more of the feeds 304-A, 304-B, . . . 304-N. In some embodiments, the RF integrated circuit includes an RF oscillator and/or a frequency modulator that is used to generate the RF signal so that is appropriate for transmission to an RF receiver 104 (e.g., the RF signal has an appropriate power level, frequency, etc. to ensure that a maximum amount of energy is transferred from the transmitter 300 to the RF receiver 104).

In some embodiments, the power amplifier 306 is coupled to an internal or external (with respect to the transmitter 300) controller 309, and in turn is coupled to the one or more processors 318 (FIG. 1A). In some embodiments, the controller 309 and the one or more processors 318 are not part of a particular transmitter coverage area 290-1 (e.g., the controller 309 is an internal component of the transmitter device 100 overall and is in communication with each of the transmitter coverage areas 290-1). Alternatively, in some embodiments, respective controllers 309 and respective one or more processors 318 are each internally associated with each of the respective transmitter coverage areas 290-1. The controller 309 and the one or more processors 318 are configured to control operation of the power amplifier 306. For example, the controller 309 or the one or more processors 318 may select a respective feed of the feed 304-A, 304-B, . . . 304-N based on the location of the receiver 104 relative to the feeds 304-A, 304-B, . . . 304-N. Further, the controller 309 may send an instruction to the power amplifier 306 that causes the power amplifier 306 to feed one or more RF signals to the respective feed that was selected based on the location of the receiver.

The one or more antennas may include antenna types for operating in frequency bands, such as roughly 900 MHz to about 100 GHz or other such frequency band, such as about 1 GHz, 5.8 GHz, 24 GHz, 60 GHz, and 72 GHz. In some embodiments, the one or more antennas may be directional and include flat antennas, patch antennas, dipole antennas, and any other antenna for wireless-power transmission. The antenna types may include, for example, patch antennas with heights from about ⅛ inch to about 6 inches and widths from about ⅛ inch to about 6 inches. The shape and orientation of the one or more antennas may vary in dependency of the desired features of the transmitter 300; the orientation may be flat in X-axis, Y-axis, and Z-axis, as well as various orientation types and combinations in three-dimensional arrangements. In some embodiments, the one or more antennas can have a loop shape. In some embodiments, the one or more antennas can have an "H" shape. In some embodiments, the one or more antennas can have an "L" shape. In some embodiments, the antenna can have a meandering pattern (e.g., an "S" shape) that includes a predetermined number of turns (e.g., at least one turn, three turns, five turns, etc.) The antenna materials may include any material that may allow RF signal transmission with high efficiency and good heat dissipation. The number of antennas may vary in relation with the desired range and power transmission capability of the transmitter 300. In addition, the antenna may have at least one polarization or a selection of polarizations. Such polarization may include vertical polarization, horizontal polarization, circularly polarized, left hand polarized, right hand polarized, or a combination of polarizations. The selection of polarizations may vary in dependency of the transmitter 300 characteristics. In addition, the antenna may be located in various surfaces of the transmitter 300. The antenna may operate in single array, pair array, quad array and any other arrangement that may be designed in accordance with the one or more parameters. In another embodiments, a low number of power amplifiers, for example, 1-5 power amplifiers, can be used to control the radiation profiles of the antennas in a wireless-power transmission system.

Additional examples of antennas that can be used with the systems described herein are discussed with reference to FIGS. 3A-3C of commonly-owned U.S. Provisional Patent Application Ser. No. 62/955,864, which is incorporated by reference in its entirety for all purposes; and FIGS. 3A-3C of commonly-owned U.S. patent application Ser. No. 16/296,145, which is also incorporated by reference in its entirety for all purposes.

As discussed in more detail below, the power amplifier 306 can also be used in a system in which the power amplifier 306 is the sole power amplifier in the system and that sole power amplifier can be responsible for feeding one or multiple antennas. In the example of a system with only one PA and only one antenna, designing such a system that is capable of complying with one or more safety thresholds (as disclosed herein) using only a single power amplifier and only a single antenna results in a low-cost system that is still able to achieve a safe transmission of wireless power, thus producing a system that is commercially viable both for its ability to comply with regulatory requirements and for its ability to be built at a cost point that is palatable for customers. Such a system also places a lower computing requirements on the one or more ICs, because less components need to be controlled, and also because the system does not require any active beamforming control.

In some embodiments, the output power of the single power amplifier 306 is equal or greater than 2 W. In some embodiments, the output power of the single power amplifier 306 is equal or less than 15 W. In some embodiments, the output power of the single power amplifier 306 is greater than 2 W and less than 15 W. In some embodiments, the output power of the single power amplifier 306 is equal or greater than 4 W. In some embodiments, the output power of the single power amplifier 306 is equal or less than 8 W. In some embodiments, the output power of the single power amplifier 306 is greater than 4 W and less than 8 W. In some embodiments, the output power of the single power amplifier 306 is greater than 8 W and up to 40 W. In some embodiments, a power amplifier (e.g., the single power amplifier 306 or the one or more PAs 108) is a variable power amplifier (VPA) capable of selecting between one or more of the values described above. In some embodiments, the VPA selects between a low power lever, median power level, or high power level.

In some embodiments, the maximum power radiation distance or power transmission range for the antenna(s) controlled by the power amplifier 306 is equal or less than 6 inches (approximately 15.2 cm). In some embodiments, the maximum power radiation distance or power transmission range for the antenna(s) controlled by the power amplifier 306 is about 6 inches to one foot (approximately 15.2 cm to 30.5 cm). In some embodiments, the maximum power radiation distance or power transmission range for the antenna(s) controlled by the power amplifier 306 is equal or less than 1 meter. In some embodiments, the maximum power radiation distance or power transmission range for the antenna(s) controlled by the power amplifier 306 is about one meter. In some embodiments, the maximum power radiation distance or power transmission range for the antenna(s) controlled by the power amplifier 306 is more than one meter.

In some embodiments, by using the single power amplifier 306 with an output power range from 2 W to 15 W, the electric field within the power transmission range of the antenna 302 controlled by the single power amplifier 306 is at or below a SAR value of 1.6 W/kg, which is in compliance with the FCC (Federal Communications Commission) SAR requirement in the United States. In some embodiments, by using a single power amplifier 306 with a power range from 2 W to 15 W, the electric field within the power transmission range of the antenna 302 controlled by the single power amplifier 306 is at or below a SAR value of 2 W/kg, which is in compliance with the IEC (International Electrotechnical Commission) SAR requirement in the European Union. In some embodiments, by using a single power amplifier 306 with a power range from 2 W to 15 W, the electric field within the power transmission range of the antenna 302 controlled by the single power amplifier 306 is at or below a SAR value of 0.8 W/kg. In some embodiments, by using a single power amplifier 306 with a power range from 2 W to 15 W, the electric field within the power transmission range of the antenna 302 controlled by the single power amplifier 306 is at or below any level that is regulated by relevant rules or regulations. In some embodiments, the SAR value in a location of the radiation profile of the antenna decreases as the range of the radiation profile increases.

In some embodiments, the radiation profile generated by the antenna controlled by a single power amplifier is defined based on how much usable power is available to a wireless-power receiver when it receives electromagnetic energy from the radiation profile (e.g., rectifies and converts the electromagnetic energy into a usable DC current), and the amount of usable power available to such a wireless-power receiver can be referred to as the effective radiated power of an RF signal. In some embodiments, the effective radiated power of the RF signal in a predefined radiation profile is at least 0.5 watts. In some embodiments, the effective radiated power of the RF signal in a predefined radiation profile is greater than 1 watts. In some embodiments, the effective radiated power of the RF signal in a predefined radiation profile is greater than 2 watts. In some embodiments, the effective radiated power of the RF signal in a predefined radiation profile is greater than 5 watts. In some embodiments, the effective radiated power of the RF signal in a predefined radiation profile is less or equal to 4 watts.

In some embodiments, the power amplifier used in the power transmission system controls both the efficiency and gains of the output of the power amplifier. In some embodiments, the power amplifier used in the power transmission system is a class E power amplifier. In some embodiments, the power amplifier used in the power transmission system is a GaN power amplifier. The descriptions provided above with respect to PA 306 also apply to the PA 108 that was discussed earlier in reference to FIGS. 1A-1C.

Figure 4:
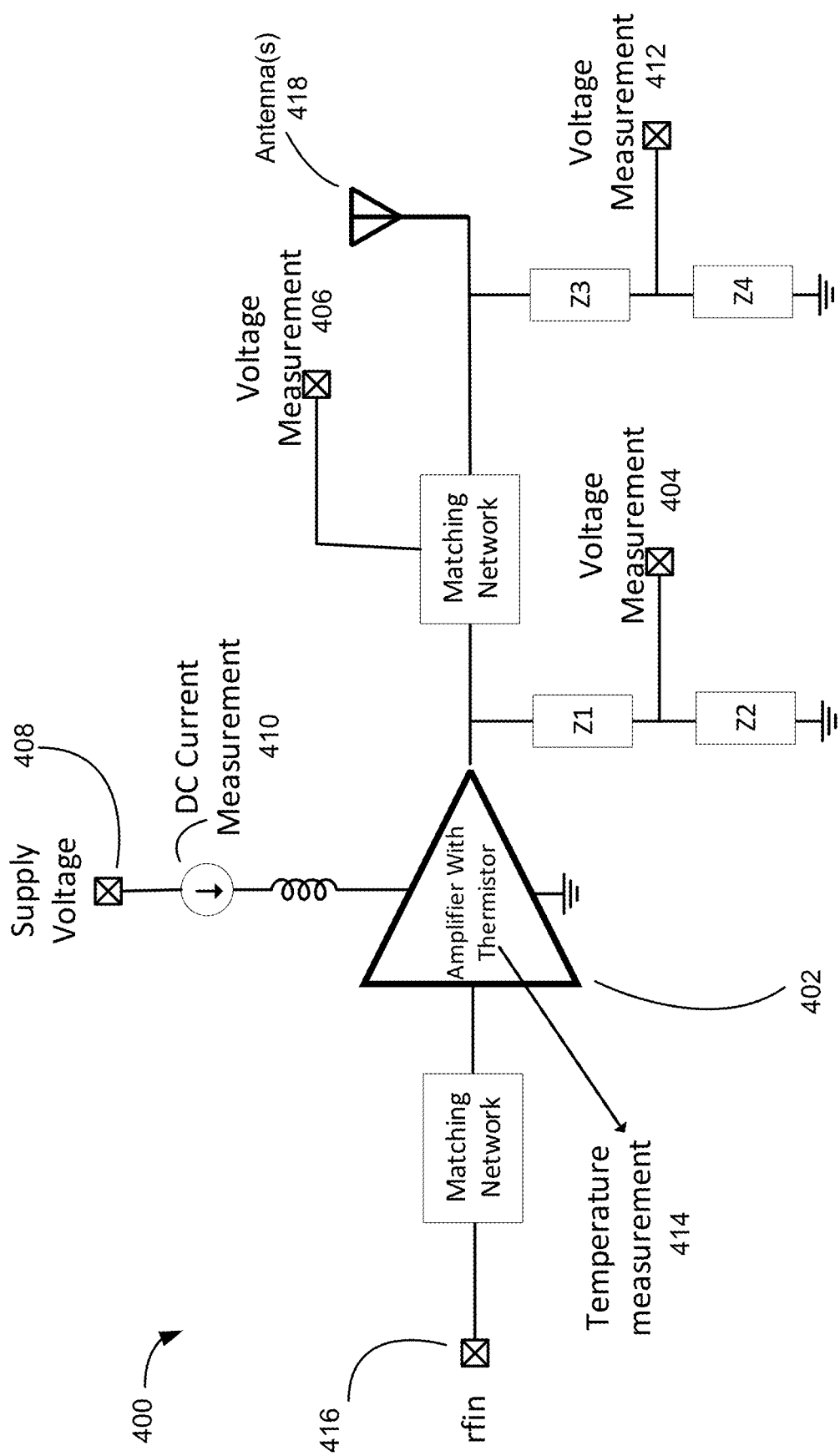
FIG. 4 illustrates arrangements of measurement points within the wireless power transmitter to detect impedances presented to the power amplifier in accordance with some embodiments.

FIG. 4 illustrates arrangements of measurement points within a wireless-power transmission system 400 (system 400 can be a view of components of the RF power transmitter device 100, FIG. 1A) to detect (e.g., determine) impedances and/or temperatures presented to the power amplifier 402, according to some embodiments.

In some embodiments, to protect against impedances known to damage the power amplifier 402 (which can be an instance of the power amplifiers 108 or 306 discussed above), a variety of measurement points are placed within and around the power amplifier 402. In some embodiments, the measurement points within the wireless-power transmission system 400 are used to obtain different sets of measurement values for parametric parameters for the power amplifier 402. In some embodiments, the different sets of measurement values for parametric parameters for the power amplifier 402 correspond to one or more power levels of the power amplifier, configurations of the wireless-power transmission system 400, detected and/or connected wireless-power receivers, detected foreign objects (organic, inorganic, animate, and/or inanimate), and/or other operational conditions.

In some embodiments, the different sets of measurement values for parametric parameters for the power amplifier 402 are obtained during simulation, characterization, and/or manufacturing test of the wireless-power transmission system 400. Alternatively or additionally, in some embodiments, the different sets of measurement values are obtained through characterization of an electronic device (e.g., wireless-power receiver) and/or foreign object with the wireless-power transmission system 400. Certain power measurement points (open, short, load) can be calibrated during manufacturing. In some embodiments, the different sets of measurement values for parametric parameters obtained during simulation, characterization, and/or manufacturing tests of the wireless-power transmission system 400 can be stored in data structures (e.g., lookup tables) and used to identify valid (or safe) operational impedances of a power amplifier. In some embodiments, the valid operational impedances of the power amplifier are used to define impedance thresholds as discussed below. In some embodiments, the methods disclosed herein can be performed by a CPU (e.g. RFIC 160 and/or PAIC 161A) referencing different sets of measurement values for parametric parameters stored in memory 206 (e.g., via lookup tables (LUTs). FIGS. 7-13 below are example visual representations showing the how the different sets of measurement values for parametric parameters obtained during simulation, characterization, and/or manufacturing test of the wireless-power transmission system 400 are used to identify valid operational impedances of a power amplifier (and create the stored values for the LUTs).

In some embodiments, different sets of measurement values for parametric parameters for the power amplifier 402 are obtained through periodic polling and/or interrupts (e.g., during operation). In this way, the wireless-power transmission system 400 can rapidly detect impedance discontinuities. In some embodiments, impedance conditions determined to be unsafe to consumers and/or the power amplifier (as described below) will result in the shutdown of the PA. In some embodiments, impedance conditions determined to be within safe operational boundaries but not optimal can result in optimization or re-optimization of the power amplifier (as discussed below). In some embodiments, the different sets of measurement values for parametric parameters for the power amplifier 402 obtained through periodic polling and/or interrupts are used to perform lookups in LUTs to determine valid operating impedances for the amplifier and/or to optimize conditions for the wireless-power transmission system 400.

Examples of parametric parameters of the measurement points include the voltage at the output of the amplifier 404, voltages at points inside the matching network 406 and 416, the voltage at the drain of the transistors 408. In some embodiments, the DC current and voltage consumed by each stage of the amplifier 402 are measured. For example, the DC current measurement 410 and the voltage measurement 412 are used to measure the DC current and voltage at different stages of the amplifier 402. Additionally, in some embodiments, thermistors are used to obtain temperature measurements at different stages of the amplifier 402, such as temperature measurement 414 at the power amplifier 402. In some embodiments, the thermistor is on a same or different integrated chip as other components of the power amplifier. Additional examples of the parametric parameters include, but are not limited to, voltage drain power, DC Power, voltage output, and power dissipation. In some embodiments, measurement values for two or more parametric parameters of the measurement points are used to determine (e.g., predict) the output impedance of the power amplifier (e.g., by referencing one or more lookup tables).

In some embodiments, an impedance matching network 406 (e.g., a transmission line) may be integrally formed on the antenna structure 418 (which can be an instance of any of the antenna structures described herein, e.g., the transmitter 300 described with reference to FIG. 3) of the wireless-power transmission system 400. The matching network 406 can provide inductive/capacitive impedance matching between the power amplifier, and the antenna structure 418. In some other embodiments, the wireless-power transmission system 400 can optionally re-tune using external tuning components based on the measurement values for parametric parameters. The external tuning components can include adjusting one or more switches, capacitors, inductors, micro strips elements. In some embodiments, external tuning components include components of the matching network 406. In some embodiments, the adjustments to the external tuning components are made to cause the system to operate at a desired operational impedance.

In some embodiments, a high impedance network is used to reduce the impact on the performance of the impedance detection. In some embodiments, by incorporating the impedance detection system described herein (e.g., described in reference to example visual aids represented in FIGS. 4-13), a system does not need an isolator or coupler, as described in FIGS. 12 and 13, to protect a power amplifier and/or determine that an RF signal would satisfy one or more safety thresholds.

In some embodiments, the measurements values must be timed precisely with the power amplifier turn-on so that: the power amplifier 402 does not remain on for too long if a foreign object, damaging conditions, and/or changes in impedance are detected; and the measurements values are not reading temporary transient conditions associated with start-up or shut-down which may otherwise confound the impedance measurement.

In some embodiments, measurement values can also be taken at multiple power amplifier output power levels. For example, a set of measurement values can be taken at a low power amplifier output power level, at a median power amplifier output level, and at a high power amplifier output level. In some embodiments, the one or more measurement values (e.g., for parametric parameters) from the plurality of measurement points are stored (e.g., in memory 206 within LUTs). In some embodiments, the stored measurement values can be referenced during operation. Alternatively or additionally, in some embodiments, the stored measurement values (within the LUTs) can be used for subsequent analysis during operation (e.g., reference by a CPU (RFIC 160 and/or PAIC 161A) to perform the calculations that are visually represented below in in FIGS. 7-13).

Figure 5:
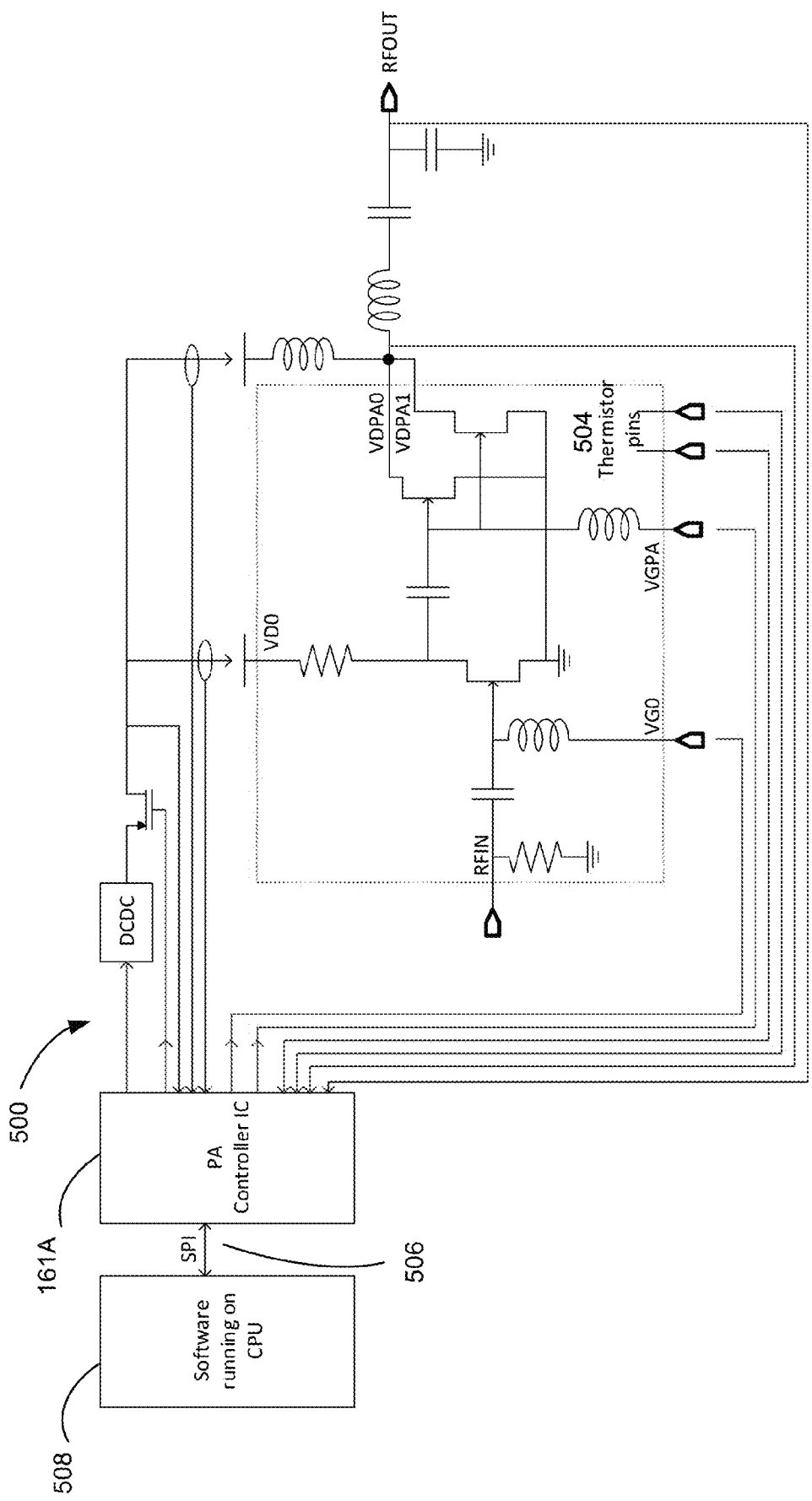
FIG. 5 schematically illustrates a system diagram of an impedance measurement system comprising a power amplifier controller Integrated Circuit (IC) and its related circuits and modules in accordance with some embodiments.

FIG. 5 schematically illustrates a system diagram of an impedance measurement system 500 within a wireless-power transmission system comprising a PAIC 161A and its related circuits and modules, according to some embodiments.

In some embodiments, a PAIC 161A can protect against conditions (e.g., impedances or other characteristics of the PAIC 161A) known to damage the power amplifier.

In some embodiments, the PAIC 161A can also detect foreign objects through an analysis of values obtained from the measurement points illustrated in FIG. 4. Alternatively or additionally, in some embodiments, the values obtained from the measurement points illustrated in FIG. 4 are used to determine (e.g., predict) changes in the impedance (e.g., from movement of a wireless-power receiver and/or foreign object detected within the wireless-transmission field, a wireless-power receiver and/or foreign object entering or leaving the wireless-transmission field, and/or other circumstances that result in a change to the observed impedances).

In some embodiments, the measurement points illustrated in FIG. 4 are used to select a power level among a plurality of available power levels of the power amplifier, optimize operation of the power amplifier, and/or perform other control and management functions of the power amplifier (as is described in further detail with reference to the examples of FIGS. 7-13). In some embodiments, the measurement points illustrated in FIG. 4 are used determine whether to continue to provide power to the PA and/or whether to shut-down the PA (as is described in further detail with reference to FIGS. 9-13). In some embodiments, the PAIC 161A manages a system power control loop implemented in firmware.

In some embodiments, the wireless power-transmitting system determines, using the PAIC 161A (and, in some circumstances such as when the receiver is not contacting a charging surface of the system, also using additional data from one or more sensors), a location of the wireless-power receiver. As an example, in some embodiments, the one or more sensors may identify a receiver within the operating area of the wireless power-transmitting system and provide information regarding the receiver to the wireless power-transmitting system, and the PAIC 161A may also provide the wireless power-transmitting system with information (e.g., impedance measurement and/or information described herein) that can be used together by the wireless power-transmitting system to determine the location of the wireless-power receiver. In some embodiments, the information includes detected changes in impedance at the power amplifier as discussed below (e.g., with reference to the explanatory examples described in FIGS. 7-13). In such embodiments, a power level is selected from among the plurality of available power levels based at least in part on the location of the wireless-power receiver. Alternatively, rather than basing selection of the power level on the wireless-power receiver's location, in some other embodiments, the system uses a maximum power level that satisfies one or more safety thresholds, and/or one or more power amplifier operation criteria as discussed below (e.g., with reference to the explanatory examples described in FIGS. 7 and 9). Alternatively or additionally, in some embodiments, the indication that includes information is received from a communications radio or component (e.g., BLE).

In some embodiments, the PAIC 161A is used to control and manage operation and/or calibration of a power amplifier. In some embodiments, the power amplifier (such as the PAs 306, 108, and 402 described above) is a gallium nitride (GaN) power amplifier and/or a Class E amplifier. In some embodiments, the PAIC 161A optimizes the performance of a gallium nitride (GaN) power amplifier and/or a Class E amplifier. In some embodiments, the power amplifier has an on-die or integrated thermistor. In some embodiments, the power amplifier has an integrated thermistor with the thermistor pins 504 connected to the PAIC 161A. In some embodiments, the on-die or integrated thermistor is used with the GaN power amplifier and/or Class E amplifier.

In some embodiments, the PAIC 161A can synchronize the turn on of all the modules of the power amplifier, for example, the power amplifier bias circuits, and the power amplifier power supply network. In some embodiments, the PAIC 161A can perform all of the required analog measurements. In some embodiments, the PAIC 161A can adjust the output power and bias conditions of the power amplifier to maintain optimum efficiency and output power. In some embodiments, the PAIC 161A can determine if the measurement results could damage the power amplifier and, if so, quickly shutdown the power amplifier. In some embodiments, the PAIC 161A can synchronize the shut-down of various components of the power amplifier. In some embodiments, the PAIC 161A facilitates the synchronized turn on and shut-down of the power amplifier via a single digital input pin of the power amplifier. For example, in some embodiments, the PAIC's 161A uses a single digital input pin to perform power on and/power off sequences of the power amplifier. In some embodiments, adjustments made by the PAIC 161A to the power amplifier and/or other configurations of a wireless-power transmission system are based on predetermined properties and/or characteristics of the wireless-power transmission system obtained during simulation, characterization, and/or manufacture tests of the wireless-power transmitter device.

In some embodiments, the PAIC 161A also stores all measurement information for subsequent access by Serial Peripheral Interface (SPI) 506, to allow for providing that measurement information (e.g., the values obtained at the various measurement points of FIG. 4) for use by software 508 that is running on a CPU (e.g., CPU 202, FIG. 1B) of the RF power transmitter integrated chip 160. In some embodiments, the lookup tables described herein can be stored in a memory of the RF power transmitter IC 160, in a memory of the PAIC 161A, or in a combination in which some lookup tables are stored in the memory of the RF power transmitter IC 160 and other lookup tables are stored in a memory of the PAIC 161A.

In some embodiments, the PAIC 161A has configurable timing and measurement interfaces. Therefore, those configurable measurement points/interfaces and time settings make the impedance measurement process independent of the exact power amplifier implementation.

In some embodiments, the PAIC 161A works in conjunction with the RFIC 160 and/or one or more sensors to perform one or more of the functions as discussed in FIGS. 1B, 1C, 2A, and 3 and described herein (in reference to FIGS. 4-13). As mentioned above in FIGS. 1B, 1C, 2A, and 3, the PAIC 161A is configured to control and manage one or more operations of the power amplifier (e.g., instruct the power amplifier to amplify the RF signal, determine (e.g., measure/read) measurement/impedance values from among the multiple measurement points of the power amplifier, and other features discussed herein). In some embodiments, the PAIC 161A provides impedance measurements (e.g., measurement values from among the multiple measurement points of the power amplifier) to the RFIC 160 to perform one or more of the functions discussed below. In some embodiments, additional information (or data) received from the one or more sensors can be used to determine and/or further improve receiver detection, classification, and/or location identification (e.g., the data received from the one or more sensors can be used as additional values to reference in conjunction with the data stored in the LUTs that are used to determine an operational impedance, among other things). The one or more functions of the RFIC 160 are described above in FIGS. 1B, 1C, 2A, and 3. For simplicity, references to the one or more functions performed by wireless-power transmission system below will refer to the one or more functions performed by the RFIC 160 in communication with the PAIC 161A and/or one or more sensors.

In some embodiments, the wireless-power transmission system determines (e.g., predicts) whether an RF signal (based on a selected power level from among a plurality of available power levels; discussed above in FIG. 3), when amplified by a power amplifier and provided to one or more antennas to cause the transmission of RF energy to a wireless-power receiver, would satisfy one or more safety thresholds. In some embodiments, the wireless-power transmission system makes the determination before any RF energy is transmitted to the wireless-power receiver to ensure a safe operating environment and/or to protect one or more power amplifiers of the RF power transmitter device 100. In some embodiments, the above determination is used in selecting an appropriate power level from among the plurality of available power levels, such that one or more safety thresholds will still be satisfied after the RF signal is transmitted. In some embodiments, the one or more safety thresholds include user-protection thresholds (e.g., SAR values, e-field roll-off values, etc.) and also include power-amplifier-protection thresholds (e.g., values for parametric parameter that reflect when the PA is operating at a safe operating impedance level (for a given output power) that will not result in damage to the PA).

Alternatively or additionally, in some embodiments, the wireless-power transmission system predicts that transmitting the RF signal (based on a selected power level) in the future would result in a formation of RF energy at the wireless-power receiver that would satisfy the one or more safety thresholds. In some circumstances, the wireless-power transmission system determines that a subset (less than all) of the one or more safety thresholds is satisfied before performing the one or more functions discussed herein. In some other embodiments, the wireless-power transmission system determines that all of the one or more safety thresholds are satisfied before transmitting wireless power. The above described predictions can be determined by using dynamically obtained measurements values and referencing the stored values (in memory 206). Examples of the safety thresholds are discussed in detail below.

The one or more safety thresholds used by the wireless-power transmission system to select an appropriate power level (and an operational impedance for the power amplifier while it operates at that appropriate power level) include one or more of: at least one of a maximum specific absorption rate (SAR) value, a predetermined e-field roll-off, global maximum and global minimum power levels, impedance thresholds, voltage standing wave ratio (VSWR) thresholds, power dissipation thresholds. Each of the one or more safety thresholds are discussed below.

In some embodiments, the one or more safety thresholds include a maximum SAR value of not greater than 2 W/kg. In some other embodiments, the maximum specific absorption rate (SAR) value of not greater than 0.8 W/kg. The inventive system described herein is capable of even greater control over the maximum SAR value, such as by ensuring that radiated RF energy at the wireless-power receiver will create a maximum SAR value of not greater than a value of 1.6 W/kg, 1.5 W/kg, 0.7 W/kg, down to a value as low as 0.5 W/kg. In some embodiments, the wireless-power transmission system determines that transmitting the RF signal would satisfy the one or more safety thresholds when it determines (e.g., by using (or referencing) stored values (within LUTs) in memory 206 and/or by making predictions based on the stored values (within LUTs) in memory 206) that transmitting the RF signal would create a maximum SAR value not greater than the predefined SAR value (e.g., maximum SAR values described above).

Figure 16:
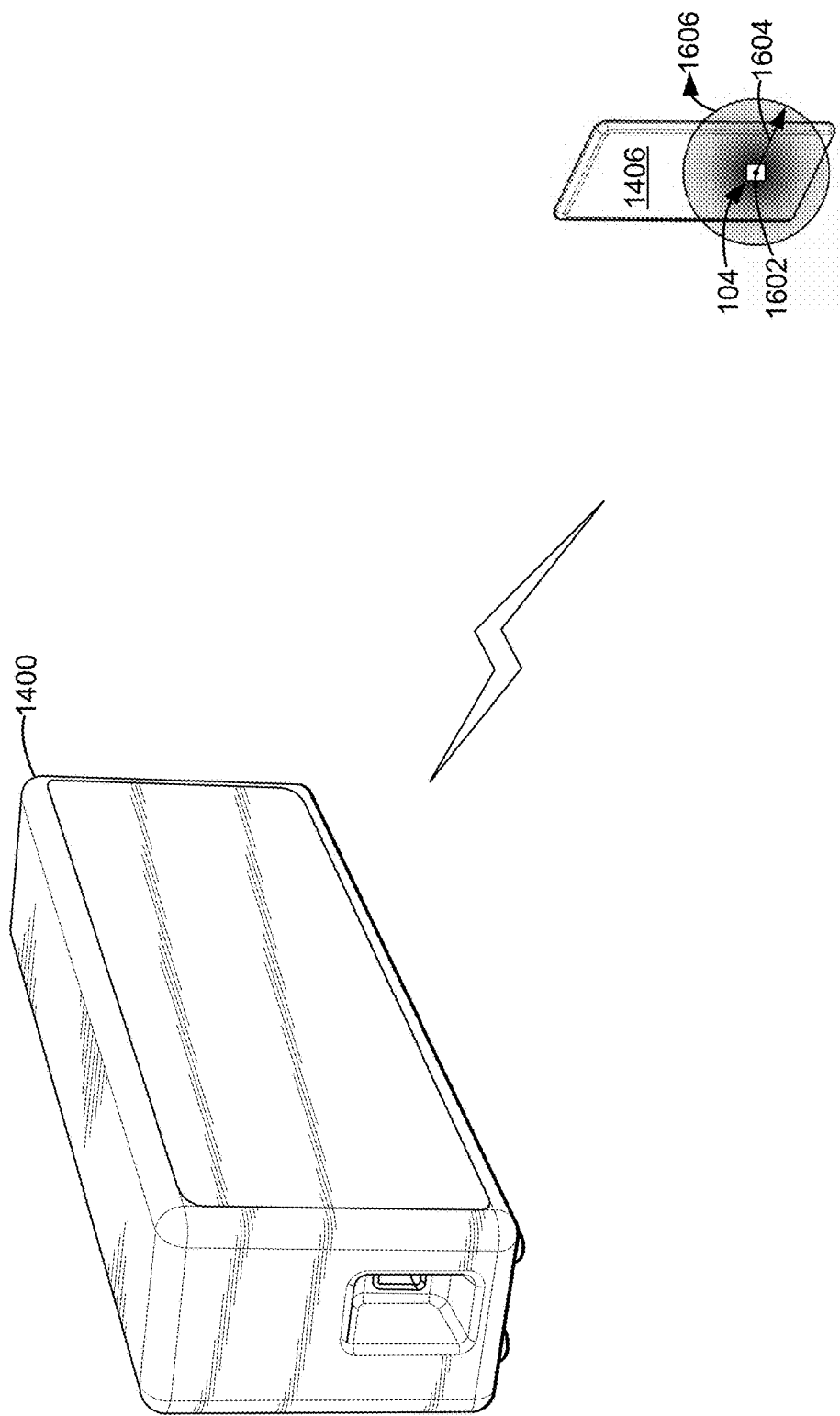
FIG. 16 illustrates an example of the RF energy focused within an operating area that includes the location of a wireless-power receiver decaying or rolling-off by a predetermined amount at a predetermined distance increment from the peak amount of RF energy in accordance with some embodiments.

In some embodiments, the one or more safety thresholds include a predetermined roll-off (between 1-6 dB) at a predetermined distance increment relative to a peak amount of RF energy produced by radiated RF energy. In some embodiments, the wireless-power transmission system determines that transmitting the RF signal would satisfy the one or more safety thresholds when it is determined (e.g., by using stored values (within LUTs) in memory 206 and/or by making predictions based on the stored values (within LUTs) in memory 206) that transmitting the RF signal would create a peak amount of RF energy at the wireless-power receiver that has the predetermined roll-off for each predetermined distance increment relative to the peak amount of RF energy. In some embodiments, the predetermined distance increment is about 8 cm. In some embodiments, "about 8 cm" refers to +/−0.5 cm of 8 cm. Other values are also with the scope of this disclosure and discussed below with respect to FIGS. 16 and 17. Examples of the predetermined roll-off for each predetermined distance increment relative to the peak amount of RF energy are provided below in FIGS. 16 and 17. For example, as shown in FIG. 16, RF energy is focused within an operating area that includes the location of the receiver and begins to decay (e.g., roll-off) further away from the receiver. While the primary example given here for illustrative purposes is a predetermined 3 dB roll-off value, in some embodiments, other suitable predetermined roll-off values can be utilized (e.g., as described below in FIGS. 16 and 17).

The maximum SAR value and predetermined e-field roll-off (or, simply, predetermined roll-off) safety thresholds are referred to as user-safety thresholds as these thresholds are used to ensure transmission of wireless power in a way that is safe for humans and other sensitive objects. In some embodiments, and as was discussed above, satisfaction of the user-safety thresholds can be determined by designing the wireless-power-transmission system to operate using transmission settings (e.g., PA output power, frequency, etc.) that ensure the system will comply with the user-safety thresholds (e.g., the system undergoes simulation, characterization, and manufacturing tests before the system is placed into use; while, in other embodiments, the system can make determinations concerning satisfaction of the user-safety thresholds while the system is in use. In certain circumstances, a combination is utilized in which the system is designed to ensure compliance with the user-safety checks and the system also performs on-the-fly determinations to ensure that the user-safety thresholds remain satisfied during use.

In addition to the user-safety thresholds, the system can also utilize power-amplifier-protection thresholds, e.g., thresholds designed to ensure that the PA will not be damaged while operating at a given output power level and a given operating impedance. Examples of the power-amplifier-protection thresholds include global maximum and global minimum power levels, impedance thresholds, VSWR thresholds, and power dissipation thresholds. These examples are discussed in turn below.

In some embodiments, the one or more safety thresholds include global maximum and global minimum (output) power levels for the power amplifier. In some embodiments, receivers (or a device receiving charge therefrom) can communicate new or updated charging information that then causes the wireless-power transmission system to select and use a new power level for amplifying RF signals, provided that the new power level is within the boundaries of the global max and min values (based on the wireless-power transmission system and stored in memory 206). An example of the wireless-power transmission system utilizing communicated charging information is shown and described with reference to FIGS. 14A-14E).

In some embodiments, the one or more safety thresholds include impedance thresholds. The impedance thresholds indicate that the operational impedance of the power amplifier is at a safe level (e.g., within the operational limits of the power amplifier such that the power amplifier would not be damaged). In some embodiments, the impedance thresholds are each associated with a particular measurement point in and around the PA (such that the system can check to verify that the impedance at any particular point within the PA is within the associated impedance threshold. Additionally, or alternatively, the system can use the measurements from in and around the PA to determine an operating impedance for the PA (e.g., an aggregate impedance based on the individual impedance measurements). In some embodiments, the wireless-power transmission system determines the operational impedance at the power amplifier based on stored measurement values for parametric parameters (which measurement values are obtained based on the individual impedance measurements). In some embodiments, the wireless-power transmission system determines that transmitting the RF signal will satisfy the one or more safety thresholds when it is determined (e.g., by referencing LUTs in memory 206 and/or making predictions based on the LUTs and the dynamically obtained impedance measurements) that using the selected power level to amplify the RF signal would keep the operational impedance at the power amplifier within an impedance threshold. In some embodiments, the operational impedance at the power amplifier is determined using one or more of the LUTs described above. For explanatory purposes, the Smith charts discussed below are used to visually represent the information included in the LUTs (which is derived from these Smith charts). Detailed descriptions for using the impedance measurements to determine an operational impedance at the power amplifier are provided in FIGS. 7-13.

Alternatively or additionally, in some embodiments, the operational impedance at the power amplifier (e.g., determined based on lookups in the LUTs using the dynamically obtained impedance measurements) is used to optimize performance of the power amplifier. For example, if the operational impedance at the power amplifier is at a level safe but is determined to be non-optimal, the wireless-power transmission system may optimize or re-optimize the power amplifier through adjustment of external circuit elements (e.g., adjustments to capacitors, inductors, matching networks, etc. as described above in FIG. 4). In some embodiments, if the power amplifier is successfully optimized or re-optimized (optimization based on the operational impedance at the power amplifier), the power provided by the power level can be increased to an expected maximum value (based on the satisfaction of the one or more safety thresholds disclosed herein). In particular, the power amplifier voltages may be optimized or re-optimized through incremental adjustment and/or re-calibration until the output power or efficiency is safe and/or optimized. In some other embodiments, the PAIC 161A protects and/or re-optimizes the power amplifier by adjusting hardware functionality and/or the RF power transmitter device 100 firmware. Optimization or power scaling of the wireless-power transmitter device 100 is described below and examples are provided in FIGS. 10-13.

In some embodiments, the one or more safety thresholds include VSWR thresholds. VSWR is a measure of the efficiency in transmitting radio-frequency power from a power source (e.g., the power amplifier) to a load (e.g., an antenna), via a transmission line. In particular, VSWR is a ratio of the maximum voltage to the minimum voltage in standing wave pattern along the length of a transmission line structure. The VSWR thresholds can be obtained during simulation, characterization, and/or manufacture tests of the wireless-power transmitter device 100 and/or one or more antennas of the transmitter device 100 and stored in memory 206 (e.g., in one or more LUTs). The VSWR thresholds can be referenced and/or used to perform the operations disclosed herein. In some embodiments, the VSWR thresholds include different values (e.g., 1, 1.5, 2, 2.5, 3, etc.) that are based on the power amplifier (e.g., VSWR limits of the power amplifier or VSWRs that the power amplifier can support without damage). In some embodiments, the VSWR thresholds are based on other factors such as the housing of the wireless-power transmitter, the number of components and/or temperature of the wireless-power transmitter, operating scenarios (e.g., number of receivers located in the operating area of the system), power levels, and/or configurations of the wireless-power transmitter. In some embodiments, the VSWR thresholds are used by the wireless-power transmission system to determine whether the wireless-power transmitter device 100 needs to perform power scaling. For example, if the wireless-power transmission system determines (using the LUTs or by referencing the LUTs) that the VSWR thresholds are not satisfied, the wireless-power transmission system can perform power scaling to find an output power and operational impedance combination that allows for transmission of wireless power in a way that will not damage the PA. Detailed descriptions and examples of the VSWR thresholds are provided below in FIGS. 10-11.

In some embodiments, the one or more safety thresholds include a power dissipation threshold (also referred to as power dissipation limit). Power dissipation is the amount of wasted or unused energy generated by the power amplifier. In some embodiments, the dissipation threshold is based on at least the power amplifier and obtained during simulation, characterization, and/or manufacture tests of the wireless-power transmitter device 100 and/or one or more antennas of the transmitter device 100. In some embodiments, the power dissipation limit is 10 W, 15 W, 20 W, or other values defined by the power amplifier. In some embodiments, the dissipation limit includes a tolerance of +/−1.5 W. In some embodiments, the dissipation thresholds are stored in memory 206 (e.g., in one or more LUTs). In some embodiments, the dissipation threshold is based on other factors such as the housing of the wireless-power transmitter, the number of components and/or temperature of the wireless-power transmitter, operating scenarios, power levels, and/or configurations of the wireless-power transmitter. In some embodiments, in accordance with a determination that the VSWR thresholds are not (or would not be) satisfied (as described above), the wireless-power transmission system determines whether power scaling is necessary. In some embodiments, if the wireless-power transmission system determines that a determined power dissipation (e.g., determined by referencing LUTs in memory 206 and/or referencing LUTs when analyzing an impedance measurement) is greater than a power dissipation threshold, the wireless-power transmission system performs power scaling. In some embodiments, power scaling is the adjustment of a selected power level of the power amplifier until a maximum power output can be achieved. In some embodiments, if the wireless-power transmission system determines that the determined power dissipations are not greater than the power dissipation threshold, the wireless-power transmission system forgoes performing power scaling. Detailed descriptions and examples of the dissipation threshold are provided below in FIGS. 12-13.

In some embodiments, after determining that the selected power level (while the power amplifier has the operational impedance determined above) satisfies the one or more safety thresholds, the wireless-power transmission system instructs the power amplifier to amplify the RF signal using the selected power level (while operation with the operational impedance) to create an amplified RF signal. As described herein, the wireless-power transmission system performs the above described functions without any beamforming (e.g. forgoing beamforming to modify the phase, gain, etc., or without having any beamforming circuitry available in the system at all). In some embodiments, the safe power level at which to generate the RF signal increases as the distance between the wireless-power receiver between and the wireless-power transmission system increases. In some embodiments, if the wireless-power transmission system determines that there is no safe power level at which to generate the RF signal, the wireless-power transmission system instructs the power amplifier to shut down.

In some embodiments, after instructing the power amplifier, the power amplifier provides the amplified RF signal to the one or more antennas, the one or more antennas caused to, upon receiving the amplified RF signal, radiate RF energy that is focused in the operating area that includes the wireless-power receiver while forgoing any active beamforming control. In some embodiments, the system is capable of focusing the RF energy at the wireless-power receiver, which means that a peak level of RF energy is at its maximum at the location of the wireless-power receiver.

As discussed above, in some embodiments, the wireless-power transmission system determines whether: a power level of the power amplifier needs to be changed, operation of the power amplifier needs to be optimized, the power amplifier needs to be shut down, the power amplifier can continue to provide power, and/or perform control and/or management functions on the power amplifier in some way. In some embodiments, one or more of these identified functions are performed when the wireless-power transmission system determines that there is a wireless-power receiver and/or foreign object within the transmission range of the wireless-power transmitter device 100 (e.g., whether the wireless-power receiver and/or foreign object is in contact with a charging surface, and/or, while using one or more sensors, the wireless-power transmitter detects and/or classifies the wireless-power receiver and/or foreign object in an operating area (further away from the charging surface of wireless-power transmitter).

In some embodiments, the wireless-power transmission system determines (by using and/or referencing the LUTs) if there is a change in the detected impedance (e.g., impedance discontinuity based on the impedance measurements). In some embodiments, detected changes in impedance triggers a receiver acquisition loop. The receiver acquisition loop is used to classify a receiver and/or foreign object. In some embodiments, the classifications include the classification could include valid receiver (e.g., authorized receiver), foreign object, and receiver and foreign object. In some embodiments, the detected changes in impedance are based on movement of a wireless-power receiver and/or foreign object within the wireless-transmission field, a wireless-power receiver and/or foreign object entering and/or leaving the wireless-transmission field, and/or other circumstances that result in a change to the impedance. Classification of a receiver and or foreign object is explained in more detail in reference to FIGS. 3A-4 and 9A-9B of PCT Patent Application No. PCT/US2019/015820, which is incorporated by reference in its entirety for all purposes.

Alternatively or additionally, in some embodiments, an authorized wireless power receiver is a receiver that has been authorized through a secure component (e.g., secure element module 234) such as an identification number to receive wireless power from a wireless power transmission system. In some embodiments, an authorized wireless power receiver is a receiver that has been configured to receive wireless power from a wireless power transmission system. In some embodiments, a receiver that has not been configured to receive wireless power from a wireless-power transmission system is not authorized wireless-power receiver. Receivers determined not to be authorized receivers are treated as foreign objects. Authorization of receivers is discussed above in reference to FIGS. 2A and 2B.

In some embodiments, the wireless-power transmission system adjusts the power level and/or or shifts where the RF energy (e.g., by activating a different feed point of multiple feed points available for the antenna) is transmitted to avoid any detected foreign objects while the foreign object(s) is (are) within the transmission range. In some other embodiments, the wireless-power transmission system stops transmitting RF energy if a foreign object is detected within the transmission range. In some embodiments, while a foreign object is within the transmission range, the wireless-power transmission system selects a power level and/or shifts the transmitted RF energy to focus on an authorized receiver and/or avoid damaging the foreign object and/or power amplifier, if possible. In some embodiments, even if a foreign object is not within the transmission range, the wireless-power transmission system can select a power level and/or shift the transmitted RF energy to focus on the authorized receiver as discussed herein. As mentioned above, adjustments to the selected power level, radiation profile (e.g., static or dynamic antenna tuning), selected active antennas, and/or other adjustments are based on referencing stored values (in LUTs within memory 206) obtained during simulation, characterization, and/or manufacture tests of the wireless-power transmitter device, and/or referencing the stored values with dynamically obtained measurements.

Figure 6:
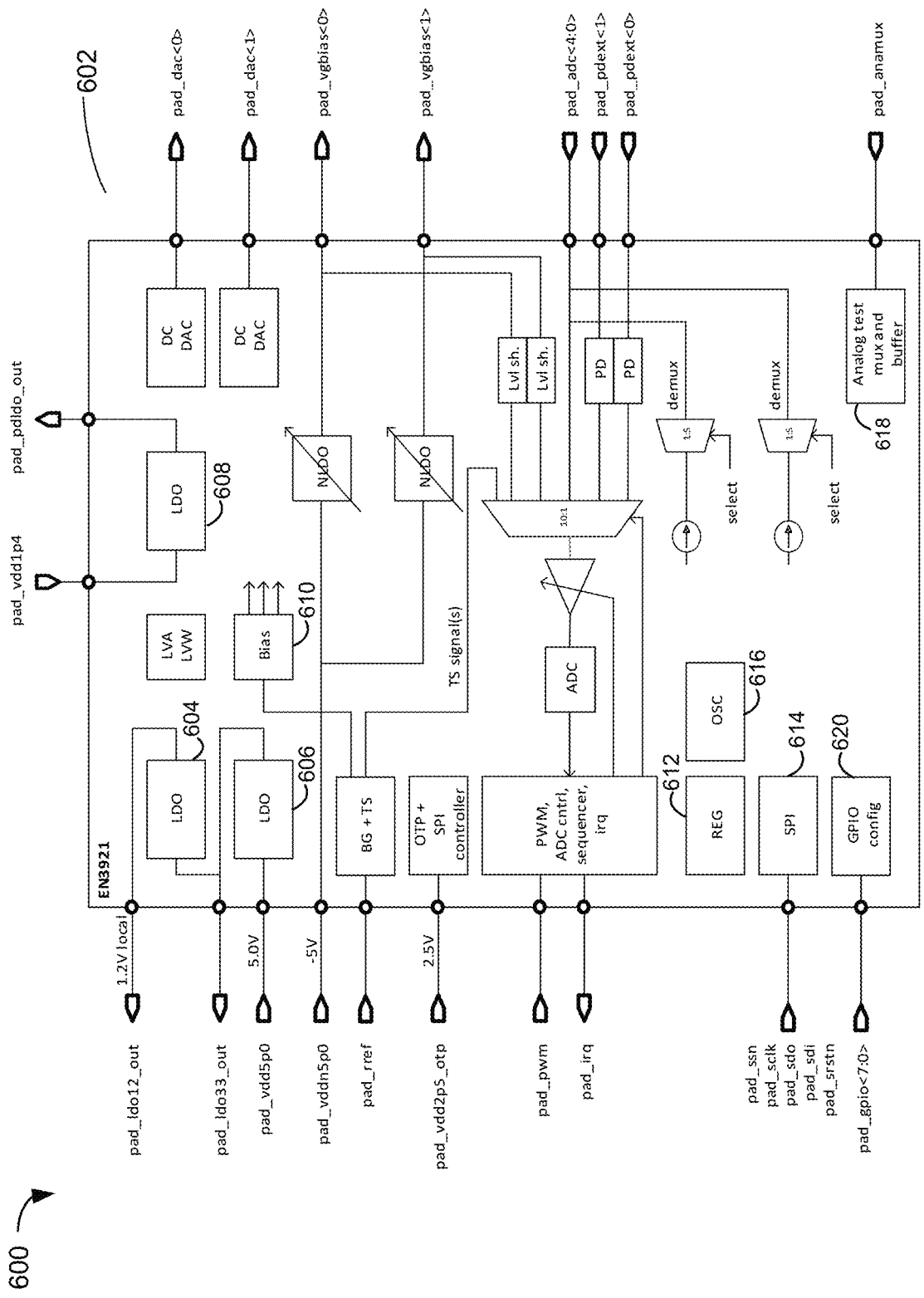
FIG. 6 shows a power amplifier controller engineering diagram in accordance with some embodiments.

FIG. 6 shows a power amplifier controller engineering diagram 600, according to some embodiments.

In some embodiments, the power amplifier includes a controller 602 (e.g., PAIC 161A). Alternatively or additionally, in some embodiments, the RFIC 160 includes the controller 602. In some embodiments, the controller 602 a standalone component coupled to the RFIC 160 and/or the power amplifier. In some embodiments, the power amplifier controller 602 includes an LDO (Low Dropout) 604. In some embodiments, the power amplifier controller 602 includes an LDO 606. In some embodiments, the power amplifier controller 602 includes an LDO 608. In some embodiments, the power amplifier controller 602 includes a Bias 610. In some embodiments, the power amplifier controller 602 includes an REG (register) 612. In some embodiments, the power amplifier controller 602 includes an SPI (serial peripheral interface) 614. In some embodiments, the power amplifier controller 602 includes an OSC (e.g., on-board calibrated oscillator) 616. In some embodiments, the power amplifier controller 602 includes an Analog test mux and buffer 618. In some embodiments, the PAIC 161A includes flexible general-purpose input/output (GPIO) 620.

In some embodiments, the PAIC 161A includes a system status state machine with programmable alarm thresholds and/or an interruption request (IRQ) generator. In some embodiments, the PAIC's 161A includes multi-output negative bias control. In some embodiments, the PAIC's 161A includes at least one or more of: multi-channel ADCs and DACs, dual power detectors, and a temperature sensor. In some embodiments, one or more modules within the power amplifier controller 602 are optional. For instance, to control the power amplifier, the PAIC 161A utilizes the single digital pin for the power amplifier enable/disable (e.g., power amplifier sequencing discussed above), the multi-output negative bias control, and the on-board calibrated oscillator. To perform impedance detection/sensing, the PAIC 161A utilizes the system status state machine with programmable alarm thresholds, the IRQ generator, the multi-channel ADC and DAC, dual power detectors, the temp sensor, the SPI high speed host interface, and the flexible GPIO. In some embodiments, the PAIC 161A can be split into two separate chipsets to control the power amplifier and perform impedance detection/sensing, respectively.

FIGS. 7-13 are provided for illustrative purposes to explain how one or more LUTs are constructed to reflect measurement values for parametric parameters that are determined during simulation, characterization, and manufacturing tests of the wireless-power-transmission system. Thus, while FIGS. 7-13 show visual representations of Smith charts and certain values for parametric parameters based on those Smith charts, it should be understand that the system need not re-determine the measurement values for parametric parameters on-the-fly, instead these values are stored in the LUTs in a memory accessible by a CPU (e.g. RFIC 160 and/or PAIC 161A). For example, impedance measurements from in and around the PA can be used to lookup the stored values in the LUTs for the parametric parameters, and those stored values then allow the system to determine an operational impedance (or PA output power, or combination of both) that complies with the one or more safety thresholds described herein.

Figure 7:
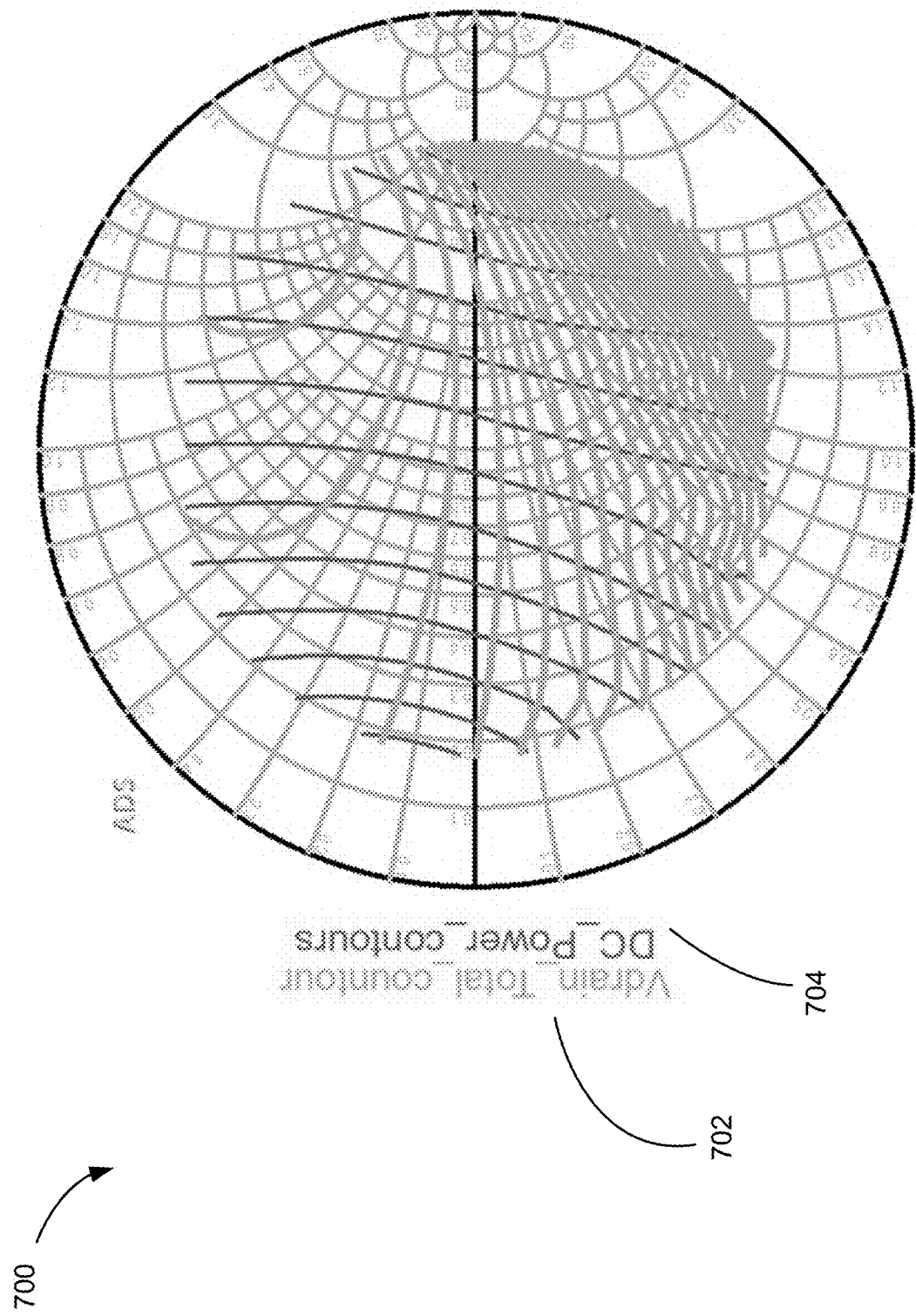
FIG. 7 shows a plot of a Smith chart as a visual aid for representing possible impedances measured from various measurement points in accordance with some embodiments.

FIG. 7 shows a sample plot of a Smith chart 700 representing possible impedances measured from the various measurement points discussed above with reference to FIG. 4, in accordance with some embodiments. In some embodiments, different sets of measurement values (based on parametric parameters) are obtained from various measurement points corresponding to the one or more measurement points illustrated above in FIG. 4. The different sets of measurement values, when plotted on a Smith chart, represent best operational impedances of the power amplifier. As mentioned above in reference to FIG. 4, the different measurement sets are obtained during simulation, characterization, and/or manufacturing tests of the wireless-power transmitter device 100. Alternatively or additionally, the different sets of measurement values are obtained through characterization of the electronic device (e.g., wireless-power receiver) and/or foreign object as these devices/objects are placed near or on the wireless-power transmitter device 100. The different sets of measurement values correspond to one or more power levels of the power amplifier, configurations of the wireless-power transmitter device 100, detected and/or connected wireless-power receivers, detected foreign objects (organic, inorganic, animate, and/or inanimate), and/or other operational conditions. In some embodiments, the different sets of measurement values described herein are used to define the impedance thresholds used in conjunction with the one or more safety thresholds that were described above.

In some embodiments, the different sets of measurement values are stored and used to determine the operational impedance of a power amplifier before and/or while RF energy is provided to a wireless-power receiver (e.g., stored sets of measurement values are used as impedance thresholds; included in the LUTs). For example, stored sets of measurement values can be used as baselines when analyzing dynamically (e.g., during operation) obtained measurement values (referred to as impedance measurements) to determine the operational impedance of a power amplifier before and/or while RF energy is provided to a wireless-power receiver. Similarly, stored sets of measurement values can be used as initial baseline for operating the power amplifier before any RF energy has been transmitted. The impedance measurements are obtained (dynamically or through periodic polling) from the various measurement points during operation of the wireless-power transmitter device 100, and based on parametric parameters. In some embodiments, the impedance measurements are stored with the sets of measurement values obtained during simulation, characterization, and/or manufacturing tests for future use in determining the operational impedance of a power amplifier. In this way, performance of the impedance determination methods disclosed herein are improved over time. A detailed explanation of the use of one or more plots of Smith charts is described below with reference to FIGS. 9-13.

In some embodiments, the different sets of measurement values generate one or more contours when plotted (e.g., mapped) on the Smith chart. Each value of the one or more contours plotted on the Smith chart represents an operational impedance of the power amplifier. In some embodiments, one or more contours of a first measurement set of the different measurement sets correspond to a first parametric parameter and are generally orthogonal (sometimes referred to as orthogonal for simplicity below) to one or more contours of a second measurement set of the different measurement sets that correspond to a second parametric parameter. In some embodiments, one or more orthogonal contours (e.g., contours corresponding to the first and second measurement sets) are plotted together on a single Smith Chart. In some embodiments, each intersection of the one or more orthogonal contours plotted on the single Smith chart represents a known operational impedance of the power amplifier. These representative known operational impedances (based on measurement values for at least two parametric parameters) of the power amplifier are included in the LUTs stored in memory (e.g., memory 206) and used by the wireless-power transmission system and/or methods of operational thereof that are described herein. In some embodiments, valid operational values can be predicted based the representation known operational impedances (e.g., calculating extrapolations based on the representation known operational impedances to determine other potentially valid operational impedances; extrapolations that could be included in the LUTs stored in memory 206). In some embodiments, portions of the one or more orthogonal contours that do not intersect or intersect multiple times do not map to valid operational impedances (e.g., represent impedances that could damage the power amplifier). These representative invalid (or harmful) impedances (based on measurement values for at least two parametric parameters) of the power amplifier can be included in the LUTs stored in memory (e.g., memory 206) and flagged as invalid operational impedances (in some embodiments, the LUTs can be constructed so that the invalid operational impedances are not included, such that the LUTs only include safe operational impedances). In some embodiments, the wireless-power transmitter device 100 determines valid and/or invalid operational impedances (e.g., impedance thresholds) based on the measurement values of at least two parametric parameters.

Returning to the example plot of Smith chart 700, in some embodiments, the different sets of measurement values for at least two parametric parameters, such as the total voltage at the drain of the power amplifier 702, and the DC power 704, are plotted on the Smith chart, such that the Smith chart 700 represents possible impedances under different scenarios for a given power level of the PA. In particular, the different measurement sets for the total voltage at the drain of the power amplifier 702 and the DC power 704 are plotted on the Smith Chart 700, and the different measurement sets for the total voltage at the drain of the power amplifier 702 and the DC power 704 generate respective contours. In some embodiments, the contours of the different measurement sets for the total voltage at the drain of the power amplifier 702 and the DC power 704 are generally orthogonal to each other as shown in FIG. 7. In some embodiments, the intersections of the contours of the different measurement sets (based on parametric parameters) corresponds to a valid operating impedance of the one or more power amplifiers for a wireless-power transmitter device 100. As described below in reference to the examples in FIGS. 9-13, in some embodiments, the valid operating impedances can be used to determine (e.g., predict) the operational impedance of the power amplifier based on one or more impedance measurements before providing power to a wireless power receiver and/or during operation of the wireless-power transmitter device 100.

Figure 8:
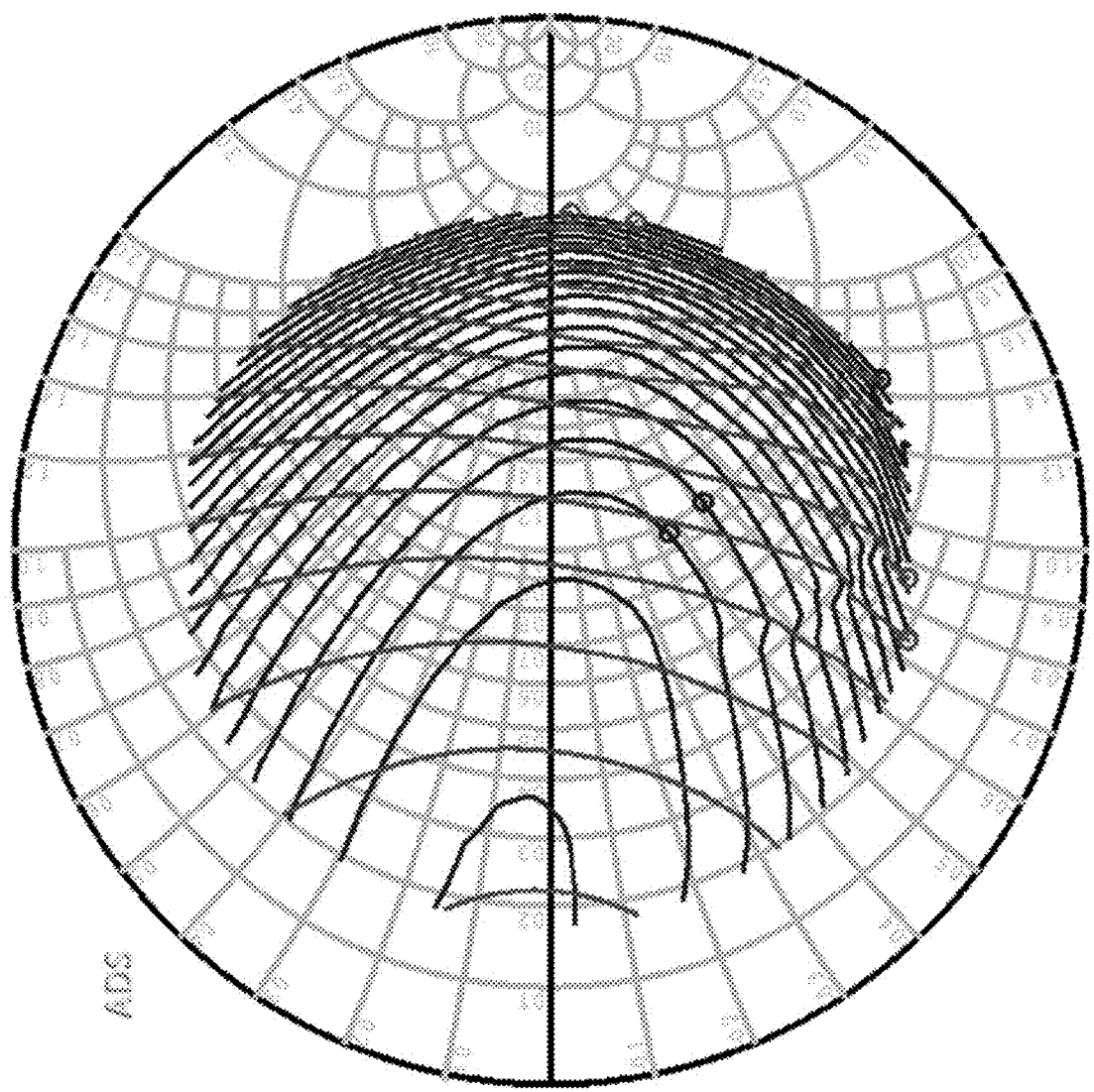
FIG. 8 shows a plot of a Smith chart as a visual aid for representing possible impedances measured from other various measurement points in accordance with some embodiments.

FIG. 8 shows another example of a plot of a Smith chart 800 representing possible impedances measured from the various measurement points, in accordance with some embodiments. Again, the visual depiction reflects operations that can be used to populate the one or more LUTs that are then referenced by the system in use. In some embodiments, different measurement sets for different combinations of parametric parameters can be used to determine the operational impedance for the power amplifier. For example, different measurement sets for different parametric parameters, such as the Output voltage of the power amplifier 802, and the Dissipated power 804, allow the plot of the Smith chart 800 to represent possible impedances under different scenarios. Examples of the different scenarios include: one or more receivers within a transmission field, one or more foreign objects in the transmission field, or any combination of one or more receivers and one or more foreign objects in the transmission field, location of the one or more receivers and/or foreign objects within the transmission field, other receiver specific information (e.g., device configurations/specifications, power requests, etc.), different configurations of the RF power transmitter device 100 (e.g., hardware and/or firmware configurations), one or more power amplifier power levels, and/or other scenarios described herein. As mentioned above in reference to FIG. 7, the different measurement sets for different parametric parameters of the power amplifier are stored and used to determine the operational impedance of a power amplifier before and/or while RF energy is provided to a wireless-power receiver. A detailed explanation of the use of one or more plots of Smith charts to produce the information stored in the LUTs is described below in FIGS. 9-13.

In some embodiments, by obtaining different measurement sets for a combination of different parametric parameters from the various measurements points depicted in FIG. 4, the operational impedance for the power amplifier can be determined (e.g., by comparing the value to the LUTs or referencing the LUTs to predict the impedance). In some embodiments, when a condition to shut down the power amplifier is determined by using the stored values in the LUTs (e.g., the operational impedance cannot be made safe given the system's current operating conditions), the power amplifier can be shut down immediately to prevent damage to the transmitter device (including the PA and other circuitry) and/or to the foreign object.

Various design aspects of the wireless power transmitting system including the impedance detection and characterizing functions (including foreign object detection, receiver classification, and/or other scenarios reflected by detected impedance changes), such as the dimensions of the foreign object detection system, the dimension and configuration of the PAIC 161A (illustrated in FIGS. 4 and 5), the dimension of the antenna ground plane, size, shape, spacing, and arrangement of the two or more antenna arms, impedance and operating frequency of the antenna arms, and the configuration between the antenna ground plane, and antenna arms, size and arrangement of the power amplifiers are selected (e.g., optimized using a cost or performance function) for transmitting desired wireless wave characteristics. Wireless wave transmitting characteristics that vary based on the above design aspects include, e.g., size, volume, materials, weight, cost, fabrication efficiency, radiation efficiency, impedance, and/or frequency range (for transmission and/or reception of electromagnetic waves and other wireless waves by the antenna).

Figure 9:
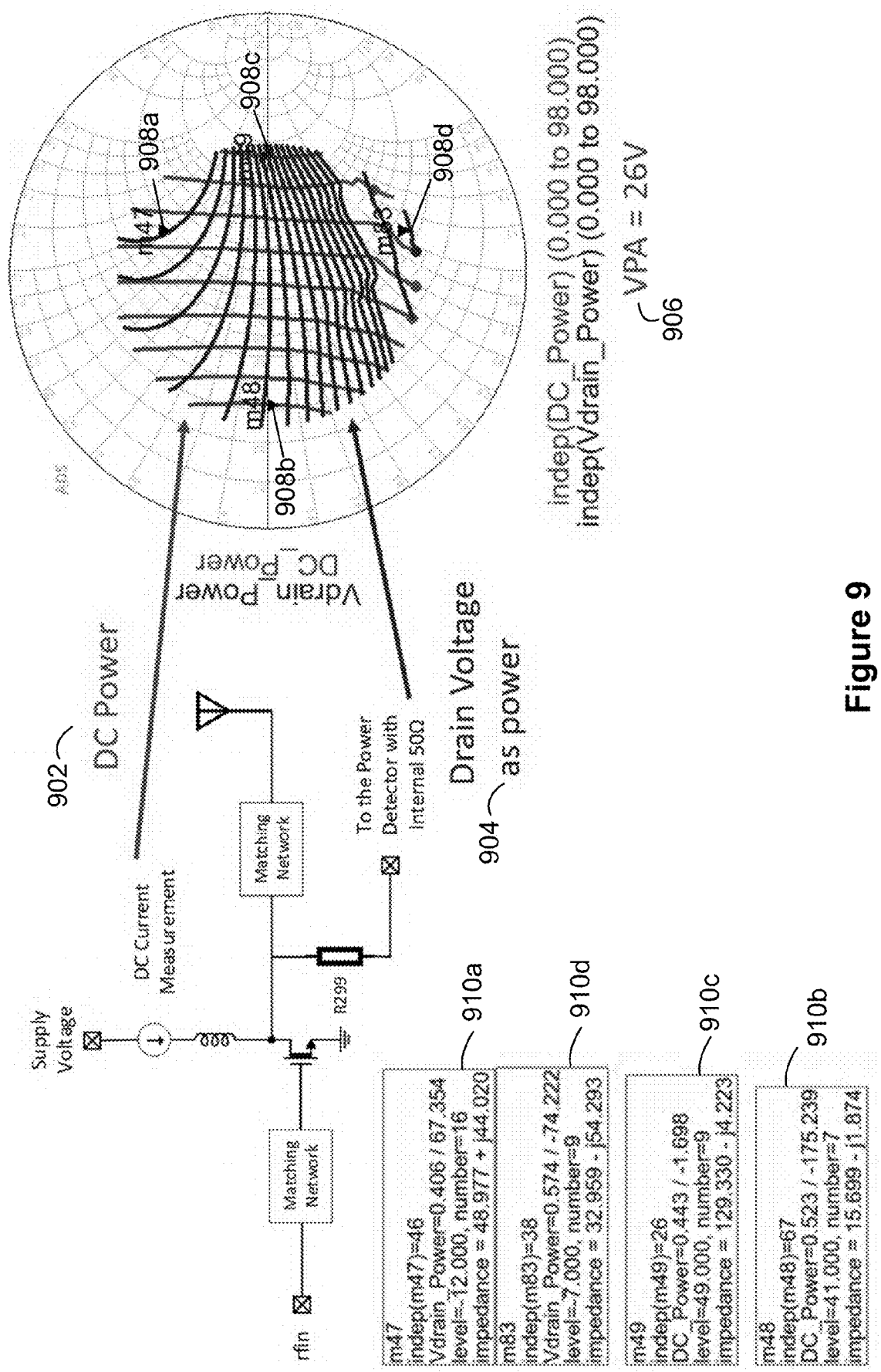
FIG. 9 shows an example mapping of a combination of parametric parameters (measured from various measurement points) on a plot of a Smith chart as a visual aid for determining the operational impedance of the power amplifier in accordance with some embodiments.

FIG. 9 illustrates a visual aid for describing impedance determinations in accordance with some embodiments. In particular, FIG. 9 shows an example mapping of measurement values for a combination of at least two parametric parameters (determined based on values from at least some of the various measurement points) on a plot of a Smith chart to determine (e.g., predict) the operational impedance of the power amplifier, in accordance with some embodiments. In particular, FIG. 9 shows a combination of measurement values (for at least two different parametric parameters) obtained from measurement points within the wireless-power transmitter device 100 (as described with reference to FIG. 4) and dynamically obtained measurements (referred to as impedance measurements herein) at a particular output power level of the power amplifier (e.g. 26V).

As shown in FIG. 9, the measurement values for the parametric parameters DC power 902 and power amplifier drain voltage 904 at a power level 906 of 26V are plotted on a Smith chart. In some embodiments, the measurement values for the parametric parameters DC power 902 and power amplifier drain voltage 904 (as power), when plotted on the Smith chart, generate respective contours that are generally orthogonal to each other. As described above, the orthogonal contours can be used to determine valid (e.g, non-damaging) operating impedances of the power amplifier. In particular, each intersection maps to an operating impedance, and the wireless-power transmitter device 100 determines valid and safe impedances (impedance thresholds) based on these contours and/or intersections. Contours, or portions thereof, that do not intersect and/or intersect multiple times represent power conditions that do not map uniquely to valid impedances, and the wireless-power transmitter device 100 determines invalid and unsafe impedances (impedances known to damage the power amplifier) based on these contours and/or portions thereof. These valid and invalid operational impedances are stored in the LUTs, in some embodiments, and used to determine operational impedance at the power amplifier during operation.

In the example shown in FIG. 9, contours for the measurement values for the parametric parameters DC power 902 and PA drain voltage 904 (shown as power) at a power level 906 of 26V are plotted on a Smith chart and used to determine operational impedance at the power amplifier. In particular, FIG. 9 is a visual representation of the processes performed by the CPU (e.g., the RFIC 160 and or PAIC 161A). In some embodiments, during operation, the process includes using measurement values for parametric parameters stored in memory (within LUTs) as a baseline in determining safe operation of the power amplifier (without plotting values on the Smith chart). Specifically, the LUTs can be used to select the appropriate power level or used as a reference point for dynamically obtained measurement points. FIG. 9, as a visual aid in explaining the process, shows contours for stored measurement values for parametric parameters loaded from memory and plotted on a Smith chart and used as a baseline in determining safe operation of the power amplifier.

In some embodiments, one or more impedance measurements (908*a*-908*d*) from among multiple measurement points of the power amplifier are obtained dynamically (e.g., during operation, through periodic polling, and/or use of interrupts, etc.). For example, as depicted in FIG. 9, impedance measurements 908*a* (m47) and 908*d* (m83) correspond to the parametric parameter for PA drain voltage and impedance measurements 908*b* (m48) and 908*c* (m49) correspond to the parametric parameter for DC power, and each impedance measurement (908*a*-908*d*) is obtained dynamically (or through periodic polling and/or use of interrupts) while the power amplifier is operating at a power level of 26V. In some embodiments, the one or more impedance measurements (908*a*-908*d*) are plotted along with the contours for the measurement values for the parametric parameters DC power 902 and PA drain voltage 904 at a power level 906 of 26V to determine whether the operational impedances at the power amplifier are within impedance thresholds.

Because each impedance measurement (908*a*-908*d*) maps to at least one of the contours, the wireless-power transmitter device 100 can determine (e.g., predict) that the operational impedance at the power amplifier is within the impedance thresholds for the power level (in this case, 26V). In other words, because the stored measurement values for parametric parameters obtained during simulation, characterization, and/or manufacturing tests of the wireless-power transmitter device 100 identify valid impedances of the power amplifier (and are used as information to populate the LUTs), the wireless-power transmitter device 100 can determine (e.g., predict) that an operational impedance of the power amplifier is within the impedance thresholds when the impedance measurements (908*a*-908*d*) are map to the LUTs (e.g., on and/or near an measurement values within the LUTs). In some embodiments, if an impedance measurement (908*a*-908*d*) does not map to the LUTs, the wireless-power transmitter device 100 determines that the operational impedance of the power amplifier is not within the impedance thresholds and causes the power amplifier to select a new power level, shutdown, and/or perform other functions described herein.

Also shown in FIG. 9 are information blocks 910*a*-910*d*. In some embodiments, information blocks 910*a*-910*d* correspond to information determined based on impedance measurements 908*a*-908*d*, respectively, and which can be used to determine the operational impedance and/or a number of other values for the power amplifier. For instance, impedance measurements 908*a* (m47) and 908*d* (m83) for the parametric parameter PA drain voltage 904 allow for determining information blocks 910*a* and 910*d*, respectively. Information block 910*a* indicates that the voltage drain at impedance measurement 908*a* (m47) is −12 W and the impedance at impedance measurement 908*a* (m47) is 48.97+j44. Information block 910*d* indicates that the voltage drain at impedance measurement 908*d* (m83) is −7 W and the impedance at impedance measurement 908*d* (m83) is 32.95−j54.29. Similarly, impedance measurements 908*b* (m48) and 908*c* (m49) for the parametric parameter DC power allow for determining information blocks 910*b* and 910*c*, respectively. Information block 910*b* indicates that the DC power at impedance measurement 908*b* (m48) is 41 W and the impedance at impedance measurement 908*b* (m48) is 15.69−j1.87. Information block 910*c* indicates that the DC power at impedance measurement 908c (m49) is 49 W and the impedance at impedance measurement 908c (m49) is 129.33−j4.22.

Although FIG. 9 shows contours for measurement values with parametric parameters for DC power 902 and PA drain voltage 904 (shown as power) at a power level 906 of 26V, different parametric parameters and/or operating conditions (e.g., power levels, wireless-power transmitter device 100 configurations, etc.) can be used to determine operational impedances. As described above, different contours for measurement values (based on different parametric parameters) are known by simulation, characterization (device and/or system), or manufacturing test of the wireless-power transmitter device 100, learned through use of the wireless-power transmitter device 100, or other scenarios described above. The information illustrated in the various information blocks discussed above can be stored in the one or more LUTs described herein.

Figure 10:
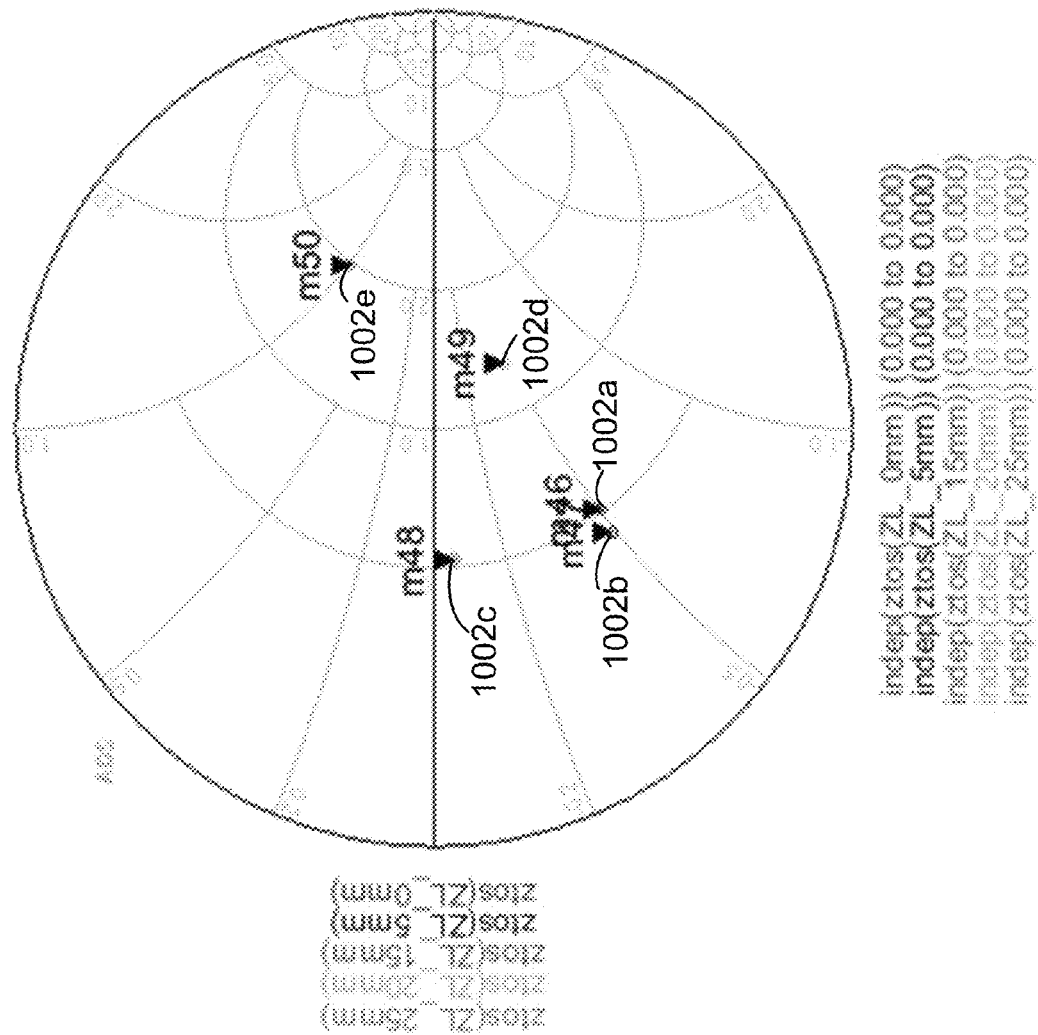
FIGS. 10 and 11 illustrate different uses of the impedance measurements in accordance with some embodiments.
Figure 11:
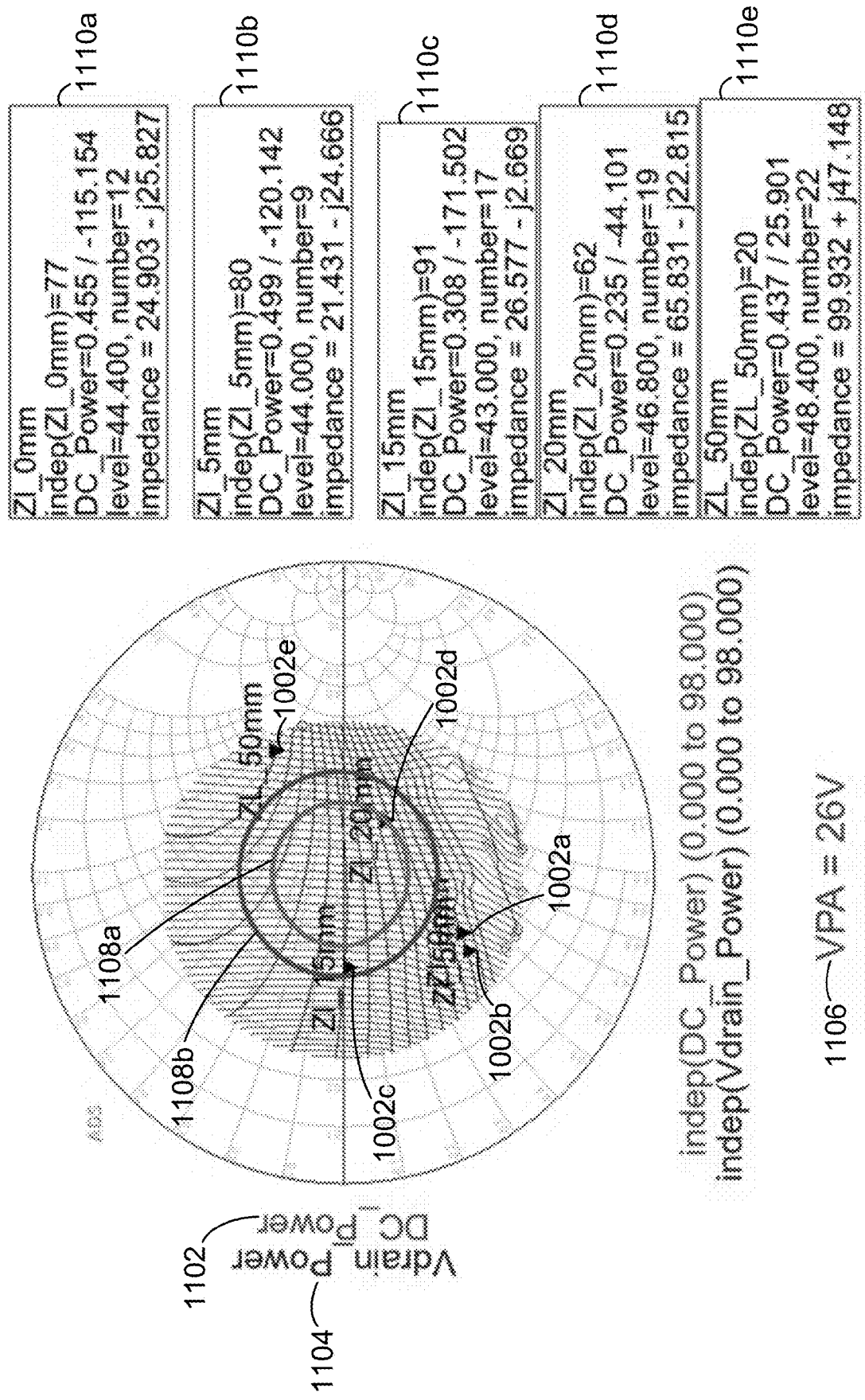

FIGS. 10 and 11 are additional visual aids that illustrate different uses of the impedance measurements in accordance with some embodiments. Similar to FIG. 9, FIGS. 10-11 are visual representations of the processes performed by the CPU (e.g., the RFIC 160 and or PAIC 161A). In operation, the CPU does not necessarily plot values on one or more Smith charts, but can reference LUTs as disclosed herein.

In FIG. 10, different impedance measurements (1002a-1002e) (obtained from measurement points within the wireless-power transmitter device 100; as shown and discussed with reference to FIG. 4) are shown in relation to antenna displacement from an optimal position (e.g. a position directly on (or in front of) the antenna, or centered within the transmitted RF energy by the antenna). In other words, in FIG. 10 the different impedance measurements (1002a-1002e) are obtained for different locations from the optimal position (or location at which the RF energy is focused).

As shown by the Smith Chart, plotted impedance measurement values (1002a-1002e) can be used to determine operational impedances, the operational impedances varying by the distance between a receiver (or foreign object) and the optimal position. For instance, impedance measurement 1002a (m46), as shown in information block 1004a, corresponds to a 0 mm offset from the optimal antenna position (e.g., on the antenna or directly centered on the transmitted RF energy by the antenna). The determined operational impedance for the impedance measurements 1002a is 25.35−j25.31 at the optimal position. Impedance measurement 1002b (m47), as shown in information block 1004b, corresponds to a 5 mm offset from the optimal position (e.g., 5 mm from the antenna or 5 mm from the center of the transmitted RF energy by the antenna). The determined operational impedance for the impedance measurements 1002b is 21.82−j24.49 at 5 mm away from the optimal position. Impedance measurement 1002c (m48), as shown in information block 1004c, corresponds to a 15 mm offset from the optimal position. The determined operational impedance for the impedance measurements 1002c is 26.09−j2.71 at 15 mm away from the optimal position. Impedance measurement 1002d (m49), as shown in information block 1004d, corresponds to a 20 mm offset from the optimal position. The determined operational impedance for the impedance measurements 1002d is 64.35−j22.77 at 20 mm away from the optimal position. Impedance measurement 1002e (m50), as shown in information block 1004e, corresponds to a 25 mm offset from the optimal position. The determined operational impedance for the impedance measurements 1002e is 98.35+j49.64 at 25 mm away from the optimal position.

In some embodiments, a location of a receiver can be determined (e.g., predicted) based on the impedance measurements (e.g., 1002a-1002e) and, optionally or alternatively, additional information provided by one or more sensors of the wireless-power transmitter device 100. In particular, the one or more sensors can detect and/or classify a receiver and/or foreign object (in an operational zone) and provide the information to the wireless-power transmitter device 100 that also receives impedance measurements. The wireless-power transmitter device 100 uses the information from the one or more sensors and the impedance measurements (to perform lookups in the LUTs) to determine (or predict) the location of the receiver and/or foreign object). As shown in FIG. 10, different operational impedances for the different impedance measurement (e.g., 1002a-1002e) when plotted on a Smith chart show a relative a location of a receiver and/or foreign object form an optimal position. In some embodiments, the wireless-power transmitter device 100 can optimize performance based on the impedance measurement (e.g., system power control loop implemented in firmware, power scaling as described in FIGS. 12-13, adjust of external circuit elements, etc.). In some other embodiments, the wireless-power transmitter device 100 can optionally re-tune using external tuning components (as discussed above with reference to FIG. 4).

In FIG. 11, the different impedance measurements (1002a-1002e; the same impedance measurements as FIG. 10) are shown superimposed over contours for measurement sets based on parametric parameters for DC power 1102 and PA drain voltage 1104 at a power level 1106 of 26V. FIG. 11 is used as a visual aid for the processes performed by the CPU (e.g., the RFIC 160 and or PAIC 161A). The measurement sets for the parametric parameters DC power 1102 and PA drain voltage 1104 are plotted on a Smith chart (as described in FIG. 9). In some embodiments, VSWR thresholds, when plotted on the Smith chart, are represented as one or more VSWR circles (e.g., 1108a and 1108b). In some embodiments, the one or more VSWR circles (e.g., 1108a and 1108b) include different values (e.g., 1, 1.5, 2, 2.5, 3, etc.). In some embodiments, the VSWR circles (e.g., 1108a and 1108b) can be used to visually indicate mismatch condition as discussed below (in operation the calculations are performed be referencing LUTs and not by plotting).

In some embodiments, the one or more VSWR circles (e.g., 1108a and 1108b) are used to verify the current status of the wireless-power transmitter device 100. In particular, in some embodiments, the position of the different impedance measurements (1002a-1002e) relative to the one or more VSWR circles (e.g., 1108a and 1108b) are used to verify the status of the wireless-power transmitter device 100 (e.g., verify that the power amplifier is operating at a safe power level). In some embodiments, impedance measurements within the one or more VSWR circles (e.g., 1108a and 1108b) indicate that the selected power level satisfies the VSWR thresholds and the power amplifier is operating at a safe level (e.g., the selected power level will not damage the power amplifier). In some embodiments, impedance measurements outside of the one or more VSWR circles (e.g., 1108a and 1108b) indicate that the selected power level does not satisfy the VSWR thresholds and the power amplifier may be operating at an unsafe level (e.g., the selected power level could potentially damage the power amplifier). In some embodiments, when the impedance measurements do no satisfy the VSWR thresholds (e.g., circles 1108a and 1108b), the power dissipation values are verified to determine whether power scaling is necessary (as described below in FIGS. 12 and 13). Alternatively or additionally, in some embodiments, when the impedance measurements do not satisfy the VSWR thresholds (e.g., circles 1108a and 1108b), software can re-tune the system using external tuning components as described above with reference to FIG. 4.

Determinations that the VSWR thresholds (or circles 1108a and 1108b) are satisfied, as described above, are performed by a processor (e.g., RFIC 160 and/or PAIC 161A) using LUTs in memory 206. In particular, the wireless-power transmission system and/or methods described herein do not necessarily need to dynamically plot impedance measurements on Smith charts in operation.

In some embodiments, information blocks 1110a-1110e correspond to information determined based on impedance measurements 1002a-1002e, and provide one or more values, such as the determined impedance at a measurement point. Information blocks 1110a-1110e, are based on the same measurements as in FIG. 10 (e.g., 1002a-1002e). It is noted, and as one of skill in the art will understand, that the slight differences in the determined impedances between FIGS. 10 and 11 are due to artifacts of simulation in generating the Smith charts from the underlying models/tests used to produce the data. The information blocks discussed with reference to FIGS. 10-11 can be stored in the one or more LUTs.

Figure 12:
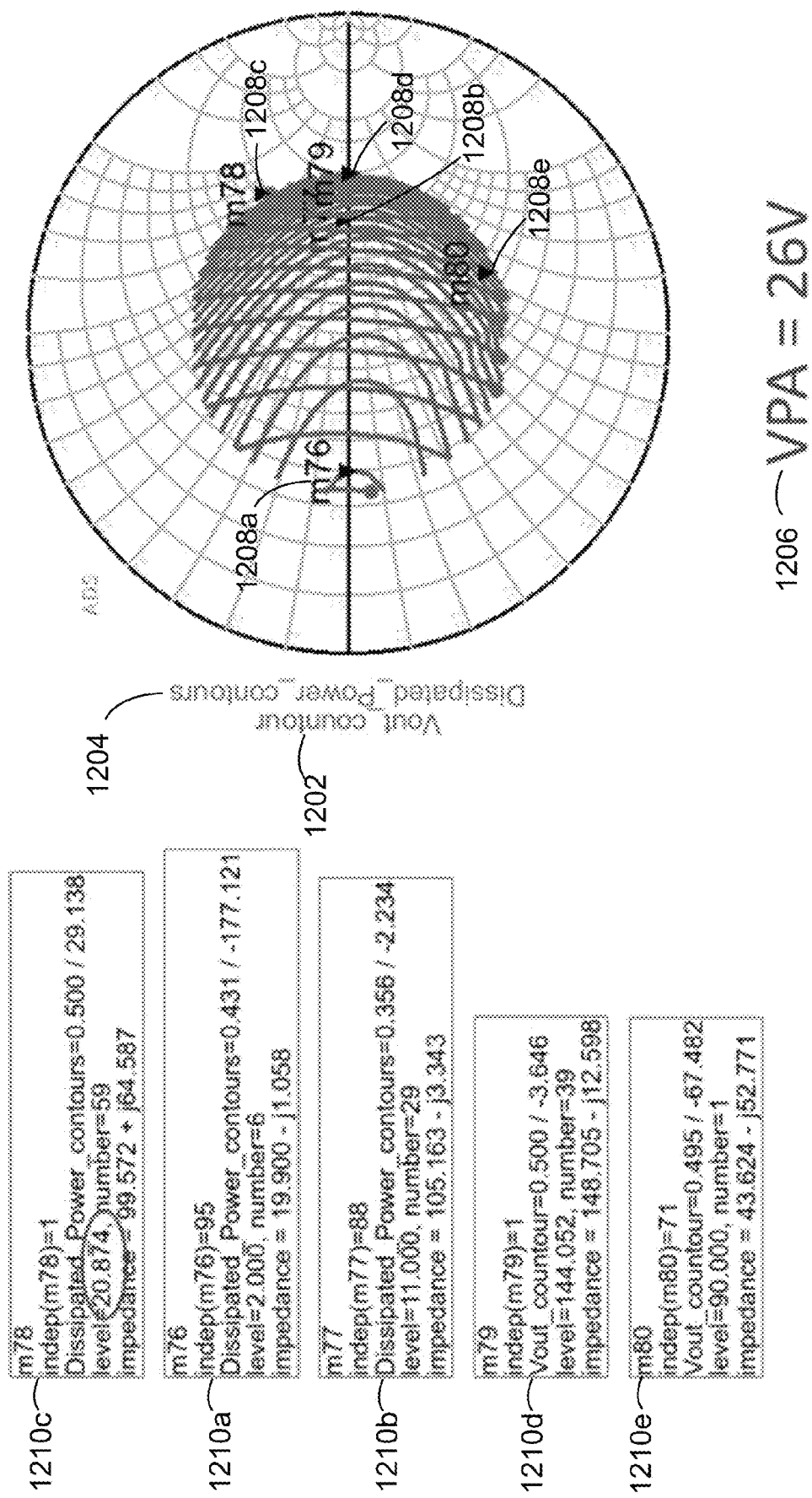
FIGS. 12 and 13 illustrate power dissipation checks and power scaling in accordance with some embodiments.
Figure 13:
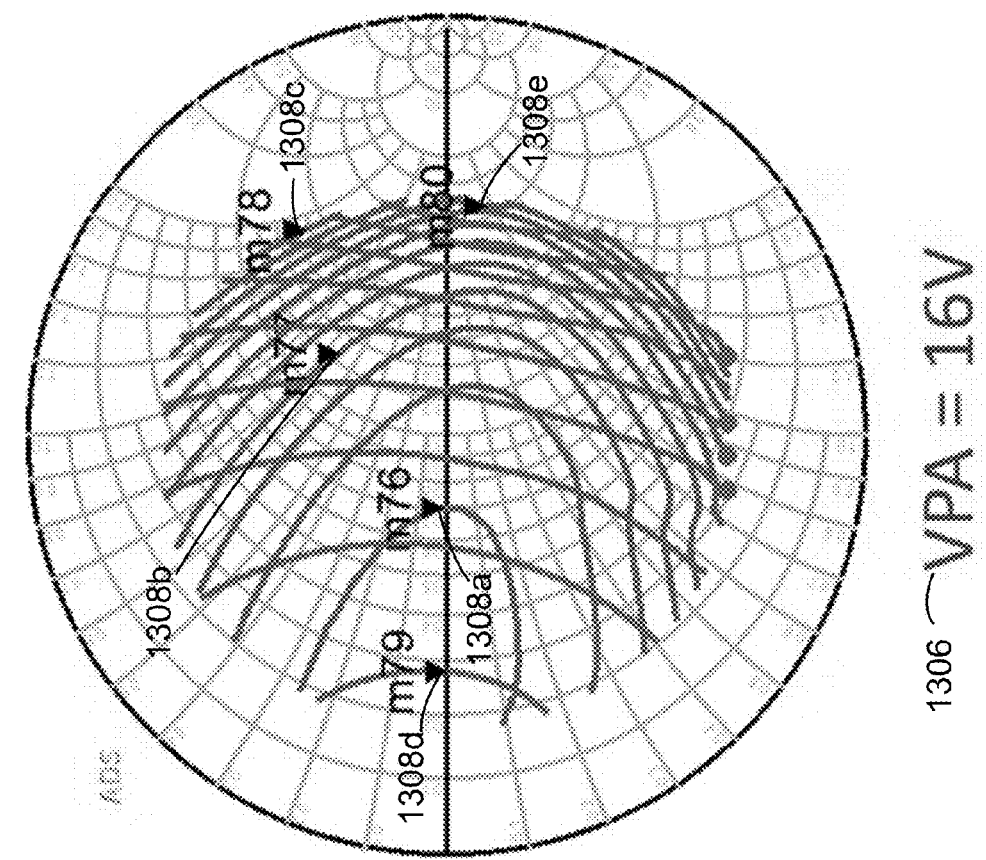

FIGS. 12 and 13 are used as visual aids to describe power dissipation checks and power scaling in accordance with some embodiments. In some embodiments, in accordance with a determination that impedance measurements do not satisfy the one or more VSWR thresholds (as discussed above), the power dissipation (based on measured values) is verified to determine whether power scaling is necessary. FIGS. 12 and 13 show example mappings of measurement values for a combination of the parametric parameters (i) output voltage of the power amplifier 1202, and (ii) the dissipated power 1204 at a power level 1206 of 26V, which are plotted on a Smith chart (e.g., generating contours for the output voltage 1202, and the dissipated power 1204 as described above with reference to FIG. 8).

FIG. 12 shows a mapping of impedance measurements (1208a-1208e) on a plot of the Smith chart with contours for the measurement values for parametric parameters for the output voltage 1202, and the dissipated power 1204 that can be used to check the power dissipation at the power amplifier at a power level 1206 of 26V, in accordance with some embodiments. In some embodiments, the wireless-power transmitter device 100 has a power dissipation limit for the power amplifier (or a power handing limit for the power amplifier to provide safe operation). In some embodiments, the power dissipation limit is 10 W, 15 W, 20 W, or other values defined by at least the power amplifier (other potential contributing factors the dissipation limit include temperature, the size of the enclosure/housing, and other factors). In some embodiments, the dissipation limit includes a tolerance of +/−1.5 W. As mentioned above, the power dissipation limit (or threshold) is determined during simulation, characterization, and/or manufacturing tests of the wireless-power transmitter device 100 and stored in memory 206.

In some embodiments, the impedance measurements (1208a-1208e), when plotted with the measurement value contours for the parametric parameters output voltage 1202 and the dissipated power 1204, can be used to determine a power dissipation of the power amplifier. The LUTs in memory 206 include different power dissipation thresholds that the power amplifier can safely tolerate while operating at different output power levels, and/or configurations of the wireless power transmission system. Thus, the system can retrieve a respective power dissipation limit by performing a lookup in the LUTs using the current output power level of the PA and other information (such as the measurements from the measurement points, operational impedance for the PA, and other configuration information (such as number of receivers in the operating area, operating frequency)).

In some embodiments, when an impedance measurement (e.g., 1208a-1208e) is determined to exceed the power dissipation limit, the wireless-power transmitted may initiate power scaling as described further below in FIG. 13. In the example shown in FIG. 12, the power amplifier of the wireless-power transmitter device 100 has a power dissipation limit of 15 W. In this example, three impedance measurements shown in FIGS. 12, m76 1208a; m77 1208b; and m78 1208c, correspond to the dissipated power 1204 parametric parameter, and are used to determine the power dissipation of the power amplifier. As shown, the information blocks 1210a, 1210b, and 1210c, determined based on the impedance measurements 1208a-1208c, respectively, show that the power dissipation is 2 W at m76 1208a, 11 W at m77 1208b, and 20.87 W at m78 1208c. In the current example, in accordance with a determination that m78 1208c has a power dissipation greater than the power dissipation limit (in this example 15 W), the wireless-power transmitter device 100 initiates power scaling (power scaling is described more below). Impedance measurements 1208d and 1208e correspond to the output voltage 1202 parametric parameter, and are used to determine the output voltage of the power amplifier as shown information blocks 1210d and 1210e, respectively. In some embodiments, the impedances for each impedance measurement 1208a-1208e, as shown in information blocks 1210a-1210e, can be checked to ensure that they are within a safe operational threshold as described above. In some embodiments, if no impedance measurement has a determined power dissipation above the dissipation limit, the wireless-power transmitter device 100 forgoes power scaling.

FIG. 13 illustrates a visual aid for describing power scaling in accordance with some embodiments. FIG. 13 shows a mapping of impedance measurements (1308a-1308e) on the Smith chart with contours for the parametric parameters output voltage 1202, and dissipated power 1204 at a power level 1306 of 16V (a lower power level that satisfies the power dissipation limit; as discussed below). As discussed above in reference to FIGS. 7-12, the one or more contours are specific to one or more power levels and/or other configurations (determined during simulation, characterization, and/or manufacturing test of the wireless-power transmitter device 100). After changes to the power level (or other configurations) are made, the wireless-power transmitter device 100 uses the respective measurement values for the new power level. For example, in FIG. 13, after changes to the power level (or other configurations) are made, contours for the new power level (16 V) are loaded onto a plot of the Smith chart (as can be seen in the updated Smith charts of FIG. 13). In this same manner, the wireless-power transmission system described herein uses a respective LUTs or LUTs values for the adjusted configuration.

Returning to the power scaling implementation, as described above in FIG. 12, when it is determined that the power dissipation for an impedance measurement (e.g., 1208c in FIG. 12) is greater than the power dissipation limit (in the above example, 15 W), the wireless-power transmitter device 100 performs power scaling (e.g., power dissipation determined by referencing the impedance value 1208c within a LUT in memory 206 to determine a dissipation for the current power level). In some embodiments, power scaling includes selecting a new power level lower than the power level that is determined to exceed the power dissipation limit, and then checking to ensure that the new power level satisfies the power dissipation limit. In some embodiments, after determining that the new power level does satisfy the power dissipation limit, the wireless-power transmitter device 100 performs receiver classification and/or optionally re-tunes (as described above), and then increases the power provided to the power amplifier until a maximum is reached for the current configuration (a maximum power level that satisfies all of the one or more safety thresholds and is within the power dissipation limit). In some embodiments, after determining that the selected power level does not satisfy the power dissipation limit, the wireless-power transmitter device 100 selects a new power level or instructs the power amplifier to shut down.

For example, as shown between FIG. 12 and FIG. 13, at a first time, the power amplifier is at a first power level 1206 of 26V, and the determined power dissipation of m78 1208c is greater than the power dissipation limit (15 W in this example). At a second time (FIG. 13), in order to protect the power amplifier, power scaling is performed and the wireless-power transmitter device 100 selects a second power level 1306 of 16V for the power amplifier. At the second power level 1306, the determined power dissipation of m78 1308c has dropped to 11 W (as shown in information block 1310c of 13) and is within the power dissipation limit of 15 W for this example. The wireless-power transmitter device 100 further checks that the impedance measurement 1308a-1308e satisfy the one or more safety thresholds. As is shown in information blocks 1310a-1310e, the impedance measurement 1308a-1308e can be used to determine the impedance and a number of other values for the power amplifier using the Smith charts. As indicated above, FIGS. 12 and 13 are intended as visual aids and the wireless-power transmission disclosed herein does not necessarily plot one or more values on a Smith chart, but references one or more LUTs in memory that include stored values for different power levels, the operational scenarios, and/or configuration of the wireless power transmission system. The wireless-power transmission system disclosed herein uses the one or more LUTs in memory to perform power scaling as described herein.

Although FIGS. 9-13 illustrate a power amplifier at a power level of 26V or 16V, it should be noted that different power levels, if available to the power amplifier, can be selected. It should also be noted that while FIGS. 9-13 show impedance measurements at a single point in time, in operation, the wireless-power transmitted 100 dynamically monitors and evaluates the impedance measurements for classifying a receiver, detecting movement of a receiver and/or foreign object, determining an RF signal, and/or determinations described above. In some other embodiments, the wireless-power transmitted 100 may periodically poll the measurements points to perform the above-described determinations.

The descriptions of FIGS. 9-13 are made in reference to visual representation of one or more parametric parameters and/or impedance measurements plotted on one or more Smith charts; however, one person skilled in the art, upon reading the present disclosure, will appreciate that the one or more parametric parameters and/or impedance measurements plotted on one or more Smith charts can be stored in LUTs in memory 206 of the wireless-power transmitter device 100 (e.g., as described in FIG. 2A). For example, stored values can be accessed in memory 206 and used by one or more modules, such as the impedance determining module 223, to perform the techniques described above in FIGS. 9-13 (e.g., without visually plotting the Smith charts).

Similarly, one skilled in the art will appreciate that impedance measurements obtained in real-time (e.g., during operation) can be used to perform the techniques described above. In other words, impedance measurements obtained in real-time can be used by one or more modules, such as the impedance determining module 223, to perform the techniques described above in FIGS. 9-13 (e.g., without visually plotting the Smith charts).

Further, the techniques described above can be performed dynamically and in real time.

As described above, LUTs are a data structure stored in memory that include values that can be referenced. In reference to the examples provided above in FIGS. 7-13, LUTs can include impedance values collected from different measurement points at different power levels, operational scenarios, transmitter device 100 configurations. The LUTs can also include the operational impedances, VSWR determinations (e.g. measured values and thresholds), power dissipation determinations (e.g. measured values and thresholds), and/or other values described herein based on the combination of two or more impedance values. In operation, the impedance value obtained from the one or more measurement points can be used to reference the values in the LUTs and determine an expected or known result that has been predefined for the transmission device. It should be noted, the LUTs include similar reference tables for SAR, e-field roll-off, and/or other safety thresholds disclosed herein.

Conventional ways to protect power amplifiers, such as through isolators or by using measurements of forward and reflected power, have certain drawbacks that are addressed by the techniques discussed herein. For instance, use of isolators can be bulky and it adds to the total cost to the wireless power transmission system. The efficiency of the wireless power transmission also decreases because of the additional loss caused by the isolator.

Also, methods using directional couplers typically cannot be used to find the impedance at the output of the power amplifier. The directional coupler can be bulky and it adds to the total cost to the wireless power transmission system. The efficiency of the wireless power transmission also decreases because of the additional loss caused by the directional coupler.

Another technique is Q detection method, but these Q detection methods can only be done in advance of charging. In addition, each receiver needs to store its own "expected values" for time domain decay or frequency response.

In another example, power balance method is used to protect the power amplifier of a wireless-power transmitter device 100. In the power balance method, losses are continuously monitored during charging. If the losses detected is greater than a predetermined threshold, a foreign object may be present in proximity to the antenna of the transmitter. However, the determination of the presence of the foreign object can be fooled by load transients and/or receiver motion. In addition, it takes time to calculate steady state losses, during that time foreign object and/or the power amplifier could be heated or damaged.

In another example, in band communications method is used to protect the power amplifier of a wireless-power transmitter device 100. In the in band communications method, a transmitter sends queries out. A receiver device sends back an acknowledgement signal once it receives the query from the transmitter. In that case, a transmitter only transmit wireless power waves to receivers which sends back the acknowledgement. This method requires more complex receiver device to implement the communications protocol. However, this method does not work if a valid receiver has little influence on the transmitter impedance (e.g. in the nearfield or midfield range).

Compared to the above several methods of protecting the power amplifiers (e.g., isolator and/or directional coupler), the present disclosure provides an impedance-based method for protecting power amplifiers that has many advantages (e.g., impedance detection method described in reference to at least FIGS. 9-13). For example, in the impedance-based method, no handshaking protocol is required. Therefore, no complex receiver-side components are necessary to implement the communication protocol. In addition, the impedance-based method enables continuous operation during charging which prevents damages to the transmitter and/or to the foreign object when the system is waiting to calculate loss. The continuous operation also provides instant responds to the presence of the foreign objects especially when there is a change in the relative positions of the wireless-power transmitter device 100 and wireless power receiver.

In some embodiments, the wireless-power transmitter device 100 is a standalone device. In some embodiments, the wireless-power transmitter device 100 is integrated with or included within an electronic device enclosure such as that of a television, a display, a laptop, a gaming system or video player, television set top box or similar device, or a cellphone, etc. In some embodiments, the wireless-power transmitter device 100 is a device 1400 (e.g., such as a smart speaker). FIG. 14A is an isometric illustration of the device 1400 with an included wireless-power transmitter device 100, according to some embodiments. In some embodiments, the device 1400 is similar in shape to the embodiment depicted in FIG. 14A. In some embodiments, the device 1400 is capable of charging up to two client devices with incorporated receivers within its charging coverage area. In some embodiments, the device 1400 is capable of charging up to four client devices with incorporated receivers within its charging coverage area. In some embodiments, the device 1400 is capable of charging multiple client devices with incorporated receivers within its charging coverage area.

Figure 14B:
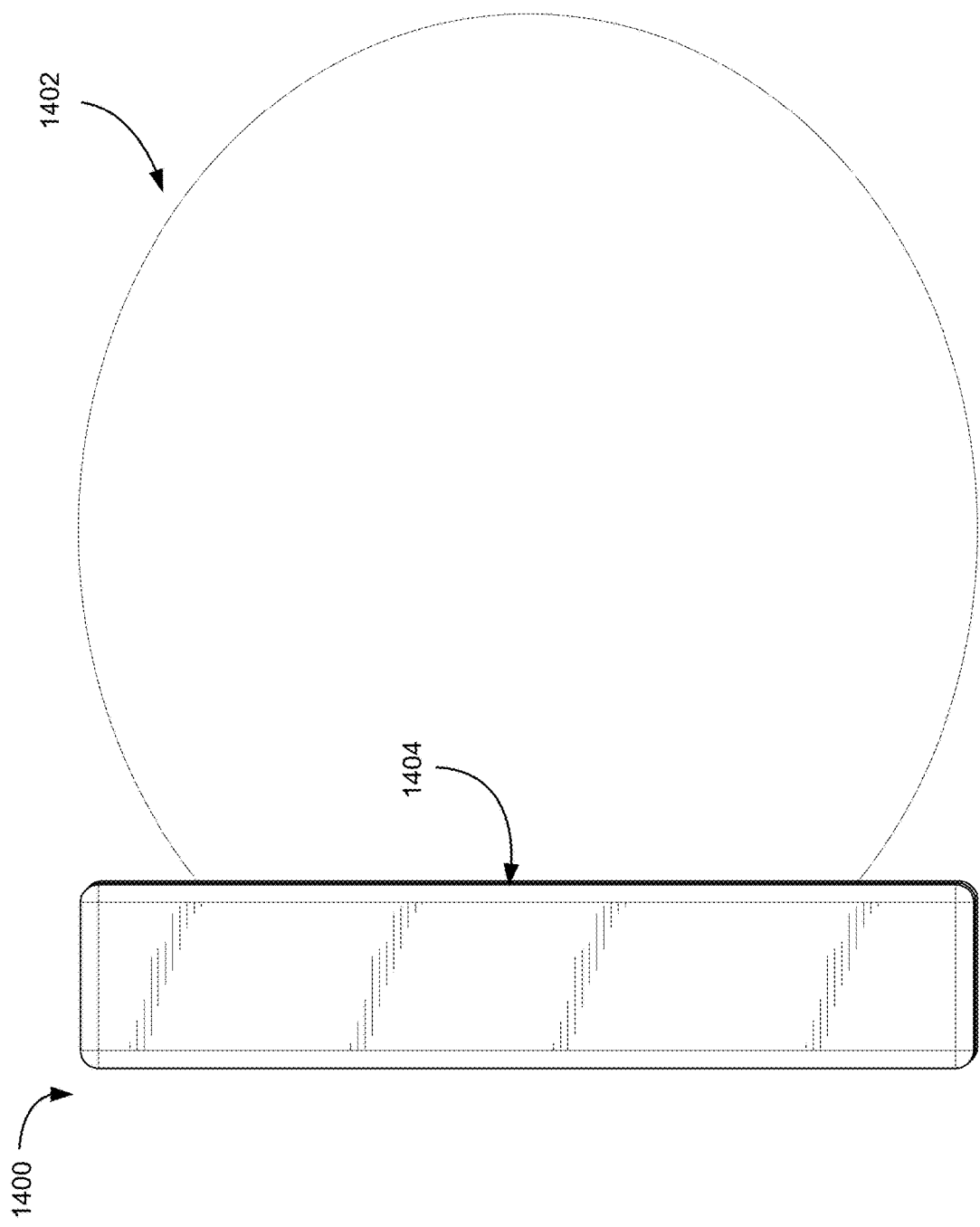
FIG. 14B is a top view of the device with the included wireless-power transmitter and its charging coverage area in accordance with some embodiments.

FIG. 14B is a top view of the device 1400 (e.g., an electronic device such as a smart speaker) with an included wireless-power transmitter device 100 and its charging coverage area 1402 (e.g., which can be an instance of antenna coverage area(s) 290 and/or 291 described above), according to some embodiments. As an illustrative example the device 1400 is depicted as a smart speaker, and will thus be referred to in these examples as a device 1400. In some embodiments, the charging coverage area 1402 is a space directly in front of the device's 1400 transmitter. In some embodiments, the charging coverage area 1402 is no greater than 15 cm to the front of the device 1400. In some embodiments, the charging coverage area 1402 is no greater than 30 cm to the front of the device 1400. In some embodiments, the charging coverage area 1402 is no greater than 1 meter to the front of the device 1400. In some embodiments, the charging coverage area 1402 has a shape of a portion of an oval extended from the front face 1404 of the device 1400.

Alternatively or additionally, in some embodiments, the device 1400 is configured to transmit (e.g., radiate) RF energy at a location of the wireless-power receiver. In some embodiments, the radiated RF energy is based on an amplified RF signal provided to one or more antennas of the device 1400 from the power amplifier. The amplified RF signal, when received by the one or more antennas, cause the one or more antennas to radiate the RF energy. The radiated RF energy is focused within an operating area that includes the wireless-power receiver while forgoing any active beamforming control (e.g., the wireless-power transmitter device 100 does not modify the phase, gain, etc. of the radiated RF energy for beamforming purposes). Focused within an operating area that includes the wireless-power receiver, in some embodiments, means that a peak level of RF energy is at its maximum at the location of the wireless-power receiver. The RF energy is transmitted by the device 1400 in accordance with a determination (e.g., a prediction) that transmitting the RF signal to the wireless-power receiver would satisfy one or more safety thresholds as discussed herein.

In some embodiments, a determination that the RF energy to the wireless-power receiver would satisfy the one or more safety thresholds is made before any RF energy is transmitted to the wireless-power receiver. In this way, the device 1400 (or any other wireless-power transmitter device 100 that includes the embodiments disclosed herein) ensures that an appropriate power level of the available power levels is selected for use in amplifying the RF signal, such that the one or more safety thresholds will still be satisfied after the RF signal is transmitted.

Figure 14C:
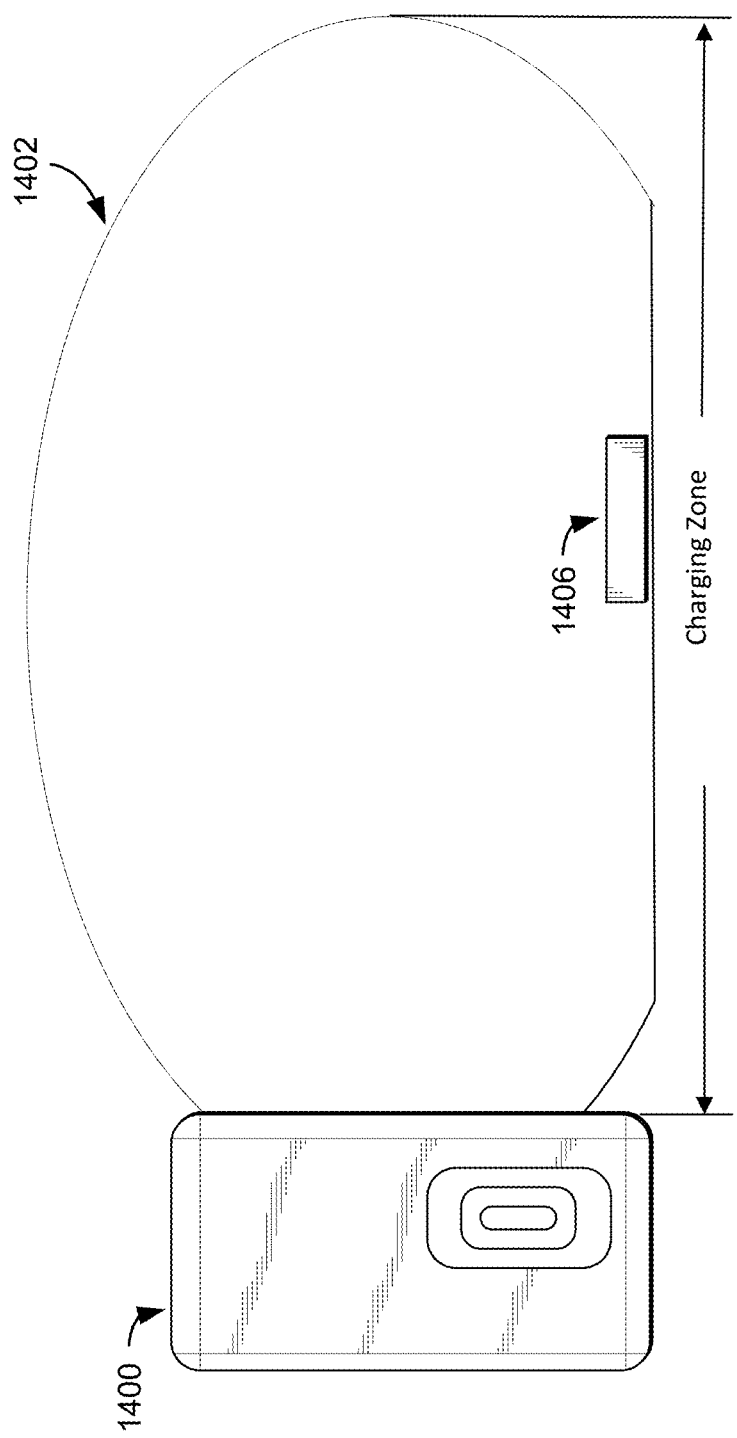
FIG. 14C is a side view of the device with the included wireless-power transmitter in accordance with some embodiments.

FIG. 14C is a side view of the device with the included device 1400 and its charging coverage area 1402, according to some embodiments. In some embodiments, a client device 1406 coupled with a wireless-power receiver is placed within the charging coverage area 1402 to receive wireless-power transmitted from the device 1400. In some embodiments, the client device 1406 is placed on a flat surface such as a table or a floor. In some embodiments, the client device 1406 is a small consumer device, such as a fitness band or a watch wearable product. Additional examples of a consumer device include a phone, a tablet, a laptop, a hearing aid, smart glasses, headphones, computer accessories (e.g., mouse, keyboard, remote speakers), and/or other electrical devices.

In one embodiment, the device 1400 has dimensions at 7 cm tall×4 cm deep×15 cm long. In some embodiments, the device contains one antenna. The antenna is configured to generate and use locally RF energy at 917.5 MHz. The antenna is enabled to transmit energy only when an authorized client device 1406 has been determined to be in the charging coverage area 1402.

In some embodiments, the device 1400 and client devices 1406 use communication components, such as standard Bluetooth low energy ("BLE") communications paths operating at 2.4 GHz, to enable the device 1400 to monitor and track the location of the client devices 1406. The location of the client devices 1406 is monitored and tracked based on the charging information receives from the client devices 1406. As discussed above in FIGS. 1A and 2A the charging information can include the location of the wireless-power receiver, whether the wireless-power receiver is authorized, charge requests, and/or other receiver specific information.

In some embodiments, the device 1400 uses the charging information to select and use a power level and instruct the power amplifier to amplify RF signals. In some embodiments, instead of determining that all of the one or more safety thresholds are satisfied, the RF power transmitter device 100 uses the charging information to select a power level of the power amplifier that is at or within the global maximum and global minimum power levels for the power amplifier (identified in the one or more safety thresholds) before providing the client device 1406 with the requested power (e.g., satisfying only the global max and min safety thresholds). For example, in some embodiments, the power level can be selected based on the charging information alone. In some embodiments, the device 1400 uses the charging information in conjunction with the other methods disclosed herein to determine that all or a subset (less than all) of the one or more safety thresholds (e.g., satisfaction SAR values, impedance measurements, roll-off, etc.) are satisfied before RF energy is transmitted to the client device 1406.

In some embodiments, the device 1400 can transmit power to the client device 1406 without receiving any charging information (e.g., when the RF power transmitter and/or receiver do not have a communications component). For example, the device 1400 can identify and classify a receiver and/or foreign object, determine an appropriate power level to transmit RF energy, and safely transmit the RF energy to the client device using impedance determinations (e.g., detected changes in impedance) and/or other methods described above. In some other embodiments, power is transmitted only when a client device 1406 is present, requests charging, and is authorized to receive power. In other words, in some embodiments, the device 1400 transmits power to a client device 1406 only when charging information (that includes a request for power) is received from the client device 1406. The device 1400 can combine each of the methods disclosed herein to provide power to the client device 1406.

In some embodiments, the device 1400 is used on top of a household surface. In some embodiment, the device 1400 is configured to charge multiple low-power devices. Table 1 below summarizes example technical characteristics of the device 1400, according to some embodiments.

TABLE 1

Example Technical Characteristics of the Device 1400.

| | |
|---|---|
| Target Platforms | "Smart Speaker" charging system |
| Wireless Power Transfer Frequency | 917.5 MHz |
| Antenna Type | Loop |
| Antenna Gain | 7 dBi |
| Max Tx-Rx Distance | 30 cm |
| Transmitter Size | L = 15 cm, H = 7 cm, W = 4 cm, |
| Number of antenna's | 1 |
| Conducted Output Power | 39 dBm |
| Receiver application | Fitness band, other small wearables |
| Simultaneous Rx | Yes |
| Number Receivers Supported | 4 |
| BLE for Tx/Rx | Yes |
| Sensor Required for SAR Compliance | Yes |

Figure 14D:
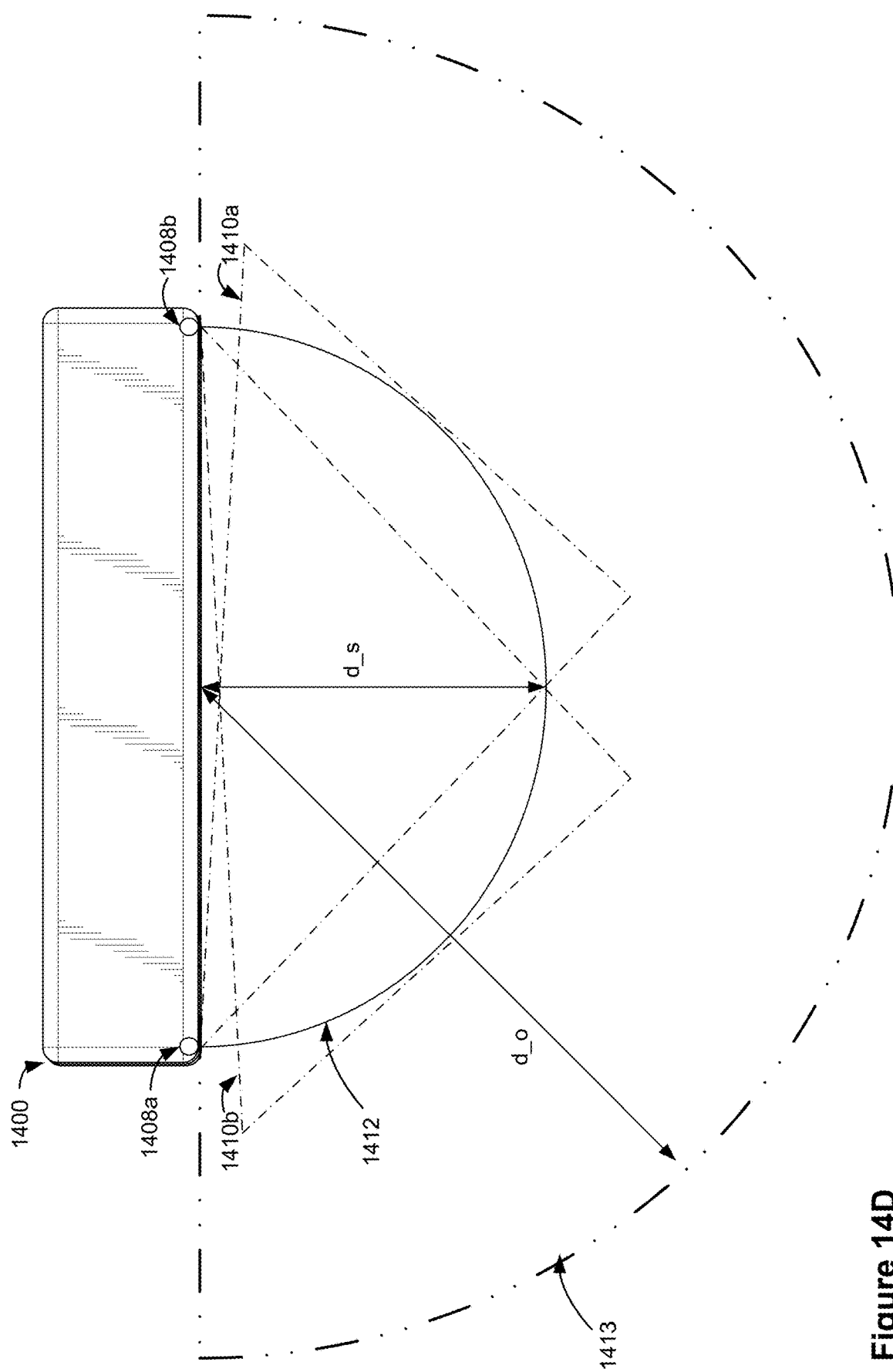
FIG. 14D is a top view of the device with the included wireless-power transmitter and its keep out zone and operational area in accordance with some embodiments.

FIG. 14D is an overhead view of a "keep out zone" and operational area (or working zone) of a device 1400 with a wireless-power transmitter in accordance with some embodiments. In some embodiments, the device 1400 includes one or more sensors 1408. In some embodiments, the one or sensors are the same type of sensor. In some embodiments, the one or sensors are different types of sensors. In some embodiments, different combinations of similar and different types of sensors are used. In some embodiments, the one or more sensors 1408 includes a first sensor 1408a and second sensor 1408b. In some embodiments, one or more sensors 1408 are located in at one or more corners, the top center, the bottom center, directly in the center, on one or more of the edges, and/or any other position of the device 1400 such that the keep-out zone and/or operational area can be monitored. The one or more sensors can include infrared (IR) sensors, heat detectors, capacitive sensors, inductive sensors, hall sensors, proximity sensors, sound sensors, pressure detectors, light and/or image sensors, and/or other types of sensors.

In some embodiments, a first sensor 1408a is located at a first corner and/or side of the device 1400 and a second sensor 1408b is located at a second corner and/or side of the device 1400, the second corner and/or side opposite the first corner and/or side. In this example, the first sensor 1408a covers and/or monitors a first region 1410a and the second sensor 1408b covers and/or monitors a second region 1410b. In some embodiments, the first 1410a and the second 1410b regions cover and/or monitor an area directly in front of the device 1400. Additionally or alternatively, the first 1410a and the second 1410b regions cover and/or monitor areas within the transmission field of the device 1400. In some embodiments, the first 1410a and the second 1410b regions generate a "keep out zone" or shut-off distance 1412. In some embodiments, the shut-off distance 1412, is an area and/or space directly in front of the device's 1400 antenna. In some embodiments, the shut-off distance 1412 includes a predetermined distance "d_s" is no greater than 10 cm (+/−2 cm) from the front center of the device 1400. In some embodiments, the predetermined distance d_s is no greater than 15 cm (+/−2 cm) from the front center of the device 1400. In some embodiments, the predetermined distance d_s is no greater than 20 cm (+/−2 cm) from the front center of the device 1400. In some embodiments, the shut-off distance 1412 covers an entire front surface of the device 1400. In some embodiments, the predetermined distance extends radially from a center point of the device 1400, such as is depicted in FIG. 14D.

In some embodiments, the one or more sensors 1408 provide an indication (shut-off indication) that an object is within the shut-off distance 1412 of the device 1400. In some embodiments, the object includes a foreign object that is detected by the system using the techniques described herein. In some embodiments, in response to receiving the shut-off indication, the device 1400 causes (e.g., via the RFIC 160 and/or the PAIC 161A) the one or more antennas to cease radiating the RF energy. In particular, in some embodiments, the device 1400 is shut off when a person or animal (or some other sensitive object or a foreign object) is detected within a predefined shut-off distance 1412 (semi-circle in FIGS. 14D and 14E). The device 1400 is shut off to avoid exposing any sensitive objects to the electromagnetic energy (RF energy), e.g., because a power level of the electromagnetic energy in the shut-off distance 1412 is higher than a power level of the electromagnetic energy in other regions and/or locations of the charging coverage area 1402.

In some embodiments, the one or more sensors 1408 cover and/or monitor a second region (the second region referred to as the operation area 1413). In some embodiments, the operational area 1413 covers and/or monitors an area directly in front of the device 1400. In some embodiments, the operational area 1413 is an area and/or space directly in front of the device's 1400 antenna. In some embodiments, the operational area 1413 includes a predetermined distance "d_o" that is no greater than 2 m (+/−0.2 m) from the front center of the device 1400. In some embodiments, the predetermined distance d_o is no greater than 1.5 m (+/−0.2 m) from the front center of the device 1400. In some embodiments, the predetermined distance d_o is no greater than 1 m (+/−0.2 m) from the front center of the device 1400. In some embodiments, the operational area 1413 covers an entire front surface of the device 1400. In some embodiments, the predetermined distance extends radially from a center point of the device 1400, such as is depicted in FIG. 14D.

In some embodiments, the one or more sensors 1408 provide an indication (e.g., detection and/or classification indications) that a receiver and/or foreign object is within the operational area 1413 of the device 1400. In some embodiments, the receiver and/or foreign object is detected and/or classified by the system using the techniques described herein. In some embodiments, in response to receiving the indication, the device 1400 causes (e.g., via the RFIC 160 and/or the PAIC 161A) the one or more antennas to select a power level, optimize the power transmission, tune (dynamically or statically) one or more antennas, adjust the radiation profile, and/or perform other adjustments disclosed herein. In particular, in some embodiments, the device 1400 will perform the operations disclosed herein when a receiver and/or foreign object is detected within a predefined operational area 1413 (semi-circle in FIGS. 14D and 14E).

Figure 14E:
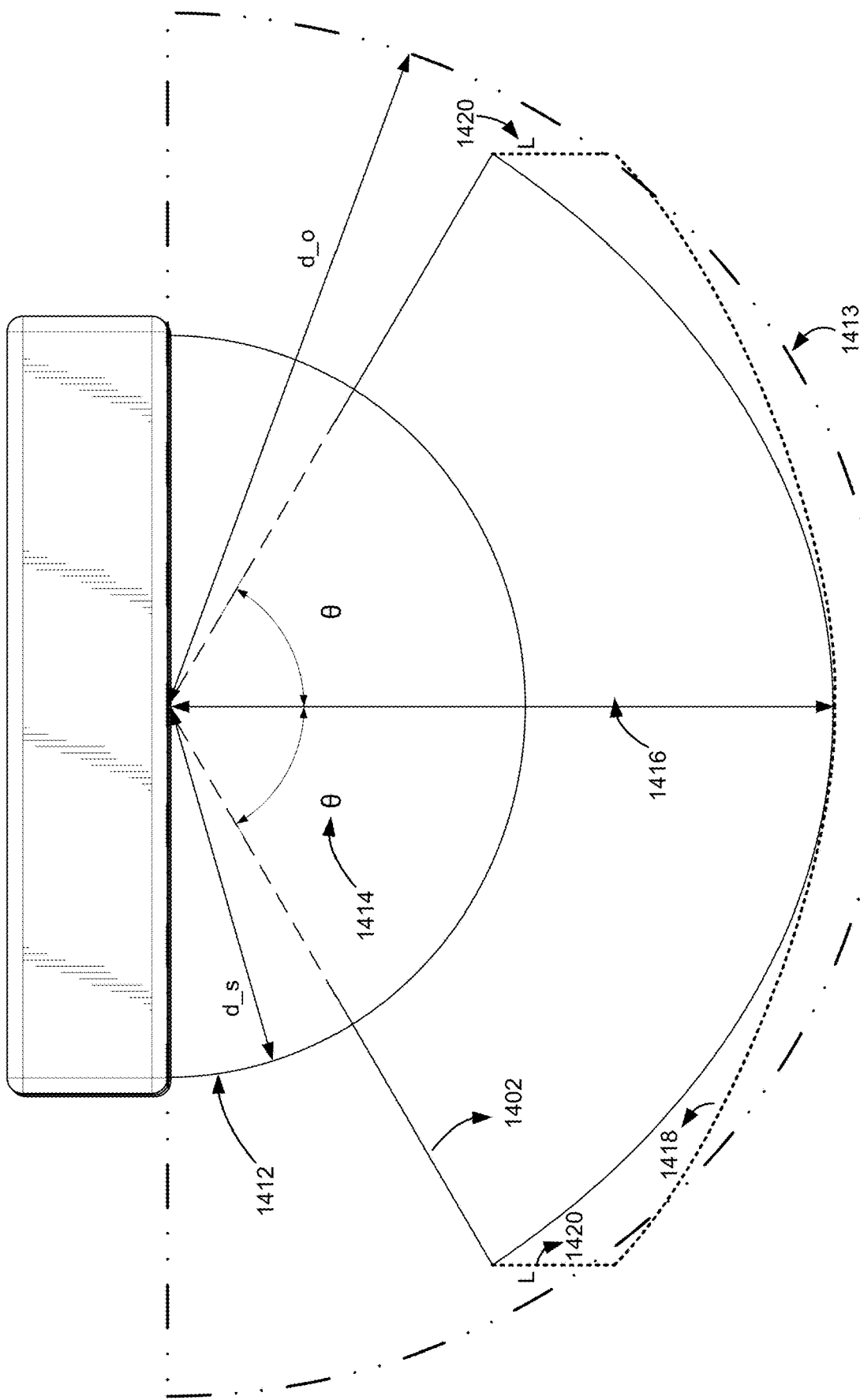
FIG. 14E is a top view of the device with the included wireless-power transmitter, and also illustrating features related to optimization of the transmission field in accordance with some embodiments.

FIG. 14E is another overhead view of a device 1400 with a wireless-power transmitter illustrating a charging coverage area, operating zone, and "keep out zone" in accordance with some embodiments. In some embodiments, the device 1400 includes a shut-off distance 1412 (e.g., d_s) as described above in 14D. In some embodiments, the device 1400 includes a charging coverage area 1402 (also referred to as transmission field) that is a space directly in front of the device's antenna. In some embodiments, the charging coverage area 1402 covers a distance equal to the operating area 1413 (e.g., d_o). In some embodiments, the charging coverage area 1402 covers a distance described above in FIG. 14C (e.g., no greater than 1 meter). In some embodiments, the charging coverage area 1402 extends a predetermined angle (e.g., angle theta (θ)) 1414 in each direction from the center line 1416. In some embodiments, the predetermined angle 1414 is at least 60 degrees in each direction from the center line 1416. In some embodiments, the predetermined angle 1414 is at least 75 degrees in each direction from the center line 1416. In some embodiments, the predetermined angle 1414 is at least 80 degrees in each direction from the center line 1416.

In some embodiments, the device 1400, via the RFIC 160 and/or PAIC 161A, can control and/or manage operation of one or more power amplifiers to optimize the performance of the one or more antennas. In some embodiments, the RFIC 160 and/or PAIC 161A dynamically adjust power distribution for a transmission field of the antenna provided to a wireless-power receiver (e.g., based on predetermined properties and/or characteristics of the wireless-power transmission system obtained during simulation, characterization, and/or manufacture tests of the wireless-power transmitter device and/or one or more antennas of the transmitter device stored in the LUTs). For example, as shown in FIG. 14E, charging area 1402 can be adjusted by the RFIC 160 and/or PAIC 161A to improve the charging area, as shown by improved charging area 1418 (or improved transmission field). In some embodiments, dynamically adjusting the power distribution to improve the transmission field includes, at the RFIC 160 and/or PAIC 161A, adjusting the power provided to the one or more antennas from the one or more power amplifiers. In some embodiments, the power distribution for the transmission field is adjusted (e.g., from charging area 1402 to improved charging area 1418) based on the adjusted power provided to the antenna from the power amplifier. In some embodiments, the power distribution for the transmission field is adjusted such that the adjusted power provided to the one or more antennas is evenly distributed across the power distribution for the transmission field; and a power loss at an edge of the power distribution for the transmission field of the antenna is reduced from 30% to 10%. For example, improved charging area 1418 has the power distribution at the edges improved by distance L 1420 (representative of an improvement at the edges from a reduction of 30% to 10%). Improved charging area 1418 also shows that the distribution is even, maintaining its radial shape.

The optimization of the antenna described in FIG. 14E is performed without beamforming (or by forgoing beamforming) and produces the described improvements through precise control of the power amplifier via the RFIC 160 and/or PAIC 161A (based on LUTs in memory 206 as described above).

As described above with reference to FIGS. 14A-14E, the device 1400 can include a single antenna (e.g., a loop antenna) and a single power amplifier. In some embodiments, the device 1400 may include more than one antenna and/or power amplifier. In some embodiments, the one or more antennas can be any antenna type, as indicated above.

Figure 15A:
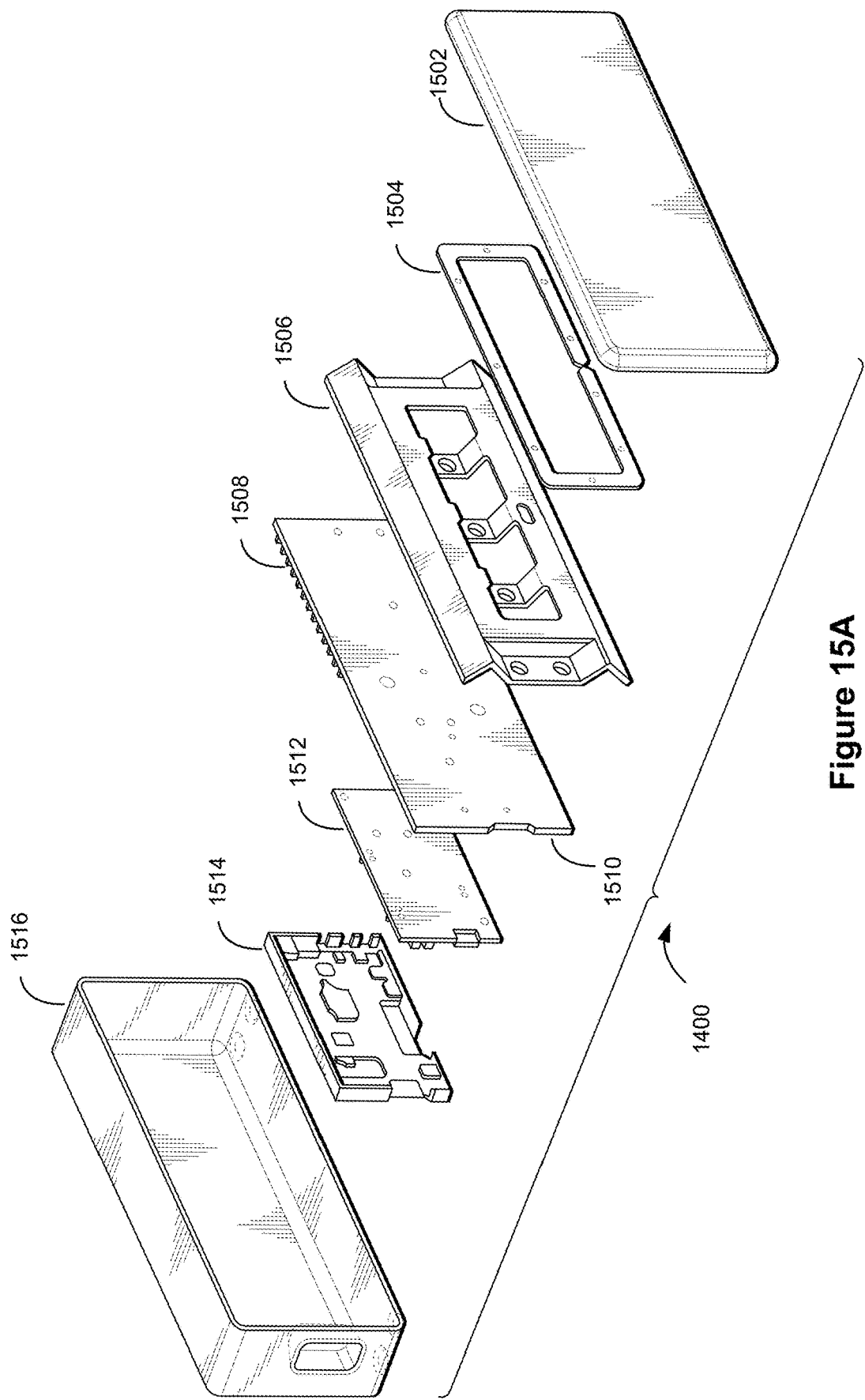
FIG. 15A is an exploded view of the device with the included wireless-power transmitter, according to some embodiments.

FIG. 15A is an exploded view of a device with an included wireless-power transmitter, according to some embodiments. In some embodiments, the device 1400 includes components such as a front cover (enclosure) 1502, a loop antenna 1504, an antenna mount 1506, one or more sensors 1508, a ground plane 1510, a control printed circuit board (PCB) 1512, a PCB shield or heatsink 1514, and an enclosure housing 1516. In some embodiments, the loop antenna 1504 is similar as the loop antenna 300 described in FIG. 3. In some embodiments, the loop antenna 1504 only includes one feed 304 as described in FIG. 3. Alternatively or additionally, in some embodiments, the device 1400 includes any antenna type described above in FIGS. 1A-1C. In some embodiments, the one or more sensors 1508 are integrated or placed on the ground plane 1510. In some embodiments, although not shown, additional sensors of one or more sensors (not shown) are located exterior to the device 1400 and/or near the front cover 1502 (e.g. along the edges, the corners directly in the center of device 1400 and/or the front cover 1502). In some embodiments, the other set of one or more sensors (not shown) is configured to define the "keep out zone" (e.g., shut-off distance 1412) and the operational area 1413 of the device 1400. In some embodiments, the front cover (enclosure) 1502 is made of plastic. In some embodiments, the antenna mount 1506 is made of plastic. In some embodiments, the enclosure housing 1516 is made of plastic.

In some embodiments, the device 1400 includes a single antenna 1504. In some embodiments, the antenna 1504 has a rectangular aperture that is approximately 2 inches by 6 inches and 10 mm thick formed as a loop backed by a PCB 1512 and/or a ground plane 1510 as a reflector. In some other embodiments, the device 1400 multiple antennas, the multiple antennas consisting of one or more types described above in FIGS. 1A-1C. The multiple antennas can be of any dimensions that fit the device's 1400 dimension and/or generate the desired frequencies and/or performance.

Figure 15B:
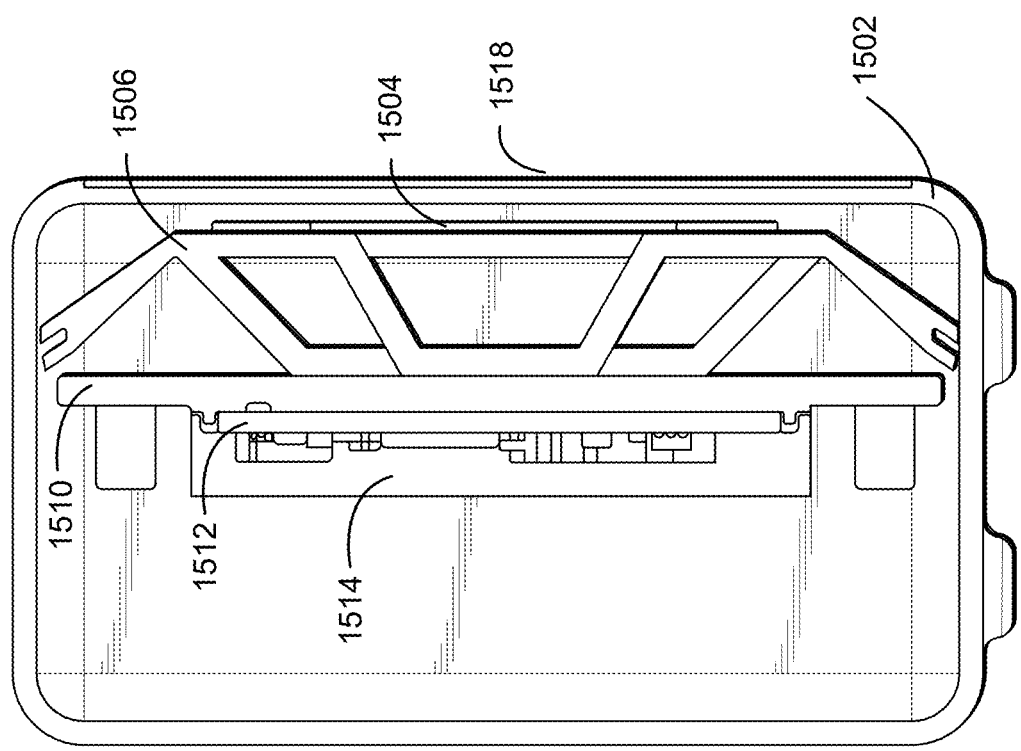
FIG. 15B is a side cross-sectional view illustration of the device with the included wireless-power transmitter, according to some embodiments.
Figure 15C:
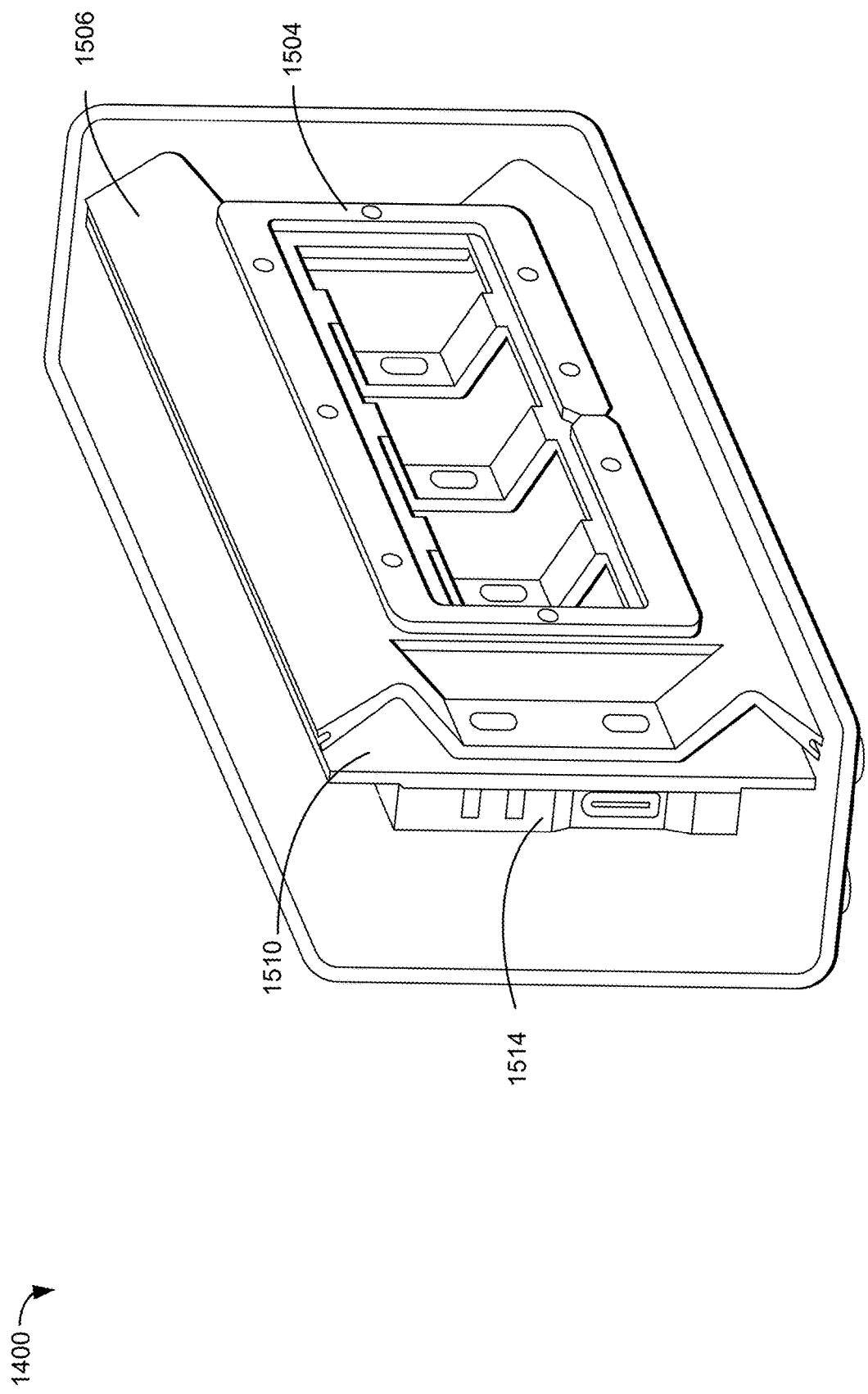
FIG. 15C is a transparent illustration of the device with the included wireless-power transmitter, according to some embodiments.

The mechanical illustrations are further depicted in FIGS. 15B and 15C. FIG. 15B is a side cross-sectional view illustration of a device 1400 with an included wireless-power transmitter, according to some embodiments. In some embodiments, the loop antenna 1504 is placed very close to the front surface 1518 or front cover (enclosure) 1502 of the device 1400. The loop antenna 1504 is placed on the antenna mount 1506. A PCB shield or heatsink 1514 is covered on the control PCB 1512.

FIG. 15C is a transparent illustration of an assembled device with an included wireless-power transmitter, according to some embodiments. The loop antenna 1504 can be viewed from the transparent side view.

Figure 17:
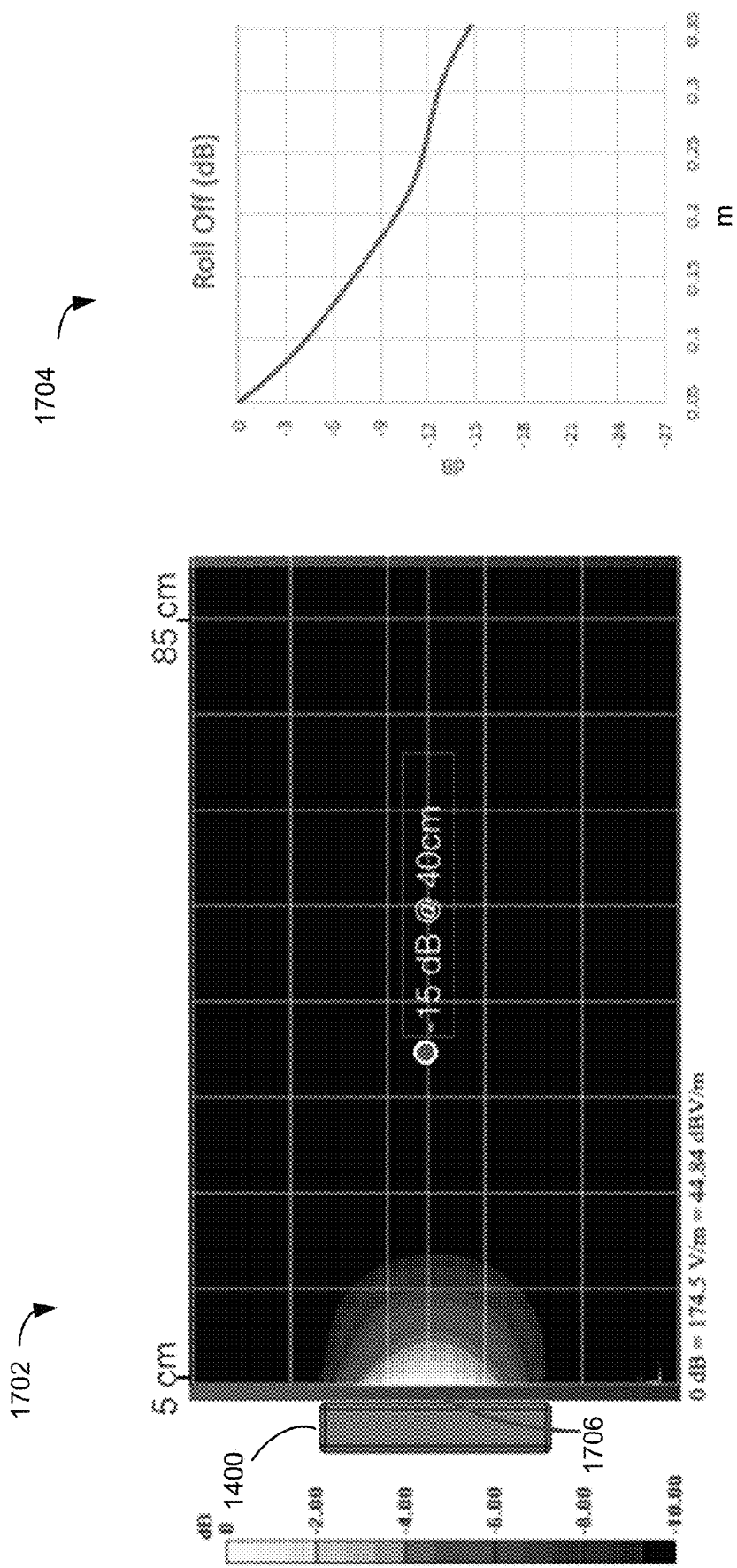
FIG. 17 is an illustration of a measured electric field plot and 2D graph to demonstrate electric field roll-off below 10 dB from a peak value at about 3 dB for every 8 cm for the device with the included wireless-power transmitter, according to some embodiments.

FIGS. 16 and 17 illustrate power density level decays (or roll-offs) of the transmitted RF energy relative to a location of a wireless power receiver and/or a location of a peak power level, according to some embodiments.

In some embodiments, governing regulations can require that: (i) the receiver's location reside within a predefined radial distance (e.g., m*k) from the local peak power level ($P^1$) (e.g., focused RF energy at the location of the receiver), and (ii) the power, relative to the peak power level ($P^1$), decays by at least k dB at the predefined radial distance (e.g., m*k) in all directions from the local peak power level ($P^1$) to a decayed peak power level ($P^2$) (e.g., in all spherical dimensions/directions from the peak power level ($P^1$)). Further, in some instances, future regulations may require some power decrease relative to the local peak power level ($P^1$) at a point closer to the one or more antennas (i.e., a local minimum power level is required near the one or more antennas). Additionally, in some instances, the regulations can require that a magnitude (e.g., measured dB) of the local peak power level ($P^1$) is below some predefined threshold. The following equation may represent the required power decay at the predefined radial distance:

$$P^2 = P^1 - k \text{ dB}$$

where k is a number ranging from approximately 1 dB to 6 dB (although these values may change depending on a size and power delivered by the one or more antennas).

In some embodiments, the wireless-power transmitter (e.g., device 1400) is able to determine (e.g., predict) an RF signal that, when amplified by a power transmitter and provided to the one or more antennas, causes the one or more antennas to radiate RF energy focused within an operating area that includes the wireless power receiver that in configured to decay (e.g. roll-off) a predetermined amount for each predetermined distance increment from the relative peak power of the RF energy produced by radiated RF energy. In some embodiments, the one or more wireless-power-transmission safety criteria include the predetermined roll-off (e.g. 3 dB) at each predetermined distance increment (e.g., 8 cm) relative to a peak amount of RF energy produced by radiated RF energy. In some embodiments, the determination that transmitting the RF signal would satisfy the one or more safety thresholds is made when it is determined that transmitting the RF signal would create a peak amount of RF energy at the wireless-power receiver that has the predetermined roll-off for each predetermined distance increment relative to the peak amount of RF energy. In some embodiments, the determination is made by the RFIC 160 and/or the PAIC 161A of the wireless-power transmitter.

In some embodiments, the predetermined distance increment is a predefined radial distance defined as 1λ. However, the predefined radial distance may be other values, such as 0.5λ, 1.5λ, 2λ, etc., or may be defined relative to a range of values such as between 0.5λ to 2.5λ, between 0.5λ, −1.5λ, between 0.75λ to 1λ, etc. In some embodiments, the predefined radial distance is not defined relative to a wavelength ("λ") and is instead defined using a unit of length, such as feet, such that the predefined radial distance may 0.5 feet, 1.5 feet, 2 feet, or some other appropriate value.

In some embodiments, the local peak power level ($P^1$) is configured to roll-off by a predetermined amount to a decayed peak power level ($P^2$). In some embodiments, the location of the peak power level ($P^1$) is at the location near and/or at the wireless-power receiver, the wireless-power receiver residing within one wavelength (1λ) from the location of the peak power level ($P^1$). As described above, in some embodiments, the peak power level ($P^1$) decays by a predetermined roll-off to a decayed peak power level ($P^2$). The predetermined roll-off decays the peak power level ($P^1$) at least k dB at a predetermined distance increment of 1λ from the location of the peak power level ($P^1$).

In some embodiments, the predetermined distance increment is a predefined radial distance is 1λ and the required drop off from the peak power is 3 dB (the "example power-focusing regulations"). In some embodiments, the predefined radial distance and the required drop off may be configured to include less restrictive values (e.g., the predefined radial distance is less than 1λ and the required drop off is 1 dB) or may have more restrictive values (e.g., the predefined radial distance is greater than 1λ and the required drop off is 4 or 5 dB).

FIG. 16 illustrates an example of the RF energy focused within an operating area that includes the location of a wireless-power receiver decaying or rolling-off by a predetermined amount at a predetermined distance increment from the peak amount of RF energy, in accordance with some embodiments. As shown in FIG. 16, the wireless power transmitter (e.g. device 1400) can model, via the RFIC 160 and/or PAIC 161A, what peak amount of RF energy will be produced at the wireless-power receiver, and then determine (e.g. predict) whether a safety threshold of a predetermined roll-off of 3 dB is going to be satisfied, e.g., that at the radiated RF energy will roll-off by a predetermined amount (e.g., 3 dB) at a predetermined distance increment (e.g., 8 cm) from the peak power level of the RF energy. While the primary example given here for illustrative purposes is a predetermined 3 dB roll-off value and a predetermined distance increment of 8 cm, in some embodiments, other suitable predetermined roll-off values and predetermined distance increments can be utilized as described above.

As shown in FIG. 16, RF energy is focused within an operating area that includes the location of a receiver 104 of a client device 1406. The RF energy focused within an operating area that includes the receiver 104 generates a peak power level ($P^1$) 1602 at and/or near the location of the receiver 104. In some embodiments, the device 1400, via the RFIC 160 and/or the PAIC 161A, selects an RF signal that, when provide by the power amplifier to one or more antennas of the device 1400, causes the RF energy to roll off by a predetermined roll-off (e.g. 3 dB) at a predetermined distance increment 1604 (e.g. 8 cm) from the peak power level ($P^1$) 1602, such that the decayed peak power level ($P^2$) 1606 (located at the predetermined distance increment from the peak power level ($P^1$) 1602) is equal to the peak power level (P 1) 1602 decreased by the predetermined roll-off (e.g., $P^2 = P^1 - k$ dB).

FIG. 17 is another illustration of a measured electric field plot 1702 and 2D graph 1704 to demonstrate electric field (E-field) roll-off below 10 dB from a peak value at about 3 dB for about every 8 cm for a device 1400 with an included wireless-power transmitter, according to some embodiments. In some embodiments, the E-field is measured by an electric field measurement setup for a device 1400 with an included wireless-power transmitter. In some embodiments, an electrical field plot was taken to capture the E-Field value at the center point 1706 of the antenna of the device 1400 and to evaluate the power roll-off to determine that the RF energy is locally used. The measurement locations, E-Field values and roll-off are shown in FIG. 17. In some embodiments, the RF energy is focused within an operating area that includes the center point 1706 of the antenna of the device 1400 and at a distance of 5 cm away from the front face of the device 1400, the measured E-Field value is 174.5V/m at a degradation of 44.84 dBV/m. In some embodiments, on average, for about every 8 cm, the E-field rolls off about 3 dB. In some embodiments, "about 8 cm" refers to +/−0.5 cm of 8 cm, so the range would be between 7.5-8.5 cm. At a distance of 40 cm away from the front face of the device, the E-Field compared with the E-Field value at 5 cm away is −15 dB. The 2D plot 1704 also shows that the E-Field and the power emitted from the antenna of the device 1400 is contained in a local area with a decreased dB values from the position 1706 at 5 cm away.

In some embodiments, while at an E-Field value of 174.5V/m, the SAR value should not exceed the FCC 1.6 W/kg limitation requirement. In some embodiments, when a distance to the face of the device 1400 is short, such as less than 5 cm, one or more sensors will be used to manage a "keep out zone" to prevent a foreign object, or a person, to be in close proximity to the device 1400 where the E-Field or SAR value exceeds the required limit. In some embodiments, the transmitter will be disabled when the one or more sensors detect the foreign object is within the "keep out zone".

Figure 18:
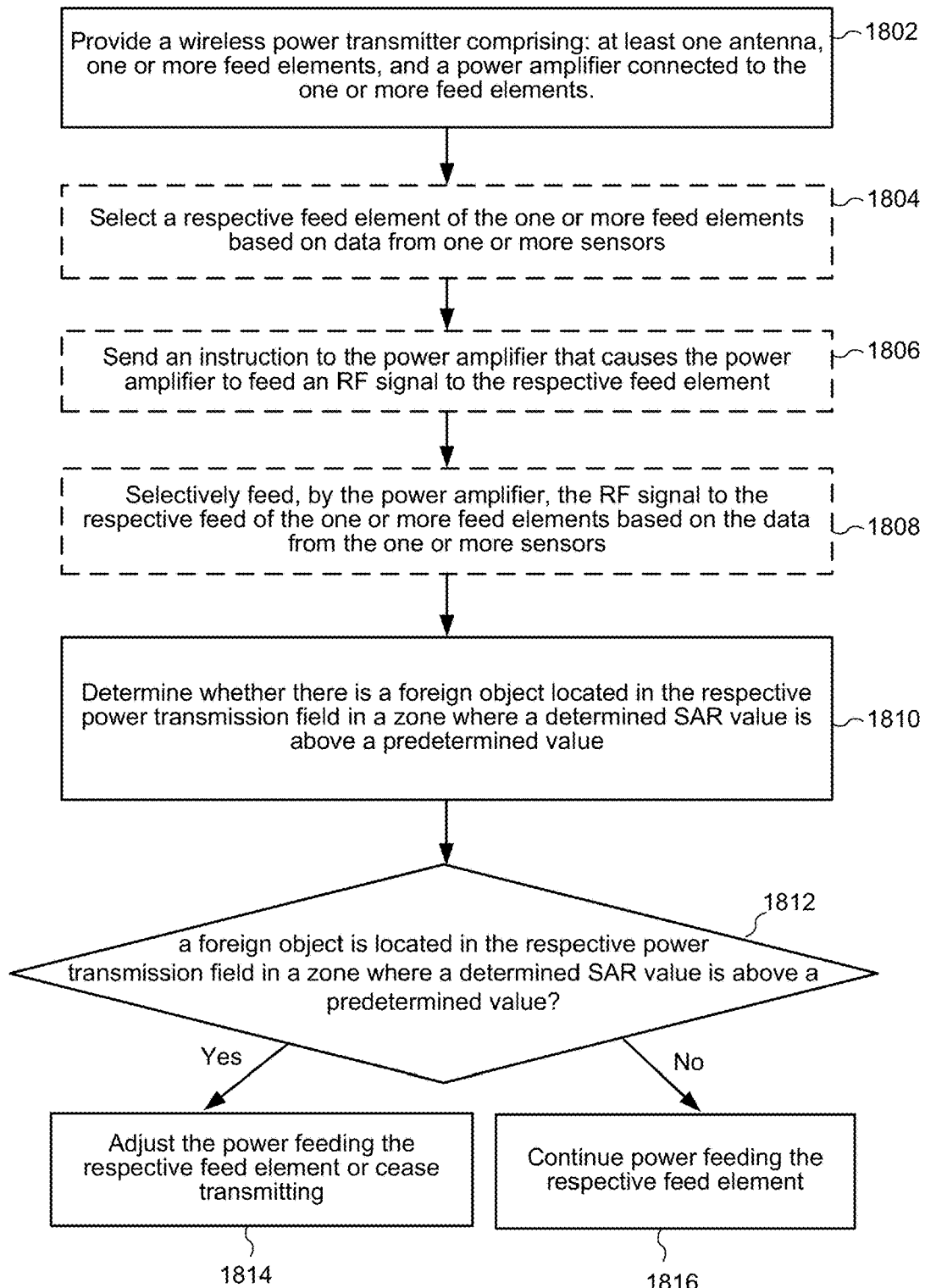
FIG. 18 is a flow diagram showing a method of wirelessly-transmitting energy to a receiver device without using active beam-forming control in accordance with some embodiments.

FIG. 18 is a flow diagram showing a method of wirelessly-transmitting energy to a receiver device without using active beam-forming control in accordance with some embodiments. Operations (e.g., steps) of the method 1800 may be performed by a controller 309 (e.g., a controller 170 of the RFIC 160 of transmitter device 100 as shown in FIGS. 1A-1C, and/or a power amplifier controller IC 161A as shown in FIGS. 1B-1C), the transmitter including one or more transmitter coverage areas (e.g., transmitter coverage areas 290-1, FIGS. 1B-1C; which each include respective one or more transmitters 300, FIG. 3). At least some of the operations shown in FIG. 18 correspond to instructions stored in a computer memory or computer-readable storage medium (e.g., memory 172 and 174 of the transmitter device 100, FIG. 1B; memory 206 of the RF power transmitter device 100).

The method 1800 includes providing (1802) a wireless-power transmitter device 100 (e.g., transmitter 300, FIG. 3) including at least one antenna (e.g., antenna element 302, FIG. 3), one or more feed elements (e.g., feeds 304-A-304-N, FIG. 3), and a power amplifier (e.g., power amplifier 306, FIG. 3) connected to the one or more feed elements. In some embodiments, each antenna includes one or more feed elements. In some embodiments, each antenna may include (i) a ground (e.g., ground plane 1510, FIGS. 15A-15C), (ii) a conductive wire (e.g., antenna element 302, FIG. 3; loop antenna 1504, FIGS. 15A-15C) offset from the ground, the conductive wire forming a loop antenna and/or any other antenna type described above in FIG. 3, (iii) one or more feed elements (e.g., feeds 304-A-304-N, FIG. 3) extending from the ground to the conductive wire, each feed element being connected to the conductive wire at a different position on the conductive wire (e.g., positions A-N, FIG. 3), and (iv) a power amplifier (e.g., power amplifier 306, FIG. 3) connected to one or more feed elements of the one or more feed elements. In some embodiments, only one power amplifier controls and feeds the power to the at least one antenna. In some embodiments, the output power provided by the single power amplifier is from 2 W to 15 W. In some embodiments, multiple power amplifiers are used to power one or more antennas. In some embodiments, the power amplifier is a Class E power amplifier. Alternatively or additionally, in some embodiments, the power amplifier is a GaN (Gallium Nitride) power amplifier. In some embodiments, the ground (e.g., ground plane 1510, FIG. 15) includes a plurality of openings (not shown), and each of the one or more feeds is disposed in a respective opening of the plurality of openings. Structural aspects of the wireless-power transmitter device 100 are discussed in further detail above with reference to FIGS. 15A-15C.

In some embodiments, the method 1800 further includes selecting (1804), by a controller (e.g., controller 309 or a component thereof, such as one or more processors 318, FIG. 3) of the wireless-power transmitter device 100, a respective feed element of the one or more feed elements based on data received from one or more sensors (e.g., sensors 212). In some embodiments, a location of a receiver device relative to the one or more feed elements can be determined based on the data from the one or more sensors and impedance measurements as disclosed herein (e.g., FIGS. 4A-13). In some embodiments, the wireless-power transmitter device 100 and a receiver use BLE communications paths to enable the wireless-power transmitter device 100 to monitor and track the location of the receiver. In some embodiments, the controller is coupled to the power amplifier. For example, with reference to FIG. 3, if the receiver device is located nearest feed element 304-A relative to the other feed elements 304-B-304-N, then the controller selects the feed element 304-A. In some circumstances, the receiver device is located between two or more of the feed elements. In such circumstances, the method 1800 may include selecting, by the controller, at least two feed elements based on a location of the receiver device relative to the one or more feed elements (determined based on the data from the one or more sensors and impedance measurements as disclosed herein). Further, the controller may select all of the one or more feed elements in some instances.

In some embodiments, the method 1800 further includes sending (1806), by the controller (e.g., controller 309), an instruction to the power amplifier that causes the power amplifier to feed the RF signal to the respective feed element. For example, with reference to FIG. 3, if the respective feed element is feed 304-A, then the controller 309 sends an instruction (e.g., via busing 316) that causes the power amplifier to close the switch 308-A, and in turn feed the RF signal to the feed 304-A. In some embodiments, the one or more antennas are configured to radiate the RF signals with different propagation patterns depending on which of the one or more feed elements is fed by the single power amplifier.

In some embodiments, the wireless-power transmitter device 100 includes a communications radio (e.g., communications component 204, FIG. 1A), and the method 1800 further includes receiving a communications signal from a corresponding communications radio of the receiver device. Further, the controller (or a component thereof) may determine the location of the receiver device relative to the one or more feed elements based on the communications signal (e.g., using information included with or indicated by the communications signal). In some embodiments, the receiving and the determining are performed prior to the selecting (1804) and the sending (1806). In some embodiments, the controller determines the location of the receiver device relative to the one or more feed elements based on signal strength of the communication signal, triangulation, and/or response time (e.g., the receiver device timestamps the communication signal when sent which is then compared against a timestamp of the communication signal when it is received at the wireless-power transmitter device 100). Additional location determining techniques can also be used.

In some embodiments, the wireless-power transmitter device 100 includes one or more sensors (e.g., transmitter sensors 212, FIG. 2A), and the method 1800 further includes detecting, via the one or more sensors, a presence of the receiver device. In some optional embodiments, the controller (or a component thereof) may determine the location of the receiver device relative to the one or more feed elements based on information generated by the one or more sensors. In some embodiments, the detecting and the determining are performed prior to the selecting (1804) and the sending (1806). In some embodiments, the one or more sensors include one or more of a pressure sensor, an infrared sensor, an electromagnetic sensor, an acoustic sensor, a capacitive sensor, a light sensor, an inductive sensor, and a hall sensor. As an example, a light sensor may detect a change in light near the wireless-power transmitter device 100 when the receiver device is positioned on or proximate to the wireless-power transmitter device 100. In some embodiments, a capacitive sensor detects a nearby object by the object's effect on the electrical field of the capacitive sensor. In another example (in addition to or separated from the previous example), an infrared sensor may detect a change in temperature near the wireless-power transmitter device 100 when the receiver device is positioned on or proximate to the wireless-power transmitter device 100. In some embodiments, information collected from multiple sensors can be used to determine the location of the receiver device.

In some embodiments, each of the one or more feeds is associated with a respective sensor (e.g., the respective sensor is positioned near (or perhaps on) the feed and the respective sensor takes readings near the feed). In this way, readings from each of the sensors can be compared (e.g., by the one or more processors 318), and the controller may determine the location of the receiver device relative to the one or more feed elements based on the comparing. For example, if a largest change in light occurs at feed 304-A relative to changes in light occurring at the other feeds, then the controller can determine that the receiver device is located closest to the feed 304-A.

In some embodiments, the controller determines the location of the receiver device relative to the one or more feed elements using two or more forms of information (e.g., signal strength in combination with a thermal imaging data, or some other combination communications-based and sensor-based information).

The method 1800 further includes selectively feeding (1808), by the power amplifier, an RF signal to the respective feed element of the one or more feed elements based on the data from the one or more sensors. For example, with reference to FIG. 3, a first feed element 304-A of the one or more feed elements 302-A-302-N is connected to the conductive wire 302 at a first position and a second feed element 302-B, distinct from the first feed element 302-A, of the one or more feed elements 302-A-302-N is connected to the conductive wire 302 at a second position. In such a configuration, the power amplifier: (i) may feed the RF signal to the first feed element when the location of the receiver device is within a threshold distance from the first position, and (ii) may feed the RF signal to the second feed element when the location of the receiver device is within the threshold distance from the second position. In some embodiments, feeding the RF signal to the one or more feed elements includes feeding the RF signal to two of the one or more feed elements upon determining that the location of the receiver device is between the two feed elements.

In some embodiments, the selective-feeding operation (1808) is performed in response to the power amplifier receiving the instruction from the controller.

In some embodiments, the method 1800 further includes (i) exciting, by the respective feed element fed by the power amplifier, the conductive wire and then (ii) radiating, by the conductive wire, the RF signal for wirelessly powering the receiver device. The conductive wire may radiate the RF signal from the conductive wire with different propagation patterns depending on which of the one or more feed elements is fed by the power amplifier. For example, the conductive wire radiates the RF signal from the conductive wire in a first propagation pattern of the different propagation patterns when a first feed element of the one or more feed elements is fed by the power amplifier. In some instances, the "high concentration" of RF energy includes approximately 50 percent of the radiated energy, although greater and lesser percentages can be achieved. Also, a concentration of RF energy in the first propagation pattern forms around the first feed element and the first propagation pattern propagates away from the first feed element in a first direction (or a set of first directions) towards the location of the receiver device. In this way, the method 1800 allows for selectively activating individual feed elements of a loop antenna to ensure that RF energy is propagated in such a way that a sufficiently high concentration of the RF energy is optimally propagated towards a location of a receiver device.

In another example, the conductive wire may radiate the RF signal in a second propagation pattern of the different propagation patterns when a second feed element of the one or more feed elements is fed by the power amplifier. Also, a concentration of RF energy in the second propagation pattern forms around the second feed element and the second propagation pattern propagates away from the second feed element in a second direction (or a set of second directions) towards a location of the receiver device.

In some embodiments, the method 1800 allows for selectively activating individual feed elements of a loop antenna to ensure that RF energy is propagated in such a way that the RF energy below the predetermined SAR threshold is optimally propagated towards a location of a receiver device.

In some embodiments, the wireless-power transmitter device 100 is configured such that in use the first propagation pattern has a first polarization and the second propagation pattern has a second polarization. In some embodiments, the second polarization differs from the first polarization.

In some embodiments, the different propagation patterns are based, at least in part, on a plurality of physical dimensions of the wireless-power transmitter device 100. The plurality of physical dimensions may include but is not limited to: (i) a width of the conductive wire, (ii) a length of the conductive wire, (iii) a height of the conductive wire, (iv) a thickness of the conductive wire, (v) a shape of the loop, and (vi) a magnitude of the offset between the ground (e.g., ground plane 1510, FIG. 15) and the conductive wire. Physical characteristics of the conductive wire (e.g., the antenna element 302) are discussed in further detail above with reference to FIGS. 3 and 15A-15C.

In some embodiments, the conductive wire includes a plurality of contiguous segments (e.g., continuous segments of antenna elements 302-A-302-N, FIG. 3), and each of the one or more feed elements is positioned between a respective pair of adjacent segments of the plurality of contiguous segments (e.g., feeds 304-A-304-N positioned between segments 302-A-302-N). Further, in some embodiments, one or more first segments of the plurality of contiguous segments have a first shape and one or more second segments of the plurality of contiguous segments have a second shape different from the first shape. In some embodiments, each of the plurality of contiguous segments radiates the RF signal when one of the one or more feed elements is fed by the power amplifier.

The method 1800 further includes determining (1810) whether there is a foreign object located in the respective power transmission field in a zone where a determined SAR value is above a predetermined value. In some embodiments, the SAR values within the power transmission field are measured with some external SAR value measurement equipment. In some embodiments, the resulting SAR values from the measurement are stored in a table in the memory of a controller of the wireless-power transmitter device 100. Based on the pre-determined existing SAR values within the power transmission field, the sensor can determine if one or more foreign objects (including a human being) is located or moves into a location where the determined SAR value is above a predetermined threshold (the SAR keep out zone). In some embodiments, sensors are used to detect if the foreign objects are in the SAR keep out zone and such parametric measurements are done by sensors such as IR or capacitive sensors. In some embodiments, one or more sensors are associated with a respective power transmission field near a respective feed element. In some embodiments, the sensors associated with the one or more feeds detect electrical field strength or power transmission energy within the antenna radiation profile near the respective feed. The controller receives the foreign objects detection from the sensors.

The method 1800 further includes determining (1812) whether a foreign object is located in the respective power transmission field in a zone where a determined SAR value is above a predetermined value. In some embodiments, the determined SAR values for a respective power transmission field near the respective feed element will only be read into the memory of a controller if there is a foreign object, such as a human being is at the same location within the same transmission field. If the foreign object is present in a zone where the SAR value for a respective power transmission field near the respective feed element is above the predetermined value, the method 1800 includes a step of adjusting (1814) feeding the power to the respective feed element or ceasing transmission. In some embodiments, the adjusting feeding of the power includes stop feeding the power to the respective feed element. If the foreign object is present only in a zone where the SAR value for a respective power transmission field near the respective feed element is at or below the predetermined value or if the foreign object is not present in the respective power transmission field at all, the method 1800 includes a step of continuing (1816) feeding the power to the respective feed element.

In some embodiments, if the controller determines that if the foreign object is present in a zone where the SAR value for a respective power transmission field near the respective feed element is above the predetermined value, the controller sends instruction to the power amplifier to adjust feeding the power to the respective feed element. In some embodiments, if the foreign object is present in a zone where the SAR value for a respective power transmission field near the respective feed element is above the predetermined value, the controller sends instruction to the power amplifier to stop feeding the power to the respective feed element. In some embodiments, the predetermined threshold is the SAR limit under the US FCC requirement or the EU IEC requirement as described herein. In some embodiments, if the controller determines that the foreign object is not present in a zone where the SAR value for a respective power transmission field near the respective feed element is above the predetermined value, the controller sends instruction to the power amplifier to continue feeding the power to the respective feed element.

In some embodiment, the wireless-power transmission system uses the sensors to manage the SAR keep out zone. For example, within a certain distance to the antenna element, the electrical fields or SAR values might exceed the US FCC or international requirements. In that case, when a sensor detects that a receiver or a foreign object is located within the prohibited SAR keep out zone where the electrical fields or SAR values exceed the limit, the method 1800 would invoke step 1814 as described above. Different SAR regulatory standards are discussed below.

In some embodiments, a method of fabricating a wireless-power transmitter device 100 (e.g., transmitter 300, FIG. 3; smart speaker 1400, FIGS. 15A-15C) includes providing a ground (e.g., ground plane 1510, FIGS. 15A-15C) and removing material from the ground to define one or more openings (e.g., holes) in the ground. The one or more openings being sized to receive feed elements (e.g., feeds 304-A-304-N). In some embodiments, the removing is performed using a drilling operation. The method further includes disposing/attaching a feed in each of the one or more openings such that the wireless-power transmitter device 100 includes one or more feeds. In some embodiments, each of the feeds is mechanically and/or chemically (e.g., using an adhesive) attached to its respective opening. The one or more feeds are substantially perpendicular to the ground and extend away from the ground. The method further includes attaching an antenna element (e.g., antenna element 302, FIG. 3; loop antenna 1504, FIGS. 15A-15C) to the one or more feeds. In some embodiments, the antenna element is mechanically and/or chemically attached to the feeds. Connection points between the antenna element and feed elements are discussed in further detail above with reference to FIG. 3 and FIGS. 15A-15C. The antenna element may be offset from the ground by a distance. In some embodiments, the antenna element is substantially parallel to the ground.

In some embodiments, one or more wireless-power transmitters 100 are fabricated using the method above, and grouped together to form a transmission system (i.e., an array of wireless-power transmitters 100). In some embodiments, the ground may be a single ground plane used by the one or more wireless-power transmitters 100. Alternatively, in some embodiments, each of the one or more wireless-power transmitters 100 has a distinct ground. An array of wireless-power transmitters 100 may be formed by positioning each of the wireless-power transmitters 100 within respective transmitter coverage areas, and then interconnecting components of each of the transmitter coverage areas with a common controller for the transmitter.

Figure 19:
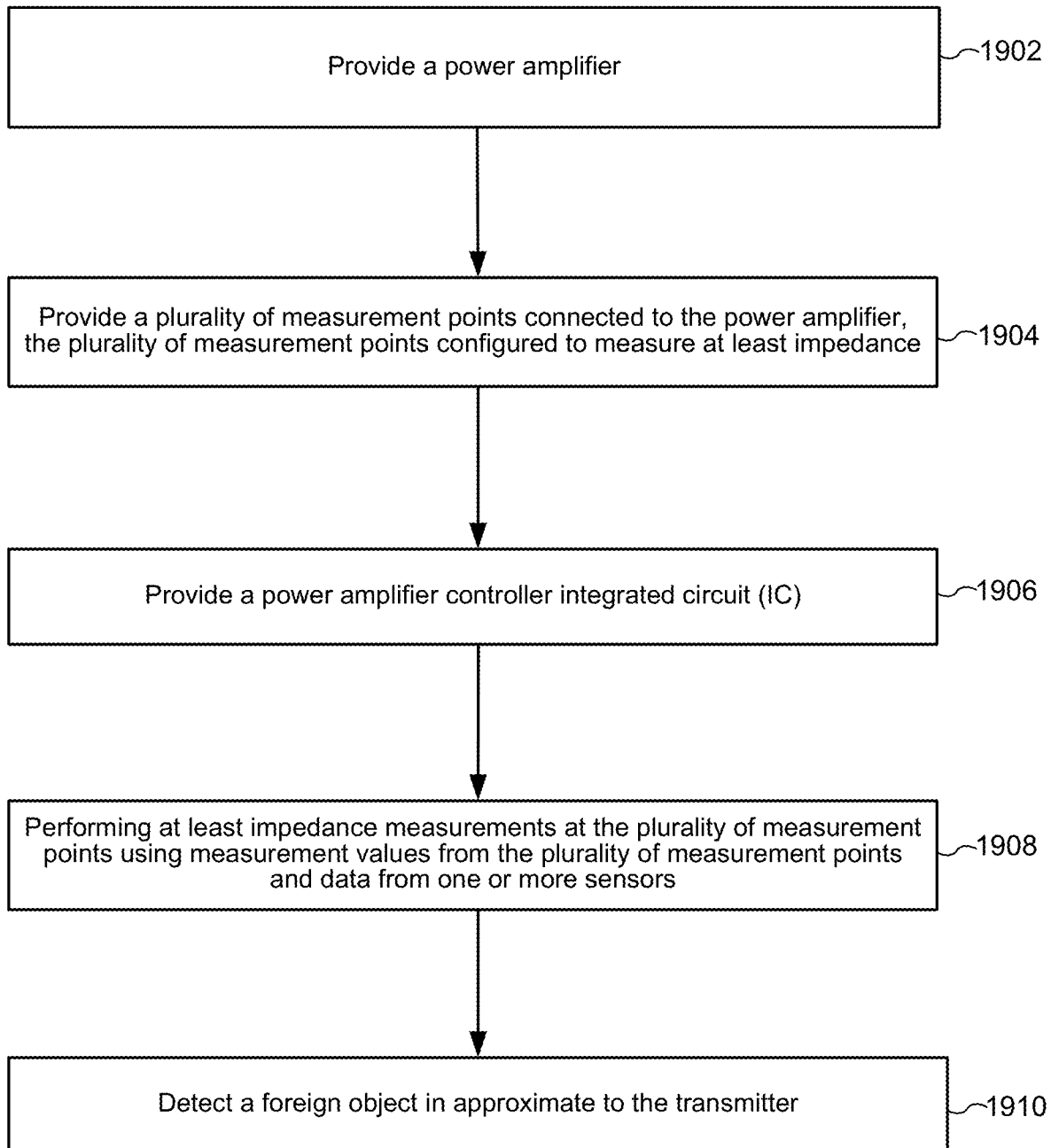
FIG. 19 is a flow diagram showing a method of detecting a foreign object based on taking measurements at various measurements points of a power amplifier, in accordance with some embodiments.

FIG. 19 is a flow diagram 1900 showing a method of detecting a foreign object using the measurements points connected to a power amplifier, in accordance with some embodiments. Operations (e.g., steps) of the method 1900 may be performed by a wireless power transmitting system (e.g. RF charging pad 100, FIGS. 1A-1B, and 2A; charging pad 294, FIG. 1C; wireless power transmitter 400, FIG. 4)

and/or by one or more components thereof (e.g. an impedance measurement system 500, FIG. 5; the PAIC 161A, FIGS. 1B-1C, 3, 5-6). At least some of the operations shown in FIG. 19 correspond to instructions stored in a computer memory or computer-readable storage medium (e.g., memory 206 of the transmitter device 100, FIG. 2A).

The method 1900 includes a step 1902 of providing a power amplifier (e.g., power amplifier 402, FIG. 4).

The method 1900 also includes a step 1904 of providing a plurality of measurement points connected to the power amplifier, the plurality of measurement points configured to measure at least impedance (e.g., see various measurement points in FIGS. 4-6). In some embodiments, measurement points include the voltage at the output of the amplifier 404, voltages at points inside the matching network 406 and 416, the voltage at the drain of the transistors 408. In some embodiments, the DC current and voltage consumed by each stage of the amplifier, such as the DC current measurement 410, voltage measurement 412, and the thermistors for temperature measurement at different stages of the amplifier, such as 414.

The method 1900 further includes a step 1906 of providing a PAIC 161A (e.g., FIGS. 1B-1C, 3, and 5-6). In some embodiments, the PAIC 161A can synchronize the turn on of all the modules of the power amplifier, for example, the power amplifier bias circuits, and the power amplifier power supply network. In some embodiments, the PAIC 161A can perform all of the required analog measurements. In some embodiments, the PAIC 161A can adjust the output power and bias conditions of the power amplifier to maintain optimum efficiency and output power. In some embodiments, the PAIC 161A can synchronize the shut-down of various components of the power amplifier.

The method 1900 further includes a step 1908 of performing at least impedance measurements at the plurality of measurement points using measurement values (e.g., as described in FIG. 4) from the plurality of measurement points and data from one or more sensors (e.g., sensors 212). In some embodiments, the measurements are performed by the RFIC 160 and/or PAIC 161A. In some embodiments, the measurements also including temperature measurements by thermistors integrated with a power amplifier.

The method 1900 further includes a step 1910 of detecting a foreign object in proximity to or within a transmission range of the transmitter. In some embodiments, the PAIC 161A can determine if the measurement results (based on LUTs stored in memory 206, and/or using data from one or more sensors and impedance measurements to reference the LUTs) could damage the power amplifier and if so quickly shutdown the power amplifier. For example, as described in FIGS. 9, the PAIC 161A can use the measurement results to determine whether the impedance thresholds are satisfied. As another example, as described in FIGS. 10-13, the PAIC 161A can use the measurement results to determine whether the power amplifier is operating within the VSWR thresholds and/or dissipation power thresholds, and/or if power scaling needs to be performed. In some embodiments, the PAIC 161A can use the measurement results to determine whether to shut-down the PA. In some embodiments, the PAIC 161A determines if there is a foreign object or a valid receiver while the transmitter is charging (using the data from one or more sensors and/or the impedance measurements as described herein). A foreign object can be determined in the case of a discontinuity in impedance. For example, if a foreign object is detected, an impedance measurement will not be on any of the contours described above in reference to the Smith charts (e.g. FIGS. 7-13), or may be located at a position that does not have an intersection or multiple intersections.

FIGS. 20A-20D are flow diagrams showing a method of wirelessly-transmitting energy to a receiver device without using active beam-forming control in accordance with some embodiments. The methods described below allow for the efficient and effective transmission of wireless power signals by controlling and managing the power amplifier while forgoing any modifications to the amplified RF signal (e.g., the system does not modify phase, gain, etc. such that no active beamforming occurs). The methods describe below also allow for the determination that one or more safety thresholds (e.g., user-safety thresholds and/or power-amplifier-protection thresholds) are satisfied by an RF signal as disclosed above. Further, the methods described below can be performed without tuning the one or more antennas. In some embodiments, antenna tuning can be combined with the methods described below (e.g., the methods described below can be performed independent of antenna tuning). Operations (e.g., steps) of the method 2100 may be performed by one or more integrated circuits (e.g., RFIC 160 of transmitter device 100 as shown in in at least FIGS. 1A-1C, and/or a PAIC 161A as shown in at least FIGS. 1B-1C), the transmitter including one or more transmitter coverage areas (e.g., transmitter coverage areas 290-1, FIGS. 1B-1C; which each include respective one or more transmitters (e.g. TX Antennas 210, FIGS. 1A-1C)). At least some of the operations shown in FIGS. 20A-20D correspond to instructions stored in a computer memory or computer-readable storage medium (e.g., memory 172 and 174 of the transmitter device 100, FIG. 1B; memory 206 of the RF power transmitter device 100).

The method 2000 receiving (2002) an indication that a wireless-power receiver is located within one meter of the wireless-power transmission system and is authorized to receive wirelessly-delivered power from the wireless-power transmission system. In some embodiments, the indication that the wireless-power receiver is located within one meter of the wireless-power transmission system is received via data from one or more sensors (e.g., 212). In some embodiments, the indication that the wireless-power receiver is located within one meter of the wireless-power transmission system is received via a BLE signal and/or other communication protocol sent by the wireless-power receiver. Similarly, in some embodiments, the wireless-power receiver is determined to be authorized to receive wirelessly-delivered power from the wireless-power transmission system based on the data from one or more sensors, BLE signal, and/or other communication protocol sent by the wireless-power receiver. Alternatively or additionally, in some embodiments, the indication that the wireless-power receiver is located within one meter of the wireless-power transmission system is received by detecting a change in impedance at the power amplifier (as discussed above). Similarly, in some embodiments, the wireless-power receiver is determined to be authorized to receive wirelessly-delivered power from the wireless-power transmission system based on detecting change in impedance and utilizing one or more signature-signals as discussed herein.

Method 2000 includes, in response to receiving the indication, selecting (2004) a power level from among a plurality of available power levels at which to amplify a radio frequency (RF) signal using a power amplifier. In some embodiments, the power level selected based on one or more lookup tables (LUT)s. In some embodiments, the LUTs include measurement values obtained during simulation, characterization, and/or manufacturing tests of the wireless-power transmitter device 100. In some embodiments, the indication includes information that allows the wireless-power transmission system to determine a location of the wireless-power receiver, and the power level among the plurality of available power levels is selected based, at least in part, on the location of the wireless-power receiver. Alternatively, rather than basing selection of the power level on the receiver's location, in some other embodiments, the wireless-power transmitter device 100 selects a maximum power level among the plurality of available power levels, the maximum power level being the highest power level (e.g. 15 W) of the plurality of available power levels that satisfies one or more safety thresholds as described below. For example, the wireless-power transmitter device 100 can select a first power level (e.g., the maximum power level) at a first time and, based on a determination that the first power level fails to satisfy the one or more safety thresholds, select a second power level (e.g., the second power level being less than the maximum power level).

In some embodiments, the selected (2006) power level is a maximum power level from among the plurality of available power levels. In some embodiments, the power level is selected (2008) from among the plurality of available power levels of the power amplifier when the wireless-power receiver is at most 40 cm from the wireless-power transmitter device 100. In some embodiments, the power level is selected (2010) from among the plurality of available power levels of the power amplifier when the wireless-power receiver is within 20 cm to 40 cm from the wireless-power transmitter device 100. In some embodiments, the power level (2012) is between 2 watts and 15 watts. In some embodiments, the selected power level at which to generate the RF signal is increased as the distance between the wireless-power receiver between and the wireless-power transmitter device 100 increases.

The method 2000 includes, in accordance with a determination that transmitting the RF signal to the wireless-power receiver would satisfy (2014) one or more safety thresholds, instructing (2014-*a*) the power amplifier to amplify the RF signal using the power level to create an amplified RF signal, and providing (2014-*b*) the amplified RF signal to one or more antennas. The one or more antennas are caused to, upon receiving the amplified RF signal, radiate RF energy that is focused within an operating area that includes the wireless-power receiver while forgoing any active beamforming control. In some embodiments, radiated RF energy is said to be focused within an operating area that includes the wireless-power receiver when a peak level of RF energy is at its maximum at the location of the wireless-power receiver. In some embodiments, the method 2000 instructs (2014-*a*) the power amplifier to amplify the RF signal using the power level while forgoing any modification to the amplified RF signal that is consistent with beamforming. In other words, the wireless-power transmitter device 100 does not modify the phase, gain, etc. of an RF signal for beamforming purposes. In some embodiments, the method 2000 includes, in accordance with a determination that no power level from among the plurality of available power levels that would satisfy the one or more safety thresholds, instructing the power amplifier to shut down. As discussed herein, a determination that a power level from among the plurality of available power levels would satisfy the one or more safety thresholds is based data retrieved from one or more LUTs.

By determining that transmitting the RF signal to the wireless-power receiver would satisfy (2014) one or more safety thresholds before instructing (2014-*a*) the power amplifier ensures that an appropriate power level (e.g., safe and efficient) from among the plurality of available power levels is selected for use in amplifying the RF signal, such that the one or more safety thresholds will still be satisfied after the RF signal is transmitted. In particular, the system can reference stored values in LUTs to select a power level that is known to satisfy the one or more safety thresholds. Alternatively or additionally, in some embodiments, the system can predict that transmitting the RF signal in the future would result in a formation of RF energy at the wireless-power receiver that satisfies the one or more safety thresholds, the prediction based on referencing, at least, the dynamically obtained impedance measurements with the LUTs (data from one or more sensors can also be used to reference the LUTs). Non-exhaustive examples of the safety thresholds are discussed in detail below and in FIG. 5.

In some embodiments, the one or more safety thresholds include (2016) a maximum specific absorption rate (SAR) value of not greater than 2 W/kg, and the determination that transmitting the RF signal would satisfy the one or more safety thresholds is made when it is determined that transmitting the RF signal would create a maximum SAR value of not greater than 2 W/kg at the wireless-power receiver (e.g., determined by referencing one or more LUTs, or by ensuring that the system uses only those operation characteristics (e.g., operational impedance, output power, etc.) designed to ensure that the SAR value is always satisfied). In some embodiments, the one or more safety thresholds include (2018) a maximum specific absorption rate (SAR) value of not greater than 0.8 W/kg, and the determination that transmitting the RF signal would satisfy the one or more safety thresholds is made when it is determined that transmitting the RF signal would create a maximum SAR value of not greater than 0.8 W/kg at the wireless-power receiver (e.g., determined by referencing one or more LUTs or by ensuring that the system uses only those operation characteristics (e.g., operational impedance, output power, etc.) designed to ensure that the SAR value is always satisfied). In some embodiments, the wireless-power transmitter device 100 described herein is capable of even greater control over the maximum SAR value, such as by ensuring that radiated RF energy focused within an operating area that includes the wireless-power receiver will create a maximum SAR value that is no greater than a value of 1.6 W/kg, 1.5 W/kg, 0.7 W/kg, down to a value as low as 0.5 W/kg.

In some embodiments, the one or more safety thresholds include (2020) a predetermined roll-off of 3 dB at each predetermined distance increment relative to a peak amount of RF energy produced by radiated RF energy, and the determination that transmitting the RF signal would satisfy the one or more safety thresholds is made when it is determined that transmitting the RF signal would create a peak amount of RF energy at the wireless-power receiver that has the predetermined roll-off of 3 dB for each predetermined distance increment relative to the peak amount of RF energy (e.g., determined by referencing one or more LUTs or by ensuring that the system uses only those operation characteristics (e.g., operational impedance, output power, etc.) designed to ensure that the e-field roll-off value is always satisfied). In some embodiments, the predetermined distance increment (2022) is about 8 cm. In some embodiments, "about 8 cm" refers to +/−0.5 cm of 8 cm, so the range would be between 7.5-8.5 cm. For example, as shown in FIG. 17, in some embodiments, the RF energy can be focused within an operating area that includes a location of a receiver 104. The RF energy at the location of the receiver 104 is at its peak 1702 (or maximum for the selected power level) and rolls off 1706 by a predetermined roll-off of 3 dB for each predetermined distance increment 1704. As another example, as shown in FIG. 18, in some other embodiments, the RF energy is focused directly in front of the wireless-power transmitter device 100 with its peak RF energy at the center point 1006. The RF energy focused within an operating area that includes the center point 1006 rolls off by a predetermined roll-off of 3 dB for each predetermined distance increment (additional example and explanation provided in FIG. 16).

In some embodiments, the method 2000 includes modeling the peak amount of RF energy that would be produced at the wireless-power receiver for a selected power level, and then determine whether the predetermined roll-off of 3 dB is going to be satisfied (e.g., for at least one predetermined distance increment). While the primary example given here for illustrative purposes is a predetermined 3 dB roll-off value, in some embodiments, other suitable predetermined roll-off values can be utilized. For example, as described above in FIGS. 17 and 18, in some embodiments, the predetermined roll off can be less than 3 dB (e.g., 1 dB) for distances below the predetermined distance increment. Alternatively or additionally, in some embodiments, the predetermined roll off can be greater than 3 dB (e.g., 4 to 5 dB) for distances greater than the predetermined distance increment. Similarly, other suitable predetermined distance increment values can be used (as described above in FIGS. 16 and 17). For example, in some embodiments, the predetermined distance increment is based on the wavelength (λ) of the emitted electromagnetic waves.

In some embodiments, the wireless-power transmitter device 100 includes (2024) only a single power amplifier and the one or more antennas include only a single antenna. Designing a wireless-power transmitter device 100 that is capable of complying with the one or more safety thresholds using only a single PA and only a single antenna results in a low-cost system that is still able to achieve a safe transmission of wireless power, thus producing a system that is commercially viable both for its ability to comply with regulatory requirements and for its ability to be built at a cost point that is palatable for customers. Such a wireless-power transmitter device 100 also places a lower computing requirements on the one or more ICs, because less components need to be controlled, and also because the system does not require any active beamforming control.

In some embodiments, the method 2000 includes determining (2026-*a*) an operational impedance at the power amplifier based on an impedance measurement from among multiple measurement points of the power amplifier, and the one or more safety thresholds include (2026-*b*) one or more impedance thresholds indicating that the operational impedance is at a safe level, and the determination that transmitting the RF signal will satisfy the one or more safety thresholds is made when it is predicted that using the power level to amplify the RF signal would keep the operational impedance at the power amplifier at or below the one or more impedance thresholds. The operational impedance of the power amplifier can be determined at various different measurements using a different combination of parametric parameters of the device (as described above in FIGS. 7-13)

In some embodiments, the method 2000 includes receiving (2028-*a*) an impedance measurement from among the multiple measurement points of the power amplifier. The method 2000 includes utilizing (2028-*b*) the impedance measurement to retrieve information for stored measurement values for two or more parametric parameters, the stored measurement values for the two or more parametric parameters indicating that the operational impedance is a safe operational impedance for the power amplifier. Visual representations of the stored measurements for the two or more parametric parameters defining the safe operational impedance of the power amplifier are shown by the predetermined intersections on the Smith chart (e.g., FIG. 9). The method 2000 further includes selecting (2028-*c*) the power level upon determining that the operational impedance is a safe operational impedance for the power amplifier. Determining that the impedance measurement corresponds to the stored measurement values for two or more parametric parameters in the LUT, in some embodiments, means that the impedance measurement is known or can be approximated (e.g., extrapolated value from the operating impedances) as the safe operational impedance for the power amplifier. For example, as visually represented in FIGS. 7-9, stored measurement values for two or more parametric parameters map to respective predetermined intersection on the Smith chart that can be used to determine or predict the operational impedance. As described above in FIGS. 7 and 8, the stored measurement values for two or more parametric parameters (represented as predetermined contours of two or more parametric parameters) can be obtained during simulation, characterization, and/or manufacture tests of the wireless-power transmitter device 100. A non-exhaustive list of the parametric parameters include Vdrain power, DC Power, Vout_contour, and/or power dissipation. Additional examples and explanations of the parametric parameters and their use with the Smith charts are provided above in FIGS. 7-13. Additionally or alternatively, data from one or more sensors can be used in conjunction with the impedance measurements to determine (by using the LUTs) a safe operational impedance for the power amplifier.

In some embodiments, the method 2000 includes receiving (2030-*a*) an impedance measurement from among multiple measurement points of the power amplifier. The method 2000 includes utilizing (2030-*b*) the impedance measurement to retrieve information for stored measurement values for two or more parametric parameters (e.g., Vout and power dissipation as described above), the stored measurement values for the two or more parametric parameters indicating that the operational impedance is a safe operational impedance for the power amplifier. Visual representations of the stored measurements for the two or more parametric parameters defining a safe operational impedance of the power amplifier are shown by the predetermined intersections on the Smith chart (e.g., FIGS. 8 and 12-13) The method 2000 further includes determining (2030-*c*) a dissipation level corresponding to the retrieved information, and decreasing (2030-*d*) the power level upon determining that the dissipation level at the impedance measurement is above a dissipation threshold. Examples of using the dissipation threshold is provided above in FIGS. 12-13. Additionally or alternatively, data from one or more sensors can be used in conjunction with the impedance measurements to determine (by using the LUTs) a dissipation level at the impedance measurement.

In some embodiments, the power level is dynamically determined (2032) using the one or more LUTs while the RF energy is focused within an operating area that includes the wireless-power receiver without any active beamforming control. As described above, the power level can be adjusted (e.g., dynamically determined) based on changes to the detected impedances, a receiver and/or foreign object entering or leaving a transmission field, movement of a receiver and/or foreign object, and/or other situations as described above. The dynamic adjustments are based on the simulation, characterization, and/or manufacture tests of the wireless-power transmitter device 100 and/or one or more antennas of the transmitter device 100.

In some embodiments, the method 2000 includes receiving (2034-*a*), from one or more sensors, a shut-off indication that indicates that an object (e.g., a foreign object or a person) is within a predefined shut-off distance of the wireless-power transmitter device 100. The method 2000, in response to receiving the shut-off indication, causes (2034-*b*) the one or more antennas to cease radiating the RF energy. In some embodiments, the predefined shut-off distance is (2036) approximately 20 cm from the wireless-power transmitter device 100. In some embodiments, the 20 cm is measured radially from a center point of the system, such as is depicted by the 20 cm long radial arrows illustrated in FIG. 14D. In some embodiments, the one or more sensors of the wireless-power transmitter device 100 are IR sensors. In some embodiments approximately 20 cm references to +/−1 cm off of 20, so a range of 19 to 21 cm.

In some embodiments, receiving the indication that the wireless-power receiver is located within one meter of the wireless-power transmitter device 100 and is authorized to receive wireless charging from the wireless-power transmitter device 100, and selecting the power level at which to generate the RF signal are performed (2038-*a*) at a first integrated circuit. The first IC is, for example, the RFIC 160. In some embodiments, the indication that the wireless-power receiver is located within one meter of the wireless-power transmitter device 100 and is authorized to receive wireless charging from the wireless-power transmitter device 100 is received from one or more sensors (e.g. sensors 212) of the wireless-power transmitter device 100. In some embodiments, controlling and managing one or more operations of the power amplifier including instructing the power amplifier to amplify the RF signal are performed (2038-*b*) at a second integrated circuit. The second IC is, for example, the PAIC 161A. As described above, the first IC and the second IC are communicatively coupled to each other and are configured to work with each other in performing the operations described above. In some embodiments, the first IC and the second IC provide instructions to each other. In some embodiments, having two different integrated circuits is beneficial because it makes it easier to control the distribution of heat, distribute the processing between the ICs. In some embodiments, having two different integrated circuits enables older wireless-power transmitters to be retrofitted. Alternatively or additionally, in some embodiments, it more efficient, for cost purposes, to design and use two different ICs In some embodiments, determining an operational impedance at the power amplifier may be performed (2040) at the second IC (e.g., to reduce the processing on the first IC). In some embodiments, the second IC may also store the Smith charts and/or one or more contours to be loaded on the Smith Chart for performing operations of the method described above.

In some embodiments, the method 2000 includes receiving (2042-*a*) charging information from the wireless-power receiver. The method 2000 includes selecting (2042-*b*) the power level from among the plurality of available power levels based, at least in part, on the charging information from the wireless-power receiver. In some embodiments, the charging information includes a request for power, the request specifying power limits, SAR limits, and/or other parameters specific to the wireless-power receiver. In some embodiments, the charging information is received via a communication radio. In some embodiments, the communication radio operates using the Bluetooth Low Energy (BLE) protocol and/or other protocols described above. In some embodiments, the charging information is received in a packet of information that is received in conjunction with the indication that the wireless-power receiver is located within one meter of the wireless-power transmitter device 100 and is authorized to receive wirelessly-delivered power from the wireless-power transmitter device 100. In other words, the wireless-power receiver can use a wireless communication protocol (such as BLE) to transmit the charging information as well as authentication information to the one or more integrated circuits).

In some embodiments, the one or more safety thresholds can be satisfied based on the charging information received from the wireless-power receiver. For example, the charging information can includes a SAR value measured at the wireless-power receiver, an effective power measured at the receiver (e.g., transmitted power converted into usable power), a measured impedance, and/or any other information to make a determination on the one or more safety thresholds described herein.

In some embodiments, the wireless-power receiver is configured to charge a coupled electronic device (e.g., a mobile phone, a watch, a hearing aid, and/or other smart devices).

Figure 21B:
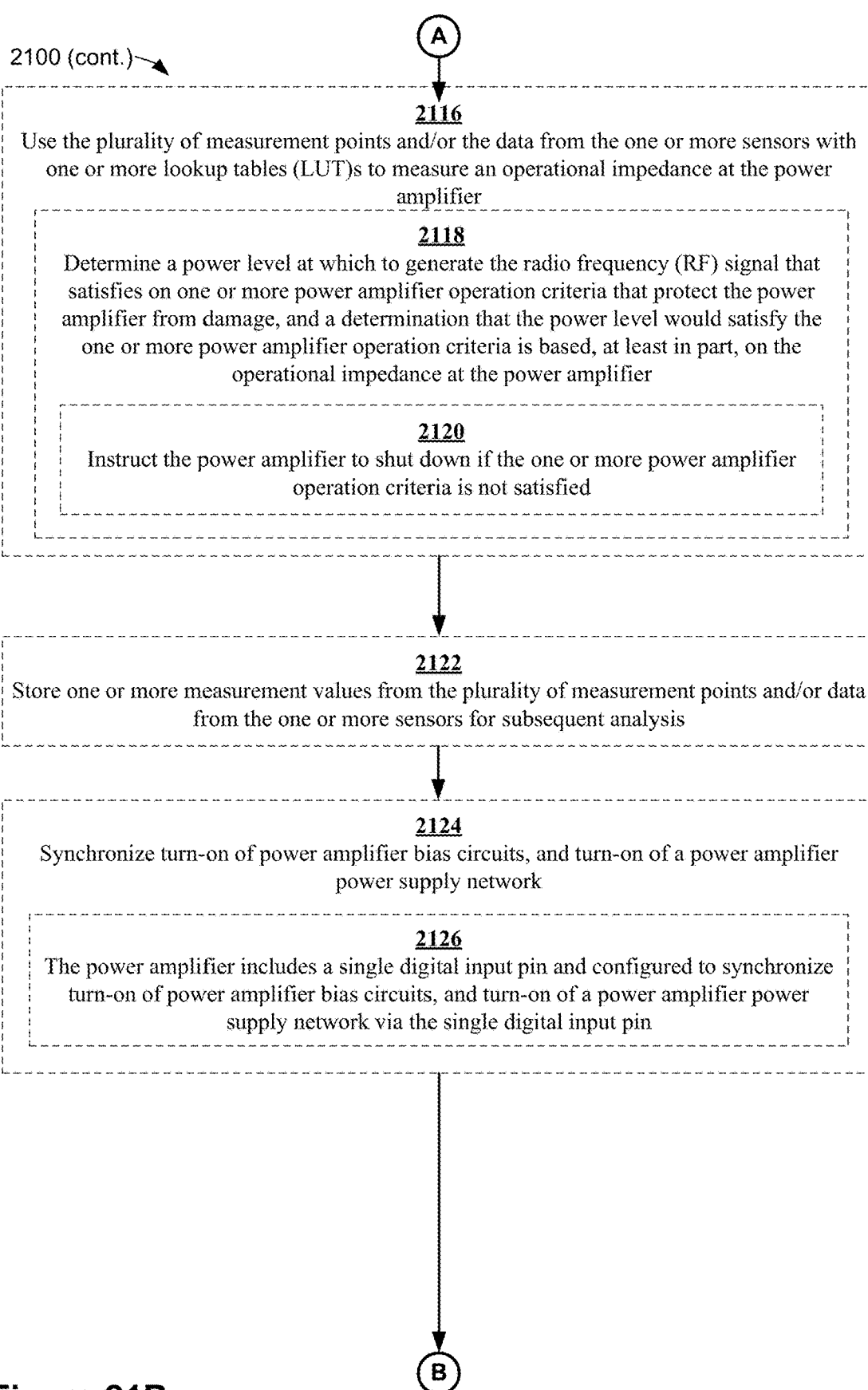
Figure 21C:
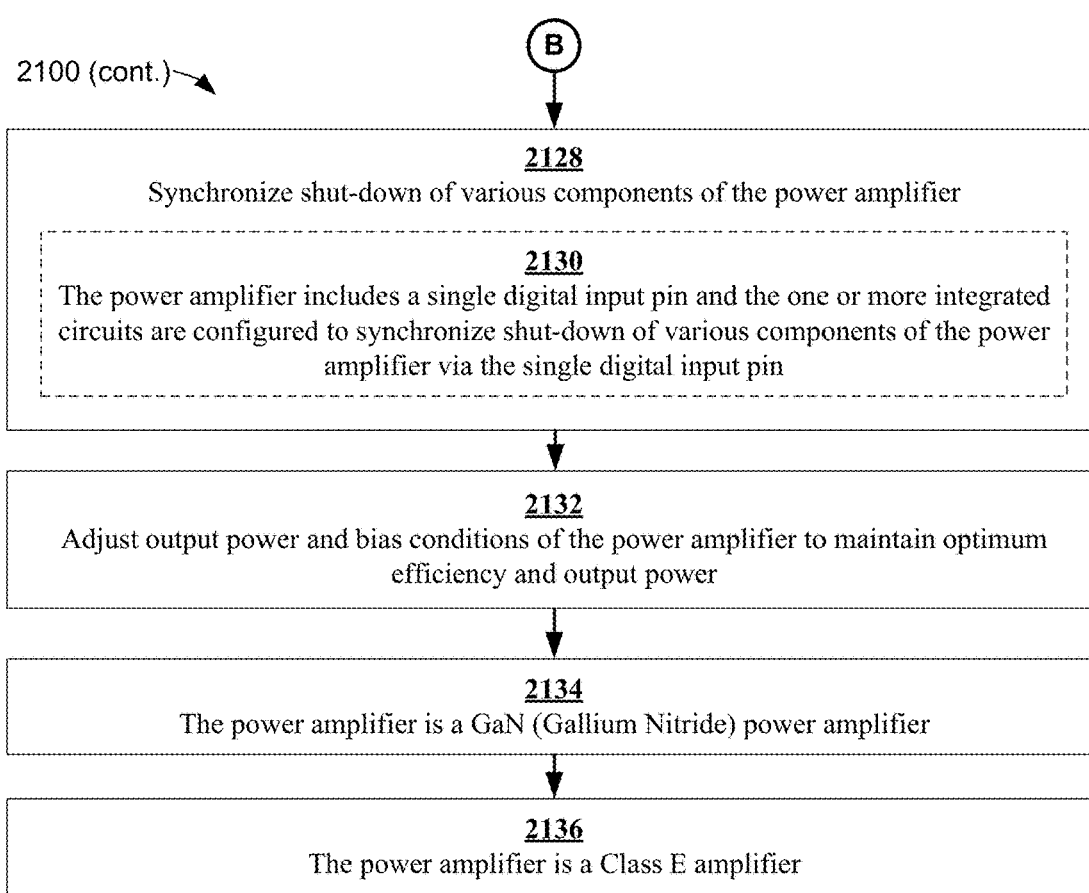

FIGS. 21A-21C are flow diagrams showing a method of controlling and/or managing operation of one or more power amplifiers in accordance with some embodiments. Operations (e.g., steps) of the method 2100 may be performed by one or more integrated circuits (e.g., RFIC 160 of transmitter device 100 as shown in in at least FIGS. 1A-1C, and/or a PAIC 161A as shown in at least FIGS. 1B-1C, 3, 5-6), the transmitter device 100 including one or more power amplifiers. At least some of the operations shown in FIGS. 21A-21C correspond to instructions stored in a computer memory or computer-readable storage medium (e.g., memory 172 and 174 of the transmitter device 100, FIG. 1B; memory 206 of the RF power transmitter device 100).

Method 2100 includes receiving (2102) impedance measurements at a plurality of measurement points of the power amplifier and data from one or more sensors. The plurality of measurement points allow measurements of at least an impedance measurement at each respective measurement point. In some embodiments, the impedance measurements at the plurality of measurement points include (2104) one or more of: voltage at an output of the power amplifier, voltages at points inside a matching network, voltage at a drain of a transistors of the power amplifier, a DC current and voltage consumed by each stage of the power amplifier, and thermistors at different stages of the power amplifier. The different measurement points are described above in FIG. 4. In some embodiments, the plurality of measurement points are (2106) measured at multiple output power levels of the power amplifier (e.g., as described above in FIGS. 4, 7, and 8). Additionally or alternatively, in some embodiments, method 2100 includes receiving data from one or more sensors of the wireless-power transmitter device 100. The data from one or more sensors (e.g. sensors 212) of the wireless-power transmitter device 100 can be used in conjunction with the received impedance measurements at the plurality of measurement points of the power amplifier.

In some embodiments, the power amplifier includes (2108) a thermistor that measures temperature. In some embodiments, the thermistor is on (2110) a same chip as other components of the power amplifier.

Method 2100 includes detecting (2112) presence of a foreign object within 6 inches of the wireless-power transmitter device 100 based on the received impedance measurements and the data from one or more sensors, and adjusting radiated radio frequency (RF) energy that is focused within an operating area that includes a wireless-power receiver while the presence of the foreign object is detected.

Method 2100 includes detecting (2114) absence of the foreign object within the 6 inches of the wireless-power transmitter device 100 based on the received impedance measurements and the data from one or more sensors (or lack thereof), and causing the radiation of the RF energy focused within an operating area that includes the wireless-power receiver upon determining that the foreign object is absent.

In some embodiments, method 2100 includes using (2116) the plurality of measurement points and/or the data from the one or more sensors with one or more lookup tables (LUT)s to measure an operational impedance at the power amplifier. In some embodiments, method 2100 includes determining (2118) a power level at which to generate the radio frequency (RF) signal that satisfies on one or more power amplifier operation criteria that protect the power amplifier from damage, and a determination that the power level would satisfy the one or more power amplifier operation criteria is based, at least in part, on the operational impedance at the power amplifier. In some embodiments, method 2100 includes instructing (2120) the power amplifier to shut down if the one or more power amplifier operation criteria is not satisfied. In some embodiments, the one or more power amplifier operation criteria include the one or more impedance thresholds as described above in FIGS. 7-13.

In some embodiments, method 2100 includes storing (2122) one or more measurements values from the plurality of measurement points and/or data from the one or more sensors for subsequent analysis. In particular, the one or more measurements values from the plurality of measurement points can be stored into the one or more LUTs (e.g., updating and/or building on the LUTS) and used to improve the accuracy of future impedance determinations. In some embodiments, the stored measurement can be used to improve the overall speed of the impedance determinations (e.g., by allowing the system to avoid having to repeat calculations and/or determinations). Other uses of the stored measurement values are discussed above in FIGS. 4, 7, and 8.

In some embodiments, method 2100 includes synchronizing (2124) turn-on of power amplifier bias circuits, and turn-on of a power amplifier power supply network. In some embodiments, the power amplifier includes (2126) a single digital input pin and configured to synchronize turn-on of power amplifier bias circuits, and turn-on of a power amplifier power supply network via the single digital input pin. In some embodiments, method 2100 includes synchronizing (2128) shut-down of various components of the power amplifier. In some embodiments, the power amplifier includes (2130) a single digital input pin and the one or more integrated circuits are configured to synchronize shut-down of various components of the power amplifier via the single digital input pin.

In some embodiments, method 2100 includes adjusting (2132) output power and bias conditions of the power amplifier to maintain optimum efficiency and output power. In some embodiments, adjustment to the power amplifier and/or other configurations of a wireless-power transmission system are based on predetermined properties and/or characteristics of the wireless-power transmission system obtained during simulation, characterization, and/or manufacture tests of the wireless-power transmitter device and/or one or more antennas of the transmitter device. In some embodiments, the power amplifier is (2134) a GaN (Gallium Nitride) power amplifier. Alternatively or additionally, in some embodiments, the power amplifier is (2136) a Class E amplifier.

FIG. 22 is flow diagram showing a method of controlling and/or managing operation of one or more power amplifiers to optimize the performance of the one or more antennas in accordance with some embodiments. Operations (e.g., steps) of the method 2200 may be performed by one or more integrated circuits (e.g., RFIC 160 of transmitter device 100 as shown in in at least FIGS. 1A-1C, and/or a PAIC 161A as shown in at least FIGS. 1B-1C, 3, 5-6), the transmitter including one or more power amplifiers. At least some of the operations shown in FIG. 22 correspond to instructions stored in a computer memory or computer-readable storage medium (e.g., memory 172 and 174 of the transmitter device 100, FIG. 1B; memory 206 of the RF power transmitter device 100).

Method 2200 is a method of operating an antenna, and includes dynamically adjusting (2202) power distribution for a transmission field of the antenna provided to a wireless-power receiver. Dynamically adjusting the power distribution for the transmission field includes, at a power amplifier controller integrated circuit (IC) (e.g., PAIC 161A), adjusting (2204) power provided to the antenna from a power amplifier. In some embodiments, the power provided to the antenna from the power amplifier is adjusted (2206) based on the power amplifier controller IC detecting a change in impedance. A change in impedance can be determined based on impedance measurements described above in FIGS. 4-13. In some embodiment, the change in impedance can be determined based on data received from one or more sensors (e.g., 212). Alternatively or additionally, the change in impedance can be determined based on charging information received by a wireless-power receiver (via a communication component). For example, in some embodiments, the change (2208) in impedance is movement of the wireless-power receiver. Dynamically adjustments to the power distribution of the antenna are based on stored valued of the radiation profile and/or other components of the wireless-power transmitter device 100 that are obtained during simulation, characterization, and/or manufacture tests of the wireless-power transmitter device 100 and/or one or more antennas of the transmitter device 100.

Method 2200 includes adjusting (2210) the power distribution for the transmission field based on the adjusted power provided to the antenna from the power amplifier such that: the adjusted power provided is evenly distributed (2212) across the power distribution for the transmission field of the antenna; and a power loss at an edge of the power distribution for the transmission field of the antenna is reduced (2214) from 30% to 10%. For example, as shown in FIG. 14E, a first transmission field (e.g., 1402) can be improved to a second transmission field (1418) through one or more changes to the PA (via the RFIC 160 and/or PAIC 161A). In some embodiments, dynamically optimizing the transmitted power signals is performed (2216) independent of (dynamic or static) tuning the antenna. In other words, method 2200 can be performed without moving and/or shifting the antennas or selectively activating one or more antennas. In some embodiments, method 2200 can be performed in conjunction with antenna tuning (dynamic or static). The above explained adjustments to the power distribution for a transmission field are and/or dynamic optimization of the transmitted power signals are performed while forgoing beamforming.

Figure 23:
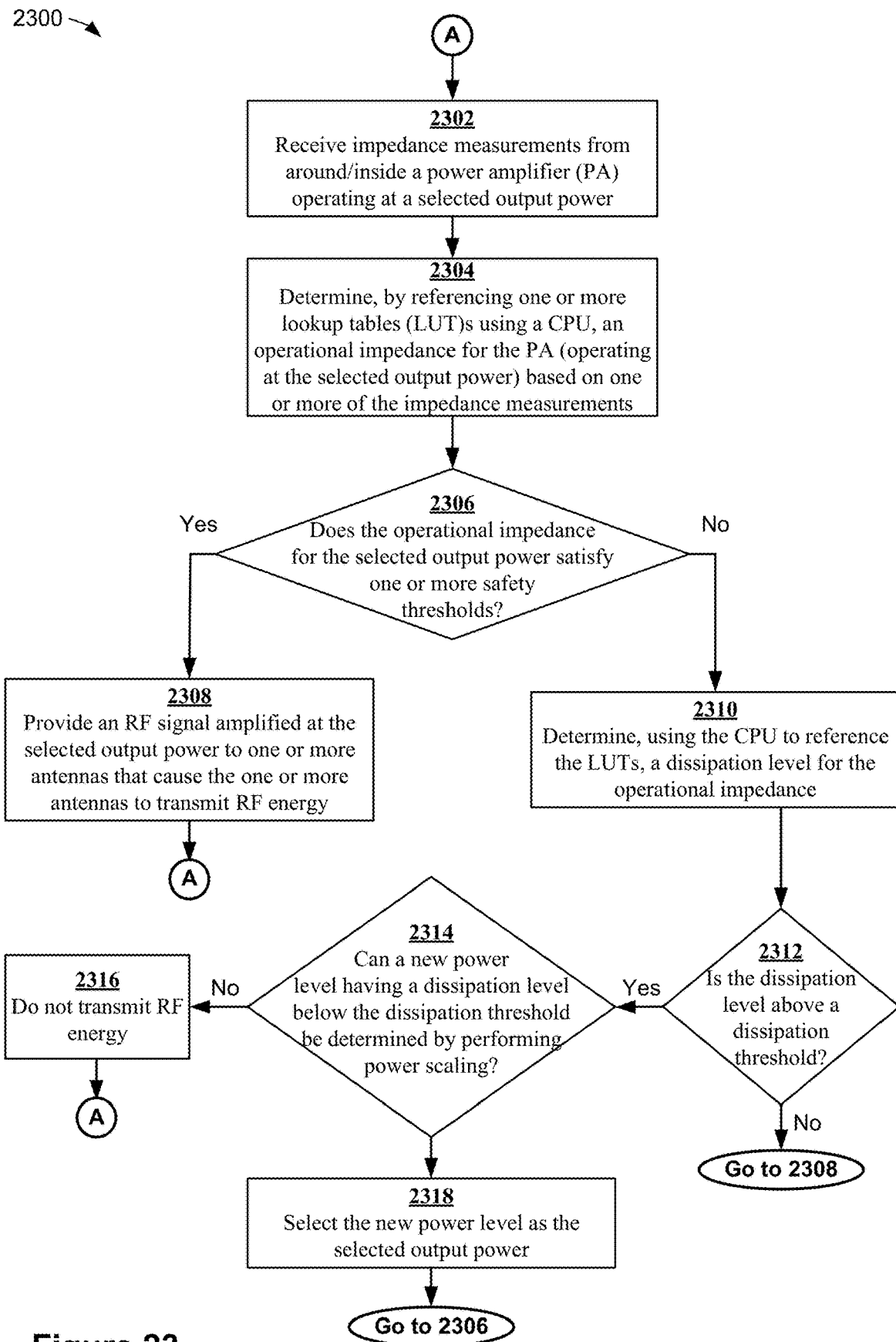
FIG. 23 is an example flow diagram for selecting an operational impedance for a power amplifier in conjunction with transmitting RF energy from a wireless-power transmitting device in accordance with some embodiments In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

FIG. 23 is an example flow diagram for transmitting RF energy from a wireless-power transmitting device 100 in accordance with some embodiments. Operations (e.g., steps) of the method 2300 may be performed by one or more integrated circuits (e.g., RFIC 160 of transmitter device 100 as shown in in at least FIGS. 1A-1C, and/or a PAIC 161A as shown in at least FIGS. 1B-1C, 3, 5-6), the transmitter device 100 including one or more power amplifiers. At least some of the operations shown in FIG. 23 correspond to instructions stored in a computer memory or computer-readable storage medium (e.g., memory 172 and 174 of the transmitter device 100, FIG. 1B; memory 206 of the RF power transmitter device 100).

At operation 2302, the method 2300 includes receiving impedance measurements from around/inside a power amplifier (PA) operating at a selected output power. The selected power level is selected from among a plurality of available power levels at which to amplify a radio frequency (RF) signal using a power amplifier of the wireless-power transmitter device. In some embodiments, the impedance measurements can be received from one or more measurement points as shown in FIG. 4. At operation 2304, the method 2300 includes determining, by referencing a lookup table (LUT) (stored in memory 206) using a CPU, an operational impedance for the PA (operating at the selected output power) based on one or more of the impedance measurements. For example, the CPU can use the LUT to reference the impedance measurements to determine the operational impedance of the PA. Alternatively or additionally, in some embodiments, the power level is selected from among a plurality of available power levels based on the LUT. In some embodiments, data from one or more sensors (e.g. 212) is used in conjunction with the impedance measurements to determine the operational impedance for the PA (e.g., the data from the one or more sensors is used as an additional measurement value to be referenced when performing lookups in the LUT). Visual representations of the above operations are provided and described above in FIG. 9. In particular, FIG. 9 shows that the one or more impedance measurements can be used with one or more stored measurements for at least two parametric parameters (represented as contours) to determine (or predict) an operational impedance for the PA operating at the selected output power.

In some embodiments, the parametric parameters include the DC current and voltage consumed by each stage of the amplifier, temperature measurements, DC Power, voltage at the output of the amplifier, voltage drain power and/or voltage at the drain of the transistors, power dissipation, and/or voltages at points inside the matching networks.

At operation 2306, the method 2300 determines whether the operational impedance (determined at operation 2304) for the selected output power satisfies one or more safety thresholds. The one or more safety thresholds are described above in reference to FIG. 5. In some embodiments, the one or more safety thresholds are predetermined based on simulation, characterization, and/or manufacturing tests of the wireless-power transmitter device 100 and/or one or more antennas of the transmitter device 100. For example, SAR values and predetermined SAR thresholds for different configurations, operational scenarios, power levels, etc. can be determined during simulation, characterization, and/or manufacturing tests of the wireless-power transmitter device. In accordance with a determination that the operational impedance (determined at operation 2304) for the selected output power satisfies one or more safety thresholds (by referencing the LUT), the method 2300 proceeds to operation 2308 and provides an RF signal amplified at the selected output power to one or more antennas that cause the one or more antennas to transmit RF energy. In some embodiments, after providing the RF signal to the one or more antennas, the method 2300, returns to operation 2302 to continuously monitor the impedance measurements for the selected output power.

At operation 2306, in accordance with a determination that the operational impedance (determined at operation 2304) for the selected output power does not satisfy one or more safety thresholds, the method 2300 proceeds to operation 2310 and determines, using the CPU to reference the LUT, a dissipation level for the operational impedance. A visual representation of the determination of the dissipation level for the operational impedance is described above in FIG. 12. At operation 2312, the method 2300 determines whether the dissipation level (determined at operation 2310) is above a dissipation threshold (by referencing the LUT). In accordance with a determination that the dissipation level for the operational impedance is not above the dissipation threshold, the method 2300 proceeds to operation 2308 and provides an RF signal amplified at the selected output power to the one or more antennas to transmit RF energy (as described above).

At operation 2312, in accordance with a determination that the dissipation level for the operational impedance is above the dissipation threshold, the method 2300 proceeds to operation 2314 and determines, by performing power scaling, whether a new power level that has a dissipation level below the dissipation threshold can be determined. Power scaling is described above in reference to FIG. 13. In accordance with a determination that a new power level that has a dissipation level below the dissipation threshold cannot be determined (by referencing the LUT), the method 2300 proceeds to operation 2316 and does not transmit RF energy. In some embodiments, after determining not to transmit the RF energy, the method 2300, returns to operation 2302 to continuously monitor the impedance measurements if another output power is selected.

At operation 2314, after determining a new power level that has a dissipation level below the dissipation threshold (determined by referencing the LUT), the method 2300 proceeds to operation 2318 and selects the new power level as the output power level. After selecting the new power level as the output power level, the method 2300 proceeds to operation 2306 to determine whether the operational impedance for the new power level satisfies the one or more safety thresholds. In this way, the new power level is determined to be safe before the wireless-power transmitter uses the power level in conjunction with transmission of RF energy.

Further embodiments also include various subsets of the above embodiments including embodiments in FIGS. 1-23 combined or otherwise re-arranged in various embodiments.

Safety Techniques

Any of the various systems and methods described herein can also be configured to utility a variety of additional safety techniques. For instance, a transmitter device can determine the present SAR value of RF energy at one or more particular locations of the transmission field using one or more sampling or measurement techniques. In some embodiments, the SAR values within the transmission field are measured and pre-determined by SAR value measurement equipment. In some implementations, a memory associated with the transmitter device may be preloaded with values, tables, and/or algorithms that indicate for the transmitter device which distance ranges in the transmission field are likely to exceed to a pre-stored SAR threshold value. For example, a lookup table may indicate that the SAR value for a volume of space (V) located some distance (D) from the transmitter receiving a number of power waves (P) having a particular frequency (F). One skilled in the art, upon reading the present disclosure, will appreciate that there are any number of potential calculations, which may use any number of variables, to determine the SAR value of RF energy at a particular locations, each of which is within the scope of this disclosure.

Moreover, a transmitter device may apply the SAR values identified for particular locations in various ways when generating, transmitting, or adjusting the radiation profile. A SAR value at or below 1.6 W/kg, is in compliance with the FCC (Federal Communications Commission) SAR requirement in the United States. A SAR value at or below 2 W/kg is in compliance with the IEC (International Electrotechnical Commission) SAR requirement in the European Union. In some embodiments, the SAR values may be measured and used by the transmitter to maintain a constant energy level throughout the transmission field, where the energy level is both safely below a SAR threshold value but still contains enough RF energy for the receivers to effectively convert into electrical power that is sufficient to power an associated device, and/or charge a battery. In some embodiments, the transmitter device can proactively modulate the radiation profiles based upon the energy expected to result from newly formed radiation profiles based upon the predetermined SAR threshold values. For example, after determining how to generate or adjust the radiation profiles, but prior to actually transmitting the power, the transmitter device can determine whether the radiation profiles to be generated will result in RF energy accumulation at a particular location that either satisfies or fails the SAR threshold. Additionally or alternatively, in some embodiments, the transmitter device can actively monitor the transmission field to reactively adjust power waves transmitted to or through a particular location when the transmitter device determines that the power waves passing through or accumulating at the particular location fail the SAR threshold. Where the transmitter device is configured to proactively and reactively adjust the power radiation profile, with the goal of maintaining a continuous power level throughout the transmission field, the transmitter device may be configured to proactively adjust the power radiation profile to be transmitted to a particular location to be certain the power waves will satisfy the SAR threshold, but may also continuously poll the SAR values at locations throughout the transmission field (e.g., using one or more sensors configured to measure such SAR values) to determine whether the SAR values for power waves accumulating at or passing through particular locations unexpectedly fail the SAR threshold.

In some embodiments, control systems of transmitter devices adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$).

In some embodiments, and as a non-limiting example, the wireless-power transmission systems disclosed herein comply with FCC Part § 18.107 requirement which specifies "Industrial, scientific, and medical (ISM) equipment. Equipment or appliances designed to generate and use locally RF energy for industrial, scientific, medical, domestic or similar purposes, excluding applications in the field of telecommunication." In some embodiments, the wireless-power transmission systems disclosed herein comply with ITU (International Telecommunication Union) Radio Regulations which specifies "industrial, scientific and medical (ISM) applications (of radio frequency energy): Operation of equipment or appliances designed to generate and use locally radio frequency energy for industrial, scientific, medical, domestic or similar purposes, excluding applications in the field of telecommunications." In some embodiments, the wireless-power transmission systems disclosed herein comply with other requirements such as requirements codified under EN 62311: 2008, IEC/EN 662209-2: 2010, and IEC/EN 62479: 2010.

In some embodiments, the present systems and methods for wireless-power transmission incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless-power transmission if humans (and in some embodiments, other living beings or sensitive objects) move toward a radiation area with power density levels exceeding EMF exposure limits. In some embodiments, these safety methods (and others) are programmed into a memory of the transmitter device (e.g., memory 206) to allow the transmitter to execute such programs and implement these safety methods.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 206, 256) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the transmitters 100 and/or receivers 104), and for enabling a processing system to interact with other mechanisms utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory, computer-readable storage medium storing instructions that, when executed by a processor associated with one or more integrated circuits of a wireless-power transmission system, cause the one or more integrated circuits to perform operations, comprising:
   selecting a power level from among a plurality of available power levels at which to amplify a radio frequency (RF) signal using a power amplifier;
   providing the amplified RF signal to one or more antennas, wherein the one or more antennas are caused to, upon receiving the amplified RF signal, radiate RF energy within a transmission field to provide usable power to a wireless-power receiver;
   determining one or more predicted specific absorption rate (SAR) values of the transmission field;
   determining, based on the one or more predicted SAR values, a keep out zone within the transmission field, wherein the keep out zone is an area within the transmission field at which the one or more predicted SAR values of the transmission field are greater than or equal to a predetermined SAR threshold of the transmission field;
   receiving, from one or more sensors, an indication that an object is within the keep out zone; and
   in response to receiving the indication, causing the one or more antennas to cease radiating the RF energy.

2. The non-transitory, computer-readable storage medium of claim 1, wherein:
   the one or more integrated circuits include memory storing predetermined properties of the wireless-power transmission system; and
   a power distribution for the transmission field of the one or more antennas is adjusted based on the predetermined properties of the wireless-power transmission system and the power level provided to the one or more antennas from the power amplifier.

3. The non-transitory, computer-readable storage medium of claim 2, wherein the predetermined properties include characteristics of the wireless-power transmission system obtained during simulation, characterization, and/or manufacture tests of the wireless-power transmission system.

4. The non-transitory, computer-readable storage medium of claim 2, wherein the power distribution for the transmission field of the one or more antennas is adjusted without tuning of the one or more antennas.

5. The non-transitory, computer-readable storage medium of claim 2, wherein the power distribution for the transmission field of the one or more antennas is adjusted without using beam-forming techniques.

6. The non-transitory, computer-readable storage medium of claim 1, wherein the power level provided to the one or more antennas from the power amplifier is adjusted based on the one or more integrated circuits detecting a change in impedance at the power amplifier.

7. The non-transitory, computer-readable storage medium of claim 6, wherein:
   the change in impedance at the power amplifier is detected based on one or more of movement of the wireless-power receiver within the transmission field, movement of the object within the transmission field, the wireless-power receiver entering the transmission field, the wireless-power receiver leaving the transmission field, the object entering the transmission field, and the object leaving the transmission field.

8. The non-transitory, computer-readable storage medium of claim 6, wherein:
   the one or more integrated circuits include memory storing predetermined properties of the wireless-power transmission system; and
   the change in impedance at the power amplifier is detected based on a comparison between a measured value for the change in impedance at the power amplifier and one or more of the stored predetermined properties of the wireless-power transmission system.

9. The non-transitory, computer-readable storage medium of claim 1, wherein each respective available power level of the plurality of available power levels is between 2 watts and 15 watts.

10. The non-transitory, computer-readable storage medium of claim 1, wherein the wireless-power transmission system includes only a single power amplifier and the one or more antennas include only a single antenna.

11. The non-transitory, computer-readable storage medium of claim 1, wherein the power level is a maximum power level from among the plurality of available power levels.

12. The non-transitory, computer-readable storage medium of claim 1, wherein the keep out zone is a predefined distance.

13. The non-transitory, computer-readable storage medium of claim 1, wherein the operations further comprise:
before instructing the power amplifier to amplify the RF signal using the power level to create the amplified RF signal, determine that transmitting the RF signal amplified by the power amplifier using the power level to the object would satisfy one or more user-safety thresholds, the determination being based at least in part on a determination that transmitting the amplified RF signal would create a maximum SAR value of not greater than 2 W/kg at the object; and
instruct the power amplifier to amplify the RF signal using the power level to create the amplified RF signal in accordance with a determination that transmitting the RF signal amplified by the power amplifier using the power level to the object would satisfy the one or more user-safety thresholds.

14. The non-transitory, computer-readable storage medium of claim 13, wherein the maximum SAR value is not greater than 0.8 W/kg.

15. The non-transitory, computer-readable storage medium of claim 13, wherein:
the one or more user-safety thresholds include a predetermined roll-off of 3 dB at a predetermined distance increment relative to a peak amount of the RF energy within the transmission field; and
the determination that transmitting the RF signal would satisfy the one or more user-safety thresholds is also based in part on determining that transmitting the RF signal would create the peak amount of the RF energy within the transmission field that has the predetermined roll-off of 3 dB for each predetermined distance increment relative to the peak amount of the RF energy.

16. The non-transitory, computer-readable storage medium of claim 15, wherein the predetermined distance increment is about 8 cm.

17. The non-transitory, computer-readable storage medium of claim 1, wherein the one or more integrated circuits are further configured to:
receive an impedance measurement from among multiple measurement points of the power amplifier;
determine an operational impedance at the power amplifier based on the impedance measurement from among the multiple measurement points of the power amplifier;
utilize the impedance measurement to retrieve information for stored measurement values for two or more parametric parameters, the stored measurement values for the two or more parametric parameters indicating that the operational impedance is a safe operational impedance for the power amplifier; and
select the power level upon determining that the operational impedance is the safe operational impedance for the power amplifier.

18. The non-transitory, computer-readable storage medium of claim 17, wherein the one or more integrated circuits are further configured to:
determine a dissipation level corresponding to the retrieved information for stored measurement values for the two or more parametric parameters; and
select a new power level, less than the power level, upon determining that the dissipation level is above a dissipation threshold.

19. A wireless-power transmission system configured to control operation of one or more power amplifiers to optimize performance of one or more antennas, the wireless-power transmission system comprising:
a power amplifier;
one or more antennas;
one or more integrated circuits configured to:
select a power level from among a plurality of available power levels at which to amplify a radio frequency (RF) signal using the power amplifier;
provide the amplified RF signal to the one or more antennas, wherein the one or more antennas are caused to, upon receiving the amplified RF signal, radiate RF energy within a transmission field;
determine one or more predicted specific absorption rate (SAR) values of the transmission field;
determine, based on the one or more predicted SAR values, a keep out zone within the transmission field, wherein the keep out zone is an area within the transmission field at which the one or more predicted SAR values of the transmission field are greater than or equal to a predetermined SAR threshold of the transmission field;
receive, from one or more sensors, an indication that an object is within the keep out zone; and
in response to receiving the indication, cause the one or more antennas to cease radiating the RF energy.

20. A method of controlling operation of one or more power amplifiers to optimize performance of one or more antennas, the method comprising:
selecting a power level from among a plurality of available power levels at which to amplify a radio frequency (RF) signal using a power amplifier;
providing the amplified RF signal to one or more antennas, wherein the one or more antennas are caused to, upon receiving the amplified RF signal, radiate RF energy within a transmission field;
determining one or more predicted specific absorption rate (SAR) values of the transmission field;
determining, based on the one or more predicted SAR values, a keep out zone within the transmission field, wherein the keep out zone is an area within the transmission field at which the one or more predicted SAR values of the transmission field are greater than or equal to a predetermined SAR threshold of the transmission field;
receiving, from one or more sensors, an indication that an object is within the keep out zone; and
in response to receiving the indication, causing the one or more antennas to cease radiating the RF energy.

* * * * *